United States Patent [19]
Kobayashi et al.

[11] Patent Number: 5,640,576
[45] Date of Patent: Jun. 17, 1997

[54] SYSTEM FOR GENERATING A PROGRAM USING THE LANGUAGE OF INDIVIDUALS

[75] Inventors: Kaname Kobayashi; Takahisa Kimura, both of Kawasaki, Japan

[73] Assignee: Fujitsu Limited, Kawasaki, Japan

[21] Appl. No.: 244,561

[22] PCT Filed: Sep. 17, 1993

[86] PCT No.: PCT/JP93/01331

§ 371 Date: Jul. 25, 1994

§ 102(e) Date: Jul. 25, 1994

[87] PCT Pub. No.: WO94/08290

PCT Pub. Date: Apr. 14, 1994

[30] Foreign Application Priority Data

Oct. 2, 1992 [JP] Japan .................................. 4-263954

[51] Int. Cl.⁶ ...................................................... G06F 17/28
[52] U.S. Cl. ............................ 395/759; 395/701; 395/702
[58] Field of Search ........................... 364/419.08, 419.1, 364/419.17; 395/375, 700, 600

[56] References Cited

U.S. PATENT DOCUMENTS

| | | | |
|---|---|---|---|
| 5,038,316 | 8/1991 | Hempleman et al. | 364/943.5 |
| 5,452,206 | 9/1995 | Turrietta et al. | 364/419.17 |

FOREIGN PATENT DOCUMENTS 63-170735 7/1988 Japan .
2-294833 12/1990 Japan .
3-2923 1/1991 Japan .
4-273329 9/1992 Japan .

*Primary Examiner*—Gail O. Hayes
*Assistant Examiner*—Frantzy Poinvil
*Attorney, Agent, or Firm*—Staas & Halsey

[57] ABSTRACT

A program generating system uses the language of an individual to write a program in expressions with words of the programmer himself which can easily be understood from the side of an application object, and to generate expressions according to a designated programming language from the program written with the words of the programmer himself. The program generating system has a first processor for transforming a user's linguistic expression into an initial role tree, a second processor for detailing and transforming a vocabulary expression of said initial role tree into a beginning role tree, a third processor for detailing and transforming said beginning role tree into an ending role tree, and a fourth processor for generating a source code of a programming language from said ending role tree. The first processor transforms the user's linguistic expression into a description in the form of the role tree. The second processor applies vocabulary transformation rules to the initial role tree to detail the vocabulary expression. The third processor applies role tree transformation rules to the beginning role tree to detail the beginning role tree. The fourth processor applies a set of patterns and a set of vocabularies to the ending role tree to generate a source code of a programming language.

17 Claims, 66 Drawing Sheets

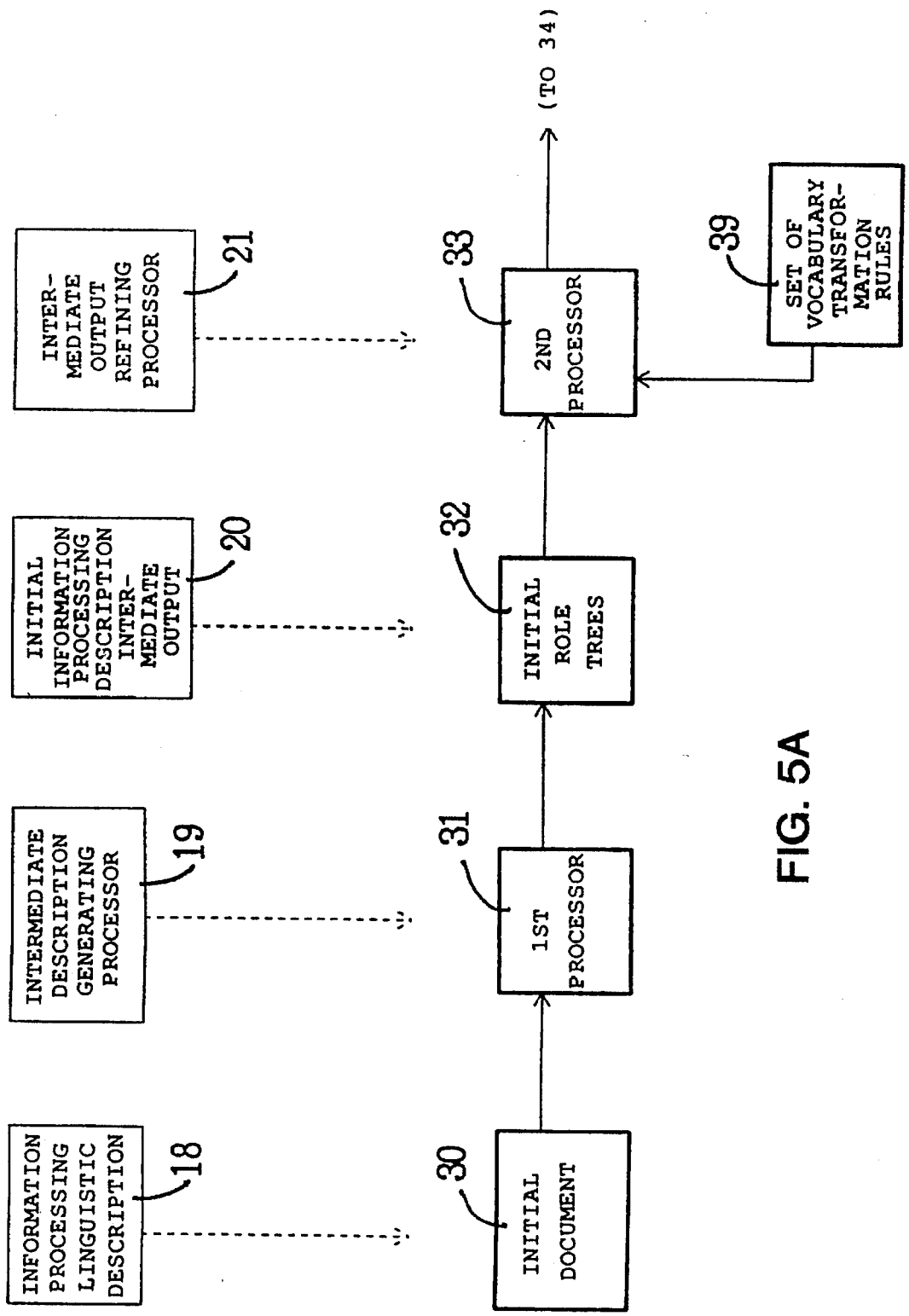

```
........tst.idc ........                               ........INITIAL DOCUMENT FILE........
■=(:,)#〔〕✱.→(}■
〔GIVING/RECEIVING OF AMOUNT TO PAY〕
✱MAIN PROGRAM
RECEIVE CASH IN PAYMENT OF AMOUNT TO PAY
FAILURE → RETURN TO GIVING/RECEIVING OF AMOUNT TO PAY
CASH SMALLER THAN AMOUNT TO PAY → {BILL FOR SHORTAGE OF
   AMOUNT TO PAY. RETURN TO GIVING/RECEIVING OF AMOUNT TO
   PAY.}
CASH GREATER THAN AMOUNT TO PAY → {SITUATION TO CALCULATE
   CHANGE. SITUATION TO GIVE CHANGE.}
RECEPTION PROCESSING.
〔RECEPTION PROCESSING〕 WRAP AND GIVE ARTICLE.
〔SITUATION TO CALCULATE CHANGE〕
CALCULATE CHANGE OF AMOUNT TO PAY AGAINST RECEIVED AMOUNT
〔SITUATION TO GIVE CHANGE〕
GIVE CHANGE
```

FIG. 6

...EXCHANGE OF ORDER OF ROLE ASSIGNMENTS IS PERMITTED...
SITUATION TO CALCULATE CHANGE = CHANGE CALCULATION (CHANGE:X, AMOUNT TO PAY:Z, AMOUNT GIVEN:Y)

FIG. 11A

...VIEW NAME AND PATTERN NAME MAY BE THE SAME...
CHANGE CALCULATION=
CHANGE CALCULATION (CHANGE:X, AMOUNT TO PAY:Z, AMOUNT GIVEN:Y)

FIG. 11B

...INDEFINITE-LENGTH PATTERN...
GIVING/RECEIVING OF AMOUNT TO PAY = ROW (SITUATION TO RECEIVE CASH, SITUATION TO CALCULATE CHANGE, SITUATION TO PAY CHANGE, RECEPTION PROCESSING)

FIG. 11C

EMPTY SUBVIEW PATTERN
EMPTY = ROW()

FIG. 11D

```
MULTIPLE DEFINITION OF ROLE
SITUATION TO CALCULATE CHANGE = CHANGE CALCULATION (CHANGE:X,
    CHANGE:W, AMOUNT TO PAY:Z, AMOUNT GIVEN: Y)
```

FIG. 12

```
CONTENT OF ROLE TREE FILE
■=(:,)#■
GIVING/RECEIVING OF AMOUNT TO PAY = ROW (SITUATION TO RECEIVE
    CASH, SITUATION TO CALCULATE CHANGE, SITUATION TO PAY
    CHANGE, RECEPTION PROCESSING)
SITUATION TO CALCULATE CHANGE = CHANGE CALCULATION (AMOUNT
    GIVEN:Y, AMOUNT TO PAY:Z, CHANGE:X)
```

FIG. 13

NESTED EXPRESSION OF INTERMEDIATE VIEW
■=(:,)#■
GIVING/RECEIVING OF AMOUNT TO PAY = ROW (SITUATION TO RECEIVE CASH, CHANGE CALCULATION (AMOUNT GIVEN:Y, AMOUNT TO PAY:Z, CHANGE:X), SITUATION TO PAY CHANGE, RECEPTION PROCESSING)

FIG. 14

DOUBLE DEFINITION:
■=(:,)#■
GIVING/RECEIVING OF AMOUNT TO PAY = ROW (SITUATION TO RECEIVE CASH, SITUATION TO CALCULATE CHANGE, SITUATION TO PAY CHANGE, RECEPTION PROCESSING)
SITUATION TO CALCULATE CHANGE = CHANGE CALCULATION (AMOUNT GIVEN:Y, AMOUNT TO PAY:Z, CHANGE:X)
SITUATION TO CALCULATE CHANGE = CHANGE CALCULATION (AMOUNT GIVEN:X, AMOUNT TO PAY:Y, CHANGE:Z)

FIG. 15A

```
---SELF-CLOSED PATH-------------------------------------------------

■-(:,)#■
GIVING/RECEIVING OF AMOUNT TO PAY = ROW (SITUATION TO RECEIVE
     CASH, SITUATION TO CALCULATE CHANGE, SITUATION TO PAY
     CHANGE, RECEPTION PROCESSING)
SITUATION TO CALCULATE CHANGE = CHANGE CALCULATION (AMOUNT
     GIVEN:Y, AMOUNT TO PAY:Z, CHANGE:X)
RECEPTION PROCESSING = ROW(PREPARATION OF RECEIPT, GIVING/
     RECEIVING OF AMOUNT TO PAY)
```

FIG. 15B

```
---USE OF INDEFINITE- AND FIXED-LENGTH PATTERNS------------------

■-(:,)#■
GIVING/RECEIVING OF AMOUNT TO PAY = ROW (SITUATION TO RECEIVE
     CASH, SITUATION TO CALCULATE CHANGE, SITUATION TO PAY
     CHANGE, RECEPTION PROCESSING)
SITUATION TO CALCULATE CHANGE = CHANGE CALCULATION (AMOUNT
     GIVEN:Y, AMOUNT TO PAY:Z, CHANGE:X)
RECEPTION PROCESSING = ROW(RECEIPT:Z, ITEM:W)
```

FIG. 15C

```
tst.trl                           INITIAL ROLE TREE FILE

■=(:,)#■
TOP VIEW = PARTIAL ROW (PART(NAME:GIVING/RECEIVING OF AMOUNT
           TO PAY,
        CONTENT: ROW(COMMENT(CONTENT:MAIN PROGRAM),
           RECEIVE CASH FOR AMOUNT TO PAY,
           CONDITIONAL ACTION (CONDITION:FAILURE,
                CONTENT:RETURN TO GIVING/RECEIVING OF
                    AMOUNT TO PAY),
           CONDITIONAL ACTION (CONDITION: CASH SMALLER
                    THAN AMOUNT TO PAY,
                CONTENT: ROW(BILL FOR SHORTAGE, RETURN
                    TO GIVING/RECEIVING OF AMOUNT TO
                    PAY)),
           CONDITIONAL ACTION (CONDITION: CASH GREATER
                    THAN AMOUNT TO PAY,
                CONTENT: ROW(SITUATION TO CALCULATE
                    CHANGE, SITUATION TO PAY CHANGE)),
           RECEPTION PROCESSING)),
     PART(NAME: RECEPTION PROCESSING,
        CONTENT: ROW(WRAP AND GIVE ARTICLE)),
     PART(NAME: SITUATION TO CALCULATE CHANGE,
        CONTENT: ROW(CALCULATE CHANGE OF AMOUNT TO PAY
           AGAINST AMOUNT RECEIVED)),
     PART(NAME: SITUATION TO PAY CHANGE,
        CONTENT: ROW(GIVE CHANGE)))
```

FIG. 16

```
........tst.ivr........              ........VOCABULARY TRANSFORMATION RULES........
■ () → ▲ ■

RETURN TO [DESTINATION] → PROCEED (DESTINATION:[DESTINATION]) ▲

[OBJECT] IS SMALLER THAN [OBJECT COMPARED] → MAGNITUDE
    COMPARISON(SMALLER:[OBJECT], GREATER:[OBJECT COMPARED]) ▲

[OBJECT] IS GREATER THAN [OBJECT COMPARED] → MAGNITUDE
    COMPARISON(GREATER:[OBJECT], SMALLER:[OBJECT COMPARED]) ▲

CALCULATE CHANGE OF AMOUNT TO PAY AGAINST AMOUNT RECEIVED
    → CHANGE CALCULATION (AMOUNT RECEIVED:CASH,
    AMOUNT TO PAY:AMOUNT TO PAY, CHANGE:CHANGE) ▲

RECEIVE CASH FOR AMOUNT TO PAY
    → CASH RECEPTION(AMOUNT TO PAY:AMOUNT TO PAY, CASH:CASH) ▲

BILL FOR SHORTAGE → BILLING FOR SHORTAGE CASH RECEPTION(
    AMOUNT TO PAY:AMOUNT TO PAY, CASH:CASH) ▲

WRAP AND GIVE ARTICLE → GIVING OF ARTICLE (ARTICLE:ARTICLE) ▲

GIVE CHANGE → GIVING OF CHANGE (CHANGE:CHANGE) ▲
```

FIG. 17

```
 tst.tr2 ................................ BEGINNING ROLE TREE FILE ............
■=(:,)#■
  TOP VIEW = PARTIAL ROW (PART(NAME:GIVING/RECEIVING OF AMOUNT
             TO PAY,
          CONTENT: ROW(COMMENT(CONTENT:MAIN PROGRAM),
              CASH RECEPTION(AMOUNT TO PAY:AMOUNT TO PAY,
                  CASH:CASH),
              CONDITIONAL ACTION (CONDITION:FAILURE,
                  CONTENT:PROCEED (DESTINATION: GIVING/
                  RECEIVING OF AMOUNT TO PAY)),
              CONDITIONAL ACTION (CONDITION: MAGNITUDE
                      COMPARISON (SMALLER:CASH,
                      GREATER: AMOUNT TO PAY),
                  CONTENT:ROW(BILL FOR SHORTAGE(AMOUNT TO
                      PAY:AMOUNT TO PAY, CASH:CASH),
                      PROCEED (DESTINATION: GIVING/
                      RECEIVING OF AMOUNT TO PAY))),
              CONDITIONAL ACTION (CONDITION: MAGNITUDE
                      COMPARISON (GREATER:CASH,
                      SMALLER: AMOUNT TO PAY),
                  CONTENT: ROW(SITUATION TO CALCULATE
                      CHANGE, SITUATION TO PAY CHANGE)),
              RECEPTION PROCESSING)),
          PART(NAME: RECEPTION PROCESSING,
              CONTENT: ROW(GIVING OF ARTICLE
                  (ARTICLE: ARTICLE))),
          PART(NAME: SITUATION TO CALCULATE CHANGE,
              CONTENT: ROW(CHANGE CALCULATION(AMOUNT RECEIVED:
                  CASH, AMOUNT TO PAY:AMOUNT TO PAY, CHANGE:
                  CHANGE))),
          PART(NAME: SITUATION TO PAY CHANGE,
              CONTENT: ROW(GIVING OF CHANGE(CHANGE:CHANGE))))
```

FIG. 22

```
TRANSFORMATION
CONTROL FILE    (tst.icn)
■ = ▲ + ■
input =    tst.tr2  ▲          ← INPUT ROLE TREE FILE (tst.tr2)
output=tst.tr3  ▲              ← OUTPUT ROLE TREE FILE (tst.tr3)
rule=  begin.rul +             ← APPLIED TRANSFORMATION RULE FILE NO.1
       tst.irl +                       (1ST STAGE·REUSED)
       end.rul  ▲                  TRANSFORMATION RULE FILE NO.2
                                       (2ND STAGE·INDIVIDUAL)
                                   TRANSFORMATION RULE FILE NO.3
                                       (3RD·REUSED)
```

FIG. 23

```
{¥x=CONDITIONAL ACTION(CONDITION:FAILURE,CONTENT:¥y)
    → ¥x=ifCarry(CONTENT:¥y,LABEL:¥new)}
```

↓                                          ↓

```
PRE-CONDITIONAL PART                POST-CONDITIONAL PART
¥x=CONDITIONAL ACTION(              ¥x=ifCarry(CONTENT:¥y,
   CONDITION:FAILURE,CONTENT:¥y)       LABEL:¥new)
```

FIG. 24

VIEW VARIABLE       VIEW VARIABLE

NEGATION RELATIVE TO MATCHING

BLOCK SUBVIEW VARIABLE

ROLE PATH VARIABLE

TRANSFORMATION RULE FILE ⋯⋯⋯⋯⋯⋯

■=(:,)# {～→} ￥*@ _ ■                           → ROW OF DELIMITER SYMBOLS
ROW OF CHARACTERS INCLUDING NO DELIMITER SYMBOLS → TREATED AS COMMENT
{ROW OF VIEW CONDITIONS} ROW OF CHARACTERS INCLUDING NO DELIMITER SYMBOLS → ROW OF VIEW CONDITIONS} → PORTION FROM { TO } IS ONE RULE
{ROW OF VIEW CONDITIONS} ROW OF CHARACTERS INCLUDING NO DELIMITER SYMBOLS → ROW OF VIEW CONDITIONS}
⋮
ROW OF CHARACTERS INCLUDING NO DELIMITER SYMBOLS → ROW OF VIEW CONDITIONS}                REPEATED
{ROW OF VIEW CONDITIONS} ROW OF CHARACTERS INCLUDING NO DELIMITER SYMBOLS → ROW OF VIEW CONDITIONS}

FIG. 26

```
···· ROLE TREE TRANSFORMATION RULE FILE NO. 1 (begin.rul) ····
■=(:,)#{~→}¥*@_■
%%%%%%%GENERATION OF PROGRAM STRUCTURE (REUSE RULES)%%%%%%%%%
★TURN PART TO PROCEED TO INTO BLOCK
{¥x=PROCEED(DESTINATION:¥name)¥y=PART(NAME:¥name,CONTENT:¥z)
→¥y=BLOCK(LABEL:¥name,CONTENT:¥z)}
★FOR PROCEEDING FROM BLOCK TO BLOCK,
  MAKE CHILD BLOCK SUBBLOCK
{¥x=PROCEED(DESTINATION:¥name)¥y=BLOCK(LABEL:¥myName,
CONTENT:¥myBody)¥myBody=*(*:¥x)
¥w=BLOCK(LABEL:¥name,CONTENT:¥z)~¥y=BLOCK(LABEL:¥name)
¥myBody=ROW(@B)¥any=¥q(@C1,¥w,@C2)
→¥myBody=ROW(@B,¥new)¥new=SUBBLOCK(LABEL::¥name,CONTENT:¥z)
~¥w=BLOCK(LABEL:¥name)¥any=¥q(@C1,@C2)}
★FOR PROCEEDING FROM PART TO BLOCK,
  ENTER CHILD BLOCK AS SUBBLOCK
{¥x=PROCEED(DESTINATION:¥name)¥y=PART(NAME:¥myName,
CONTENT:¥myBody)¥myBody=*(*:¥x)
¥w=BLOCK(LABEL:¥name,CONTENT:¥z)~¥mybody=*(*:¥w)
¥myBody=ROW(@B)¥any=¥q(@C1,¥w,@C2)
→¥myBody=ROW(@B,¥new)  ¥new=SUBBLOCK(LABEL::¥name,CONTENT:¥z)
~¥w=BLOCK(LABEL:¥name)¥any=¥q(@C1,@C2)}
★IF THERE IS BLOCK CONTAINING A KEYWORD "MAIN PROGRAM", THEN
  PART AND WHOLE ARE TURNED INTO MAIN PROGRAM STRUCTURE, AND
  SIMULTANEOUSLY PUT INTO MAIN PROGRAM PART
{¥x=PART ROW(@A,¥y,@B)¥y=BLOCK(LABEL:¥main,CONTENT:¥mainBody)
¥mainBody=*(*:MAIN PROGRAM)
→¥x=MAIN PROGRAM (HEAD PART:¥UNDEFINED2,STACK SIZE:STANDARD
 STACK SIZE, DATA PART:¥UNDEFINED, MAIN PART:¥y,
 PROCESSOR:¥new)
 ¥new=ROW(@A,@B)¥UNDEFINED=ROW()¥UNDEFINED2=ROW()}
★IF MAIN PROGRAM KEYWORD IS STILL IN "PART", IT IS MADE MAIN
  BLOCK
{¥x=PART ROW(@A,¥y,@B)¥y=PART(NAME:¥main,CONTENT:¥mainBody)
¥mainBody=*(*:MAIN PROGRAM)
→¥x=MAIN PROGRAM (HEAD PART:¥UNDEFINED2,STACK SIZE:STANDARD
 STACK SIZE, DATA PART:¥UNDEFINED, MAIN PART:¥ynew,
 PROCESSOR:¥new)
¥new=BLOCK(LABEL:¥main,CONTENT:¥mainBody)¥UNDEFINED=ROW()
¥UNDEFINED2=ROW()   ¥new=ROW(@A,@B)~¥y=PART(NAME:¥main)1}
```

FIG. 27A

★SINCE HEAD COMMENT HAS MOVED TO THE HEAD OF PROCESSOR, IT
  IS BROUGHT TO HEAD
 {¥x=MAIN PROGRAM(HEAD PART:¥old,PROCESSOR:¥proc)
 ¥old=ROW(@B1)¥proc=ROW(¥com,@others)¥com=COMMENT(CONTENT:¥txt)
 →¥old=ROW(@B1,¥com)¥proc=ROW(@others)}
★IF IT HAS THE SAME STATEMENT AS PART NAME, THEN PROVIDED
  THE STATEMENT IS ONLY ONE, IT IS DEVELOPED THERE
  TO THIS END, LIST OF PLURAL USED PART NAMES IS PREPARED
 {~LIST OF PLURAL USED PART NAMES=LIST()
  →LIST OF PLURAL USED PART NAMES=LIST()}
★DOUBLE USE LIST IS PRODUCED
 {¥x=PART(NAME:¥name,CONTENT:¥body)¥v1=¥p1(¥r1:¥name)
 ¥v2=¥p2(¥r2:¥name)~¥v1=¥p2(¥r2:¥name)
 LIST OF PLURAL USED PART NAMES=LIST(@C)
  →LIST OF PLURAL USED PART NAMES=LIST(@C,¥name)}
★PART NOT ENTERED IN DOUBLE USE LIST IS DEVELOPED
 {¥x=PART(NAME:¥name,CONTENT:¥body)~LIST OF PLURAL USED PART
  NAMES=*(*:¥name)
 ¥y=ROW(@A1,¥name,@B1)¥w=¥q(@A2,¥x,@B2)
 →¥y=ROW(@A1,¥com,¥body,@B1)¥com=COMMENT(CONTENT:¥name)¥w=
  ¥q(@A2,@B2)
 ~¥x=PART(NAME:¥name)}
★DOUBLE USE LIST IS DELETED
 {LIST OF PLURAL USED PART NAMES=LIST(@C)
 →LIST OF PLURAL USED PART NAMES=LIST()
  ~LIST OF PLURAL USED PART NAMES=LIST()}
★DEALING WITH STATEMENT HAVING MAGNITUDE COMPARISON
  AS CONDITION
 {¥x=CONDITIONAL ACTION(CONDITION:¥y,CONTENT:¥z)¥y=MAGNITUDE
  COMPARISON(GREATER:¥g,SMALLER:¥s)
 →¥x=ifGTthen(GREATER:¥g,SMALLER:¥s ,CONTENT:¥z,LABEL:¥new)
  ~¥y=MAGNITUDE COMPARISON(GREATER:¥g,SMALLER:¥s)}
★TURN FAILURE BRANCHING INTO CARRY BRANCHING
 {¥x=CONDITIONAL ACTION(CONDITION:FAILURE,CONTENT:¥y)
  →¥x=ifCarry(CONTENT:¥y,LABEL:¥new)}

FIG. 27B

```
·······ROLE TREE TRANSFORMATION RULE FILE NO. 2 (tst.irl)·······

■=(:,)#(~→)¥*@_■
%%%%%%%%%%%%%%%%%%%%%IMPLEMENTING PART%%%%%%%%%%%%%%%%%%%%%%%
★REALIZE CASH RECEPTION WITH STANDARD INPUT
{¥x=CASH RECEPTION(AMOUNT TO PAY:¥AMOUNT TO PAY,CASH:¥CASH)
→¥x=ROW(¥1,¥2,CARRIAGE RETURN AND LINE FEED,¥3,¥4)
  ¥1=DIRECT DISPLAY(CONTENT:AMOUNT TO PAY?)
  ¥2=NUMERICAL VALUE STANDARD INPUT (VARIABLE:¥AMOUNT TO PAY)
  ¥3=DIRECT DISPLAY(CONTENT:CASH ?)
  ¥4=NUMERICAL VALUE STANDARD INPUT (VARIABLE:¥CASH) }
★MAKE BILLING FOR SHORTAGE STANDARD OUTPUT
{¥x=BILLING FOR SHORTAGE(AMOUNT TO PAY:¥AMOUNT TO PAY,
 CASH:¥CASH)
→¥x=ROW(¥1,¥2,¥3,¥4,¥5,CARRIAGE RETURN AND LINE FEED,¥6)
  ¥1=DIRECT DISPLAY(CONTENT:AMOUNT TO PAY IS)
  ¥2=NUMERICAL VALUE STANDARD INPUT (VARIABLE:¥AMOUNT TO PAY)
  ¥3=DIRECT DISPLAY(CONTENT:. RECEIVED CASH)
  ¥4=NUMERICAL VALUE STANDARD INPUT (VARIABLE:¥CASH)
  ¥5=DIRECT DISPLAY(CONTENT:  IS SHORT.)
  ¥6=DIRECT DISPLAY(CONTENT:I RETURN IT AND PLEASE DO IT AGAIN.)}
★MAKE CHANGE CALCULATION SUBTRACTION
{¥x=CHANGE CALCULATION(AMOUNT RECEIVED:¥CASH,AMOUNT TO PAY:
 ¥AMOUNT TO PAY, CHANGE:¥CHANGE)
→¥x=SUBTRACTION(ANSWER:¥CHANGE,MINUEND:¥CASH,SUBTRAHEND:
 ¥AMOUNT TO PAY)}
★MAKE GIVING OF CHANGE STANDARD OUTPUT
{¥x=GIVING OF CHANGE(CHANGE:¥CHANGE)
→¥x=ROW(CARRIAGE RETURN AND LINE FEED,¥1,¥2,¥3)
  ¥1=DIRECT DISPLAY(CONTENT:CHANGE IS)
  ¥2=NUMERICAL VALUE STANDARD INPUT (VARIABLE:¥CHANGE)
  ¥3=DIRECT DISPLAY(CONTENT:.   )}
★MAKE GIVING OF ARTICLE STANDARD OUTPUT
{¥x=GIVING OF ARTICLE(ARTICLE:¥ARTICLE)
→¥x=ROW(CARRIAGE RETURN AND LINE FEED,¥1,¥2,CARRIAGE RETURN
    AND LINE FEED,¥3)
  ¥1=DIRECT DISPLAY(CONTENT:PLEASE RECEIVE)
  ¥2=DIRECT DISPLAY(CONTENT:¥ARTICLE)
  ¥3=DIRECT DISPLAY(CONTENT:.  THANK YOU VERY MUCH.)}
```

FIG. 28

........ ROLE TREE TRANSFORMATION RULE FILE NO. 3 (end.rul) ........

■=(:,)#{~→}¥*@_■
%%%%%%%%%%%DEVELOPMENT OF STANDARD PARTS AND VARIOUS
DECLARATIONS (REUSE RULES)%%%%%%%%%%
★NUMERICAL VALUE STANDARD INPUT IS TRANSFORMED
{¥x=NUMERICAL VALUE STANDARD INPUT(VARIABLE:¥AMOUNT TO PAY)
→¥x=masm NUMERICAL VALUE STANDARD INPUT(BUFFER:COMMON BUFFER,
    BUFFER SIZE:COMMON BUFFER SIZE,LENGTH=¥len,
    VARIABLE: ¥AMOUNT TO PAY)
¥len=VARIABLE(VARIABLE:COMMON VARIABLE)}
★GENERATION OF BUFFER AREA
{¥y=¥p2(BUFFER:¥b,BUFFER SIZE:¥bsize)
¥x=¥p(DATA PART:¥d)~¥d=*(*:¥b)¥d=ROW(@Z)
→¥d=ROW(@Z,¥new)¥new=BUFFER DECLARATION(NAME:¥b,SIZE:¥bsize)}
★DECLERATION OF VARIABLE
{¥x=¥p(VARIABLE:¥var)¥y=¥q(DATA PART:¥d)~¥d=
 *(*:¥var)¥d=ROW(@Z)
→¥d=ROW(@Z,¥new)¥new=VARIABLE DECLARATION(NAME:¥var)}
★PROCEED(DESTINATION:~) IS REPLACED WITH jmp.
{¥x=PROCEED(DESTINATION:¥lab)→¥x=jmp(LABEL:¥lab)}
★LABEL IS PREPARED IN ORDER TO MAKE LABEL FOR masm
★GENERATION OF NEW LABEL
{~LABEL LIST=LIST(¥r:¥s)→LABEL LIST=LIST(
 L0,L1,L2,L3,L4,L5,L6,L7,L8,L9,
 L10,L11,L12,L13,L14,L15,L16,L17,L18,L19,
 L20,L21,L22,L23,L24,L25,L26,L27,L28,L29)}
★LIST OF LABELS FOR NON-masm IS PREPARED
{~NON-LABEL LIST=LIST(@x)→NON-LABEL LIST=LIST()}
★LIST OF LABELS FOR NON-masm IS GENERATED
{¥any=¥pat(LABEL:¥lab)
~NON-LABEL LIST=LIST(¥r:¥lab)NON-LABEL LIST=LIST(@x)
→NON-LABEL LIST=LIST(@x,¥lab)}
★LABEL PAIR LIST IS PREPARED
{~LABEL PAIR LIST=LIST(@x)→LABEL PAIR LIST=LIST()}

FIG. 29A

★NON-LABEL LIST IS CAUSED TO CORRESPOND TO LABEL LIST
{NON-LABEL LIST=LIST(¥lab,@B1)
LABEL LIST=LIST(¥newLab,@B2)
LABEL PAIR LIST=LIST(@B3)
→NON-LABEL LIST=LIST(@B1)
LABEL LIST=LIST(@B2)
LABEL PAIR LIST=LIST(@B3,¥new)
¥new=PAIR(old:¥lab,new:¥newLab)}
★REWRITTEN ALONG LABEL PAIR LIST
{¥pair=PAIR(old:¥old,new:¥newLab)
¥x=¥p(LABEL:¥old)LABEL PAIR LIST=*(*:¥old)
→¥x=¥p(LABEL:¥newLab)}
★LABEL LIST IS DELETED
{LABEL LIST=LIST(@B)→LABEL LIST=list()
~LABEL LIST=LIST()}
★NON-LABEL LIST IS DELETED
{NON-LABEL LIST=LIST(@B)→NON-LABEL LIST=list()
~NON-LABEL LIST=LIST()}
★PAIR IS ELIMINATED
{¥x=PAIR(¥r,¥s)→~¥x=PAIR(¥r,¥s)}
★PAIR LIST IS ELIMINATED
{LABEL PAIR LIST=LIST(@B)→LABEL PAIR LIST=list()
~LABEL PAIR LIST=LIST()}
%%%%%%%%%%%% COMPLETION OF ROLE TREE TRANSFORMATION %%%%%%%%%%%%

FIG. 29B

```
........ENDING ROLE TREE FILE (tst.tr3)........

■=(:,)#■
TOP VIEW=MAIN PROGRAM(HEAD PART:ROW(),
  STACK SIZE:STANDARD STACK SIZE,
  DATA PART:ROW(BUFFER DECLARATION(NAME:COMMON BUFFER,
               SIZE:COMMON BUFFER SIZE),
    VARIABLE DECLARATION(NAME:AMOUNT TO PAY),
    VARIABLE DECLARATION(NAME:CASH),
    VARIABLE DECLARATION(NAME:CHANGE),
    VARIABLE DECLARATION(NAME:COMMON VARIABLE)),
  MAIN PART:BLOCK(LABEL:L0,
    CONTENT:ROW(COMMENT(CONTENT:MAIN PROGRAM),
          ROW(DIRECT DISPLAY(CONTENT:AMOUNT TO PAY?)
             masmNUMERICAL VALUE STANDARD INPUT(BUFFER:
                COMMON BUFFER, BUFFER SIZE:COMMON BUFFER
                SIZE,LENGTH:VARIABLE(VARIABLE:COMMON
                VARIABLE),VARIABLE:AMOUNT TO PAY),
             CARRIAGE RETURN AND LINE FEED,
             DIRECT DISPLAY(CONTENT:CASH?),
             masmNUMERICAL VALUE STANDARD INPUT(BUFFER:
                COMMON BUFFER, BUFFER SIZE:COMMON BUFFER
                SIZE,LENGTH:VARIABLE(VARIABLE:COMMON
                VARIABLE),VARIABLE:CASH)),
          ifCarry(CONTENT:jmp(LABEL:L0), LABEL:L3),
          ifGTthen(GREATER:AMOUNT TO PAY, SMALLER:CASH,
                CONTENT:ROW(ROW(DIRECT DISPLAY(
                   CONTENT:AMOUNT TO PAY IS ),
                NUMERICAL VALUE STANDARD OUTPUT (
                   VARIABLE: AMOUNT TO PAY),
                DIRECT DISPLAY CONTENT:(. RECEIVED CASH),
                NUMERICAL VALUE STANDARD OUTPUT
                   (VARIABLE:CASH),
                DIRECT DISPLAY(CONTENT: IS SHORT.)
                CARRIAGE RETURN AND LINE FEED,
                DIRECT DISPLAY(CONTENT:I RETURN IT AND
                   PLEASE DO IT AGAIN.))
             jmp(LABEL:L0)),
          LABEL:L1),
```

FIG. 30A

```
ifGTthen(GREATER:CASH, SMALLER:AMOUNT TO PAY,
        CONTENT:ROW(COMMENT(CONTENT:SITUATION TO
          CALCULATE CHANGE),
        ROW(SUBTRACTION(ANSWER:CHANGE,
            MINUEND:CASH,
            SUBTRAHEND:AMOUNT TO PAY)),
        COMMENT(CONTENT:SITUATION TO PAY CHANGE),
        ROW(ROW(CARRIAGE RETURN AND LINE FEED,
            DIRECT DISPLAY(CONTENT:CHANGE   IS),
            NUMERICAL VALUE STANDARD OUTPUT
              (VARIABLE:CHANGE),
            DIRECT DISPLAY (CONTENT: .))))),
    LABEL:L2),
  COMMENT(CONTENT:RECEPTION PROCESSING),
  ROW(ROW(CARRIAGE RETURN AND LINE FEED,
        DIRECT DISPLAY(CONTENT:PLEASE RECEIVE )
        DIRECT DISPLAY(CONTENT:ARTICLE),
        CARRIAGE RETURN AND LINE FEED,
        DIRECT DISPLAY(CONTENT:. THANK YOU VERY
          MUCH.))))),

PROCESSOR:ROW())
```

FIG. 30B

ROLE TREE TABLE

| VIEW NAME | PATTERN NAME | ROLE NAME | SUBVIEW NAME |
|---|---|---|---|
| SITUATION TO CALCULATE CHANGE | CHANGE CALCULATION | AMOUNT GIVEN | Y |
| SITUATION TO CALCULATE CHANGE | CHANGE CALCULATION | AMOUNT TO PAY | Z |
| SITUATION TO CALCULATE CHANGE | CHANGE CALCULATION | CHANGE | X |

FIG. 31

ROLE TREE TRANSFORMATION RULE TABLE

| PRE-/POST -CONDITIONAL PART | AFFIRMATIVE /NEGATIVE | VIEW NAME | PATTERN NAME | ROLE NAME | SUBVIEW NAME | MATCHED STATE |
|---|---|---|---|---|---|---|
| PRE-CONDITIONAL PART | AFFIRMATIVE | ¥x | CONDITIONAL ACTION | CONDITION | FAILURE | MATCHED STATE |
| PRE-CONDITIONAL PART | AFFIRMATIVE | ¥x | CONDITIONAL ACTION | CONTENT | ¥y | MATCHED STATE |
| POST-CONDITIONAL PART | AFFIRMATIVE | ¥x | ifCarry | CONTENT | ¥y | MATCHED STATE |
| POST-CONDITIONAL PART | AFFIRMATIVE | ¥x | ifCarry | LABEL | ¥new | MATCHED STATE |

FIG. 32

VARIABLE TABLE

| VARIABLE NAME | VALUE OF VARIABLE |
|---|---|
| ¥x | |
| ¥y | |
| ¥new | |

FIG. 33

```
         EXPRESSION GENERATION
            CONTROL FILE (tst.ish)
    ■=▲+ ■
    RoleTree=tst.tr3 ▲              ········ ROLE TREE FILE
    pattern= begin.pat +            ········ COMMON PATTERN SET FILE
         tst.pat ▲                  ········ INDIVIDUAL PATTERN SET FILE
    voc = end.voc +                 ········ COMMON VOCABULARY SET FILE
         tst.voc ▲                  ········ INDIVIDUAL VOCABULARY SET FILE
    top= top ▲                      ········ TOP VIEW FILE
    output= tst.asm ▲               ········ OUTPUT SOURCE PROGRAM FILE
```

FIG. 39

```
    ···· tst.pat ················· INDIVIDUAL PATTERN SET ···········
    ■=→▲ [] () ■
    CASH RECEPTION= [CASH] IS AGAINST [AMOUNT TO PAY] . ▲
    MAGNITUDE COMPARISON= [GREATER] > [SMALLER] ▲
    BILLING FOR SHORTAGE=RECEIVED [CASH] IS SMALLER THAN
        [AMOUNT TO PAY] . ▲
    CHANGE CALCULATION = REMAINDER PRODUCED BY SUBTRACTING
        [AMOUNT TO PAY] FROM [RECEIVED AMOUNT] IS CHANGE. ▲
    GIVING OF CHANGE = [CHANGE] IS GIVEN AS CHANGE. ▲
    GIVING OF ARTICLE= [ARTICLE] IS GIVEN AS ARTICLE. ▲
```

FIG. 40

```
······ begin.pat ······························· COMMON PATTERN SET ··············
■=→▲ [] () ■
MAIN PROGRAM
= [HEAD PART]
include    end.mac
data       segment public
[DATA PART]
data       ends
code       segment public
assume     cs:code,ds:data
public     main
main       proc far
     push ax
     mov  ax,data
     mov  ds,ax
     pop  ax
[MAIN PART]
     mov  ah,4Ch
     int  21h
main       endp
[PROCESSOR]
code       ends
stack      segment stack
     dw   [STACK SIZE] dup(?)
stack      ends
end main
end
▲
BUFFER DECLARATION
=    [NAME] db [SIZE] dup(?)▲
masm NUMERICAL VALUE STANDARD INPUT=@getnum [BUFFER SIZE] ,
   [BUFFER] , [LENGTH] , [VARIABLE] ▲
SUBTRACTION =  @sub [MINUEND] , [SUBTRAHEND] , [ANSWER] ▲
COMMENT=   ;; [CONTENT] ▲
PROCEED=   PROCEED TO [DESTINATION] ▲
PART ROW → [PART] ( [PART] ) ▲
CONDITIONAL ACTION = IF [CONDITION] ( [CONTENT] )▲
PART =  「 [NAME] 」
[CONTENT] △▲
ROW → [STATEMENT] (
```

FIG. 41A

```
[Cont'd from FIG. 41(A)]
 【STATEMENT】 ) ▲
LIST → [ 【LABEL】 〈, 【LABEL】 〉 ]▲
BLOCK = 【LABEL】 : 【CONTENT】 ▲
SUBBLOCK = 【LABEL】 : 【CONTENT】 ▲
ifGTthen
= @ifThen 【GREATER】 ,"≦", 【SMALLER】 , 【LABEL】
 【CONTENT】
 【LABEL】 :▲
ifCarry = @ifnonCarry 【LABEL】
 【CONTENT】
 【LABEL】 :▲
PAIR = 【old】 AND 【new】 ARE A PAIR ▲
VARIABLE DECLARATION = 【NAME】 dw ?▲
VARIABLE = 【VARIABLE】 ▲
jmp =    jmp    【LABEL】 ▲
DIRECT DISPLAY = @putstr 【CONTENT】 ▲
NUMERICAL VALUE STANDARD OUTPUT =    @putnum 【VARIABLE】 ▲
NUMERICAL VALUE STANDARD INPUT = NUMERICAL VALUE STANDARD
                                       INPUT ( 【VARIABLE】 )▲
```

FIG. 41B

```
····tst.voc ······INDIVIDUAL ········:
                    VOCABULARY SET

■=▲+■
AMOUNT TO PAY = cost▲
CASH = money▲
CHANGE = change▲
```

FIG. 42

```
···· end.voc ············ REUSE VOCABULARY SET ·······:

■=▲+■
STANDARD STACK SIZE = 1024▲
UNDEFINED = ;;UNDEFINED▲
CARRIAGE RETURN AND LINE FEED = @crlf▲
COMMON BUFFER = commonBuffer▲
COMMON BUFFER SIZE = 100▲
COMMON VARIABLE = commonVar▲
```

FIG. 43

```
··· top ············
  ■▲■
  TOP VIEW▲
```

FIG. 44

```
tst.asm ————————————————— GENERATED SOURCE PROGRAM FILE
    include    end.mac
    data       segment public
        commonBuffer  db  100 dup(?)
        cost dw ?
        money dw       ?
        change dw      ?
        commonVar dw   ?
    data       ends
    code       segment public
    assume     cs:code,ds:data
    public     main
    main       proc  far
        push ax
        mov  ax,data
        mov  ds,ax
        pop  ax
L0:;;MAIN PROGRAM
        @putstr AMOUNT TO PAY ?
        @getnum 100,commonBuffer,commonVar,cost
        @crlf
        @putstr CASH ?
        @getnum 100,commonBuffer,commonVar,money
        @ifnonCarry L3
        jmp  L0
L3:
        @ifThen cost,"≦",money,L1
        @putstr AMOUNT TO PAY IS
        @putnum cost
        @putstr . RECEIVED CASH
        @putnum money
        @putstr IS SHORT.
        @crlf
        @putstr I RETURN IT AND PLEASE DO IT AGAIN.
        jmp  L0
```

FIG. 45A

```
L1:
        @ifThen money, "≤",cost,L2
        ;;SITUATION TO CALCULATE CHANGE
        @sub money,cost,change
        ;;SITUATION TO CALCULATE CHANGE
        @crlf
        @putstr CHANGE IS
        @putnum change
        @putstr .
L2:
        ;;RECEPTION PROCESSING
        @crlf
        @putstr PLEASE RECEIVE
        @putstr ARTICLE
        @crlf
        @putstr , THANK YOU VERY MUCH.
        mov     ah,4Ch
        int     21h
main        endp code        ends
stack       segment stack
    dw      1024 dup(?)
stack       ends
end main
end
```

FIG. 45B

```
                    ┌─RT
ROLE TREE FILE
■-(:,)#■
SITUATION TO CALCULATE CHANGE - CHANGE CALCULATION (AMOUNT GIVEN:Y,
                                                   AMOUNT TO PAY:Z, CHANGE:X)
```

```
              ┌─P1
PATTERN NO. 1

CHANGE CALCULATION = 〖CHANGE〗:-〖AMOUNT GIVEN〗-〖AMOUNT TO PAY〗;▲
```

```
              ┌─GR1
GENERATED RESULT NO. 1
X:=Y-Z;
```

```
              ┌─P2
PATTERN NO. 2
CHANGE CALCULATION = call sub(〖CHANGE〗, 〖AMOUNT GIVEN〗,
                              〖AMOUNT TO PAY〗);▲
```

```
              ┌─GR2
GENERATED RESULT NO. 2
call sub( X, Y, Z);
```

```
              ┌─P3
PATTERN NO. 3
CHANGE CALCULATION = CHANGE 〖CHANGE〗  IS THE REMAINDER PRODUCED BY
                     SUBTRACTING AMOUNT TO PAY 〖AMOUNT TO PAY〗
                     FROM  AMOUNT GIVEN 〖AMOUNT GIVEN〗.▲
```

```
              ┌─GR3
GENERATED RESULT NO. 3
CHANGE X IS THE REMAINDER PRODUCED BY SUBTRACTING AMOUNT TO PAY Z
FROM AMOUNT GIVEN.
```

```
              ┌─P4
PATTERN NO. 4

CHANGE CALCULATION = The amount to pay is 〖CHANGE〗.  If you pay
〖AMOUNT GIVEN〗, you'll get 〖AMOUNT TO PAY〗 for the change.▲
```

```
              ┌─GR4
GENERATED RESULT NO. 4
The amount to pay is  Z. If you pay  Y, you'll get  X for the change.
```

```
              ┌─P5                              ┌─GR5
PATTERN NO. 5                            GENERATED RESULT NO. 5
                                         mov ax, Y
   CHANGE CALCULATION =                  mov bx, Z
       mov  ax, 〖AMOUNT GIVEN〗          sub ax,bx
       mov  bx, 〖AMOUNT TO PAY〗         mov X,ax
       sub  ax,bx
       mov  〖CHANGE〗,ax▲
```

FIG. 52

| DOCUMENT FILE 501 | DELIMITER SYMBOL | ⌈ | ⌋ |
|---|---|---|---|
| | SYMBOL IDENTIFIER | 1 | 2 |
| DOCUMENT FILE 502 | DELIMITER SYMBOL | ( | ) |
| | SYMBOL IDENTIFIER | 1 | 2 |
| DOCUMENT FILE 503 | DELIMITER SYMBOL | ⌈ | ⌋ |
| | SYMBOL IDENTIFIER | 1 | 2 |

FIG. 58

SYSTEM FOR GENERATING A PROGRAM USING THE LANGUAGE OF INDIVIDUALS

TECHNICAL FIELD

The present invention relates to a system for generating a program using the language of individual persons, and more particularly to a program generating system which relies on the language of individual persons to generate computer programs and is capable of accumulating and reusing generated programs in a generation of computer programs, based on a language transforming apparatus that employs a knowledge base.

BACKGROUND ART

When a computer program is generated, the programming process may be carried out efficiently by referring to programming experiences that have been accumulated. Programming experiences of a programmer can be accumulated by accumulating programs that have been generated by the programmer himself.

Heretofore, computer programs have been generated on the basis of directly reusing programs that are described in high-level languages (e.g., 4 GL) designed for respective application fields. While it has been customary practice to reuse documents such as specifications, the procedure for reusing such documents is not necessarily automatized.

There has been known a language transforming apparatus which employs a knowledge base, for transforming a first linguistic description which represents desired information processing in a certain application field that is stated in a language used in the application field, into a second linguistic description expressed in a certain computer program language (Japanese laid-open patent publication No. 63-269228). According to the disclosed language transforming apparatus, one first linguistic description can be transformed into several second linguistic descriptions, e.g., an application-side abstract program linguistic description and a computer program linguistic description. Since the first linguistic description can thus be transformed into different second linguistic descriptions, the first linguistic description can be reused.

FIG. 1 of the accompanying drawings is a diagram showing a basic arrangement of such a language transforming apparatus which employs a knowledge base. As shown in FIG. 1, the language transforming apparatus comprises a first linguistic description 1, a first role pattern accumulating means 2 for accumulating role patterns 3, a second linguistic description 4, a second role pattern accumulating means 5 for accumulating other role patterns 6, a role assignment knowledge accumulating means 7 for accumulating role assignment knowledges 8 which represent the corresponding relationship between the role patterns 3, 6 that are accumulated in the first and second role pattern accumulating means 2, 5, and a language transforming means 9 for transforming the first linguistic description 1 into the second linguistic description 4 by referring to the role patterns 3, 6 and the role assignment knowledges 8.

The language transforming means 9 is capable of obtaining the second linguistic description 4 which is desired from the first linguistic description 1 which is given, by using the role patterns 3 for understanding the first linguistic description 1 and the first role pattern accumulating means 2 for storing the role patterns 3, using the role patterns 6 for understanding the second linguistic description 4 and the second role pattern accumulating means 5 for storing the role patterns 6, and referring to the role assignment knowledges 8 that represent assignments between the roles of role patterns in a first language and the roles of role patterns in a second language and the role assignment knowledge accumulating means 7.

FIG. 2 of the accompanying drawings illustrates, by way of example, an arrangement of the language transforming apparatus based on the basic arrangement shown in FIG. 1. In the arrangement shown in FIG. 2, the linguistic form of an intermediate output of an information processing description is employed as the form of the first linguistic description shown in FIG. 1. An information processing description from an application side is supplied as a description in compliance with the linguistic form of an information processing description intermediate output 11 to the language transforming apparatus, in which the supplied information processing description is transformed into a computer program intermediate output 13 by an intermediate output transforming processor 12. The computer program intermediate output 13 is then passed through a linguistic description generating processor 14, which generates a computer program linguistic description 15 as the second linguistic description shown in FIG. 1. As with the computer program linguistic description 15, an information processing linguistic description 17 from an application object side is generated as the second linguistic description shown in FIG. 1 by a linguistic description generating processor 16.

As described above, the above invention (Japanese laid-open patent publication No. 63-269228) has shown that a conversion from the first linguistic description form into the second linguistic description form can be achieved by the language transforming apparatus. However, it does not necessarily reveal a specific example of means for achieving such a conversion.

According to the conventional programming technology, accumulated programs are hardly used as they are, but are mostly required to be rewritten, because of changes arising from circumstances of the application side, changes arising from circumstances of the computer side, and changes of program languages.

One program has three aspects, i.e., an aspect as seen from the application object side (an aspect as seen from the user), an aspect as seen from the computer side (an aspect as seen from the executing side), and an aspect of implementation. Rewriting a program requires that the program be understood simultaneously with respect to these three aspects. Such a requirement is, however, responsible for increasing the difficulty in rewriting the program. From the standpoint of rewriting a program, the program should have been written in expressions that can easily be understood with respect to the aspect as seen from the application object side, which is not necessarily the case, however. For example, it is not necessarily simple to establish a sequence of cause and effect about what change of a program is brought about by a program modification that is required under the circumstances of the application side. As a result, a process of rewriting a program may become more difficult than a process of newly creating such a program, or an erroneous program may be produced due to a program rewriting error.

Therefore, it has been desired to be capable of writing a program in expressions that can easily be understood from the application object side, using user's own words, and of automatically generating expressions in an indicated programming language from a program that has been written using user's own words.

DISCLOSURE OF THE INVENTION

It is therefore an object of the present invention to provide a program generating system which relies on the language of individuals for automatically generating a program written in expressions that are composed of user's own words and can easily be understood from an application object side, using a programming language indicated by a program written with user's own words.

To achieve the above object, in accordance with the present invention, there is provided a program generating system for using the language of an individual to generate a linguistic description expressed in a programming language from a linguistic description expressed in the language of a user, comprising first processing means for transforming a user's linguistic expression into an initial role tree, second processing means for detailing and transforming a vocabulary expression of the initial role tree into a beginning role tree, third processing means for detailing and transforming the beginning role tree into an ending role tree, and fourth processing means for generating a source code of a programming language from the ending role tree.

According to the present invention, there is also provided a method of identifying delimiter symbols in a delimited file in a system having a text storage unit storing texts each structured to identify a given data part from other data parts with sandwiching delimiter symbols and delimiter definition parts positioned at the beginning of the texts and including extracted delimiter symbols used in the texts, in a source code of a program and computer data to be processed by a program, a delimiter symbol processor, a data processor, and a delimiter symbol storage unit, the method comprising the steps of starting to input the delimiter symbols of the delimiter definition parts from the text storage unit with the delimiter symbol processor, adding the order in which the delimiter symbols are inputted as symbol identifiers to the delimiter symbols and registering the symbol identifiers and the delimiter symbols in the delimiter symbol storage unit, starting to input a text stored in the text storage unit while checking whether there is a delimiter symbol, searching the delimiter symbol storage unit using a delimiter symbol as a key if the delimiter symbol is detected while the text is being inputted, indicating the symbol identifier added to the delimiter symbol and inputted data of the text inputted until the delimiter symbol appears, to the data processor, recognizing the delimiter symbol based on the symbol identifier and processing the data as desired with the data processor, and if a next text is to be inputted, requesting the delimiter symbol processor to input the text from the text storage unit.

According to the present invention, there is further provided a method of generating a program using the language of an individual to generate a linguistic description expressed in a programming language from a linguistic description expressed in the language of a user, comprising the steps of applying an intermediate output transforming process and an intermittent output detailing process to linguistic expressions of an individual to transform the linguistic expressions of the individual into linguistic expressions inherent in a field in an initial stage, applying an intermediate output transforming process and an intermittent output detailing process to the linguistic expressions inherent in the field to transform the linguistic expressions inherent in the field into standard linguistic expressions in an intermediate stage, and applying an intermediate output transforming process and an intermittent output detailing process to the standard linguistic expressions to transform the standard linguistic expressions into linguistic expressions representing computer operations in a final stage, finally obtaining computer program language descriptions in a predetermined programming language.

BRIEF DESCRIPTION OF THE DRAWINGS

FIG. 5(A), FIG. 5(B) and FIG. 5(C) are block diagrams showing an embodiment of a program generating system which relies on an individual's language according to the present invention;

FIG. 6 is a diagram showing an example of the content of an initial document file in which an initial document is described;

FIGS. 11(A) through 11(D) are diagrams showing formats in which view definitions are permitted;

FIG. 12 is a diagram showing a format in which a view definition is inhibited;

FIG. 13 is a diagram showing an example of a role tree file;

FIG. 14 is a diagram showing an example of a format in which a role tree is permitted;

FIGS. 15(A) through 15(c) are diagrams showing formats in which role trees are inhibited;

FIG. 16 is a diagram showing an initial role tree which the first processor generates from an initial document;

FIG. 17 is a diagram showing an example of the content of a vocabulary transformation rule file;

FIG. 22 is a diagram showing the content of a beginning role tree file that is generated by the second processor when vocabulary transformation rules are applied to an initial role tree;

FIG. 23 is a diagram showing the content of a transformation control file used for a third processor to generate an ending role tree;

FIG. 24 is a diagram showing a format of role tree transformation rules;

FIG. 26 is a diagram showing the structure of a role tree transformation rule file;

FIGS. 27(A) and 27(B) are diagrams showing a first set of rules for generating a program structure applied to a beginning role tree;

FIG. 28 is a diagram showing a second set of rules for describing an implementing procedure applied to a beginning role tree;

FIGS. 29(A) and 29(B) are diagrams showing a third set of rules for describing a process related to refining usage of standard computer program parts applied to a beginning role tree;

FIGS. 30(A) and 30(B) are diagrams showing an ending role tree which the third processor generates from a beginning role tree;

FIG. 31 is a diagram showing a process of expressing a role tree in the third processor;

FIG. 32 is a diagram showing a process of expressing role tree transformation rules in the third processor;

FIG. 33 is a diagram showing a variable table for holding the values of variables contained in a role tree transformation rule;

FIG. 39 is a diagram showing the content of a expression generation control file used for a fourth processor to generate computer programming linguistic descriptions from an ending role tree;

FIG. 40 is a diagram showing a set of patterns inherent in problems;

FIG. 41(A) and FIG. 41(B) are diagrams showing a set of common-use patterns by way of example;

FIG. 42 is a diagram showing a set of vocabularies representative of a collection of object names inherent in problems, by way of example;

FIG. 43 is a diagram showing, by way of example, a set of vocabularies representative of a collection of object names used by a macro assembler program;

FIG. 44 is a diagram showing a top view file by way of example;

FIG. 45(A) FIG. 45(B) are diagrams showing, by way of example, computer program language descriptions which are generated from an ending role tree by a fourth processor;

FIG. 52 is a diagram showing, by way of example, the generation of a multilingual document by changing patterns;

FIG. 58 is a diagram illustrative of symbol identifiers registered in a delimiter symbol storage unit 53.

BEST MODE FOR CARRYING OUT THE INVENTION

Figure 1:
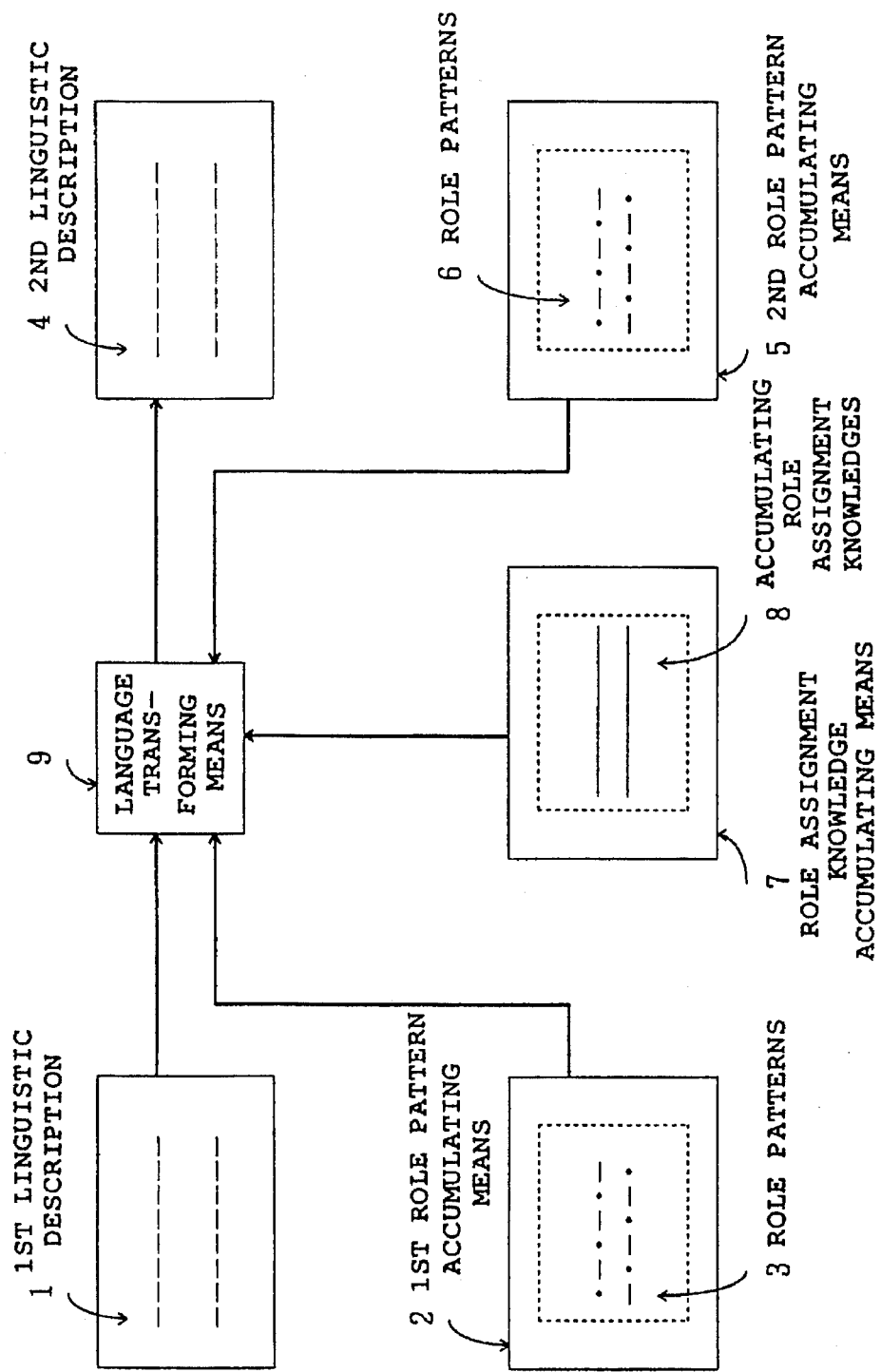
FIG. 1 is a block diagram showing a basic arrangement of a language transforming apparatus using a knowledge base.
Figure 2:
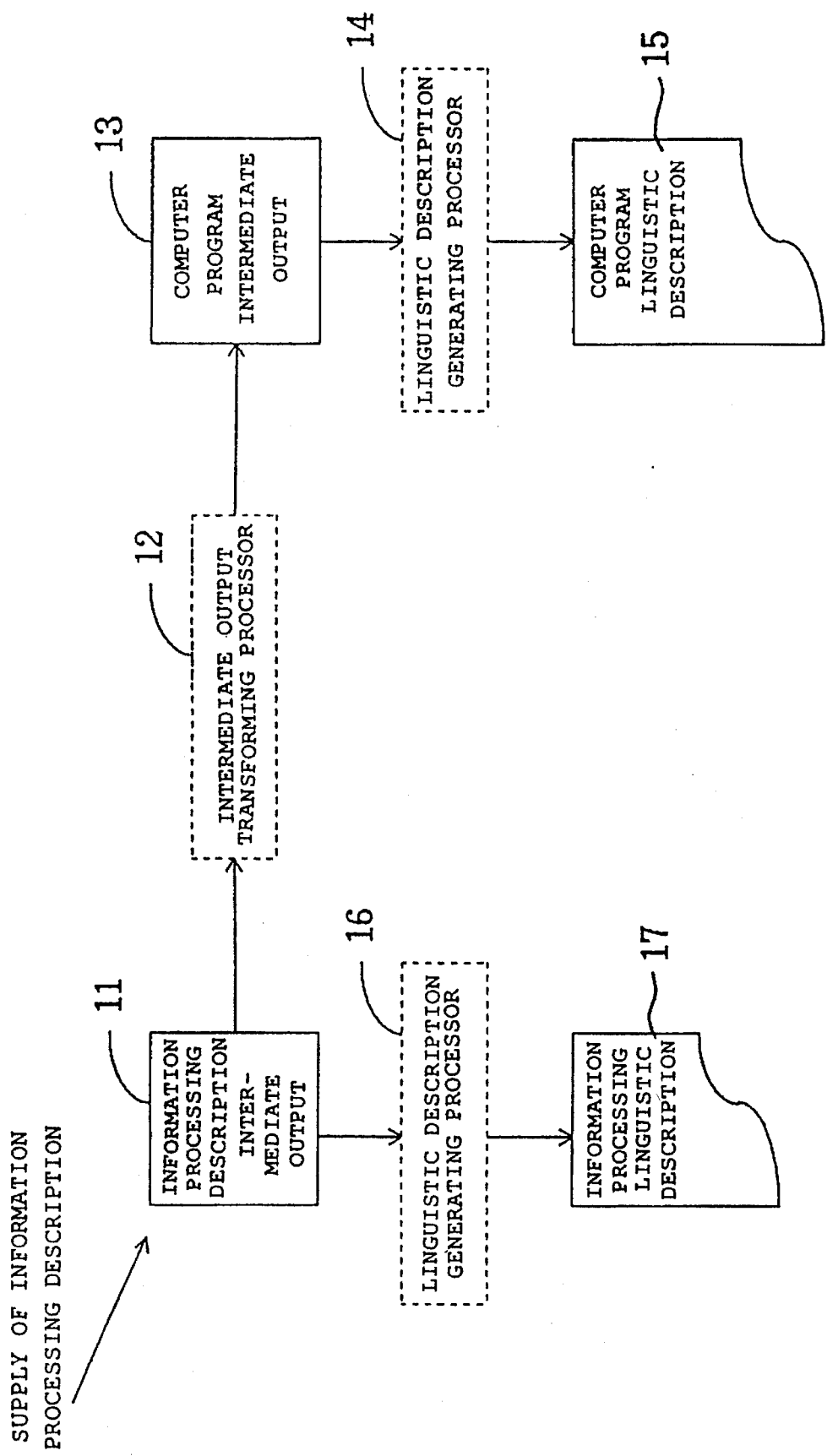
FIG. 2 is a block diagram showing an example of an arrangement of the language transforming apparatus based on the basic arrangement shown in FIG. 1.
Figure 3:
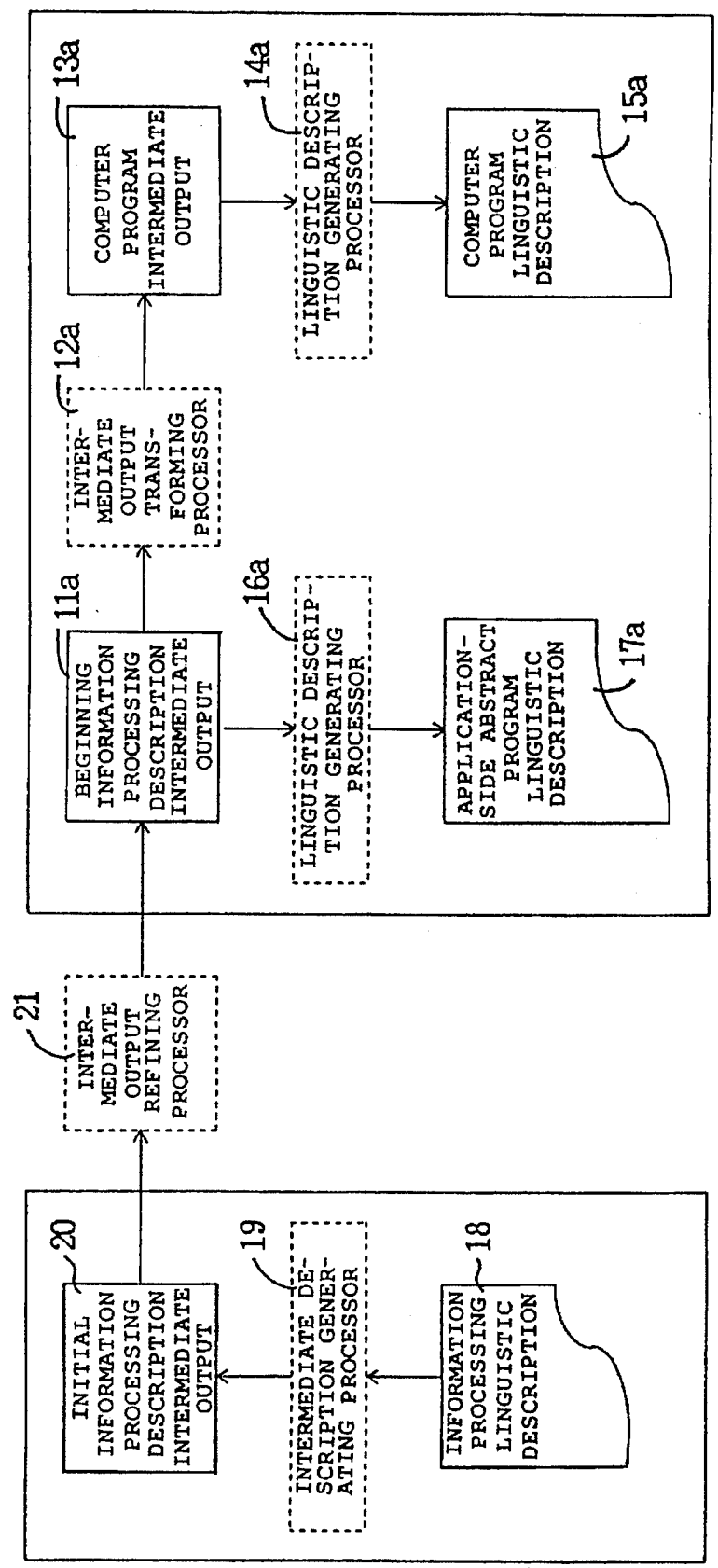
FIG. 3 is a block diagram showing a system according to the present invention, based on a language transforming apparatus using a knowledge base.

FIG. 3 shows a system according to the present invention, based on a language transforming apparatus using a knowledge base. As shown in FIG. 3, the system according to the present invention has a mechanism for producing an information processing description intermediate output from an information processing linguistic description. Specifically, the system includes a beginning information processing description intermediate output 11a, an intermediate output transforming processor 12a, a computer program intermediate output 13a, a linguistic description generating processor 14a, a computer program linguistic description 15a, a linguistic description generating processor 16a, and an application-side abstract program linguistic description 17a, which are all of the conventional nature, and additionally includes an intermediate description generating processor 19 for transforming an information processing linguistic description 18 into an initial information processing description intermediate output 20, and an intermediate output refining processor 21 for transforming the initial information processing description intermediate output 20 into the beginning information processing description intermediate output 11a.

The intermediate description generating processor 19 serves to transform the information processing linguistic description 18, which allows the user to write a program with his own words, into the initial information processing description intermediate output 20, which has a data structure required for transformation. The intermediate description generating processor 19 effects a transformation process that is a reversal of the transformation process carried out by the linguistic description generating processors 14a, 16a. With the intermediate description generating processor 19, the user is allowed to write a program using his own words.

Figure 4:
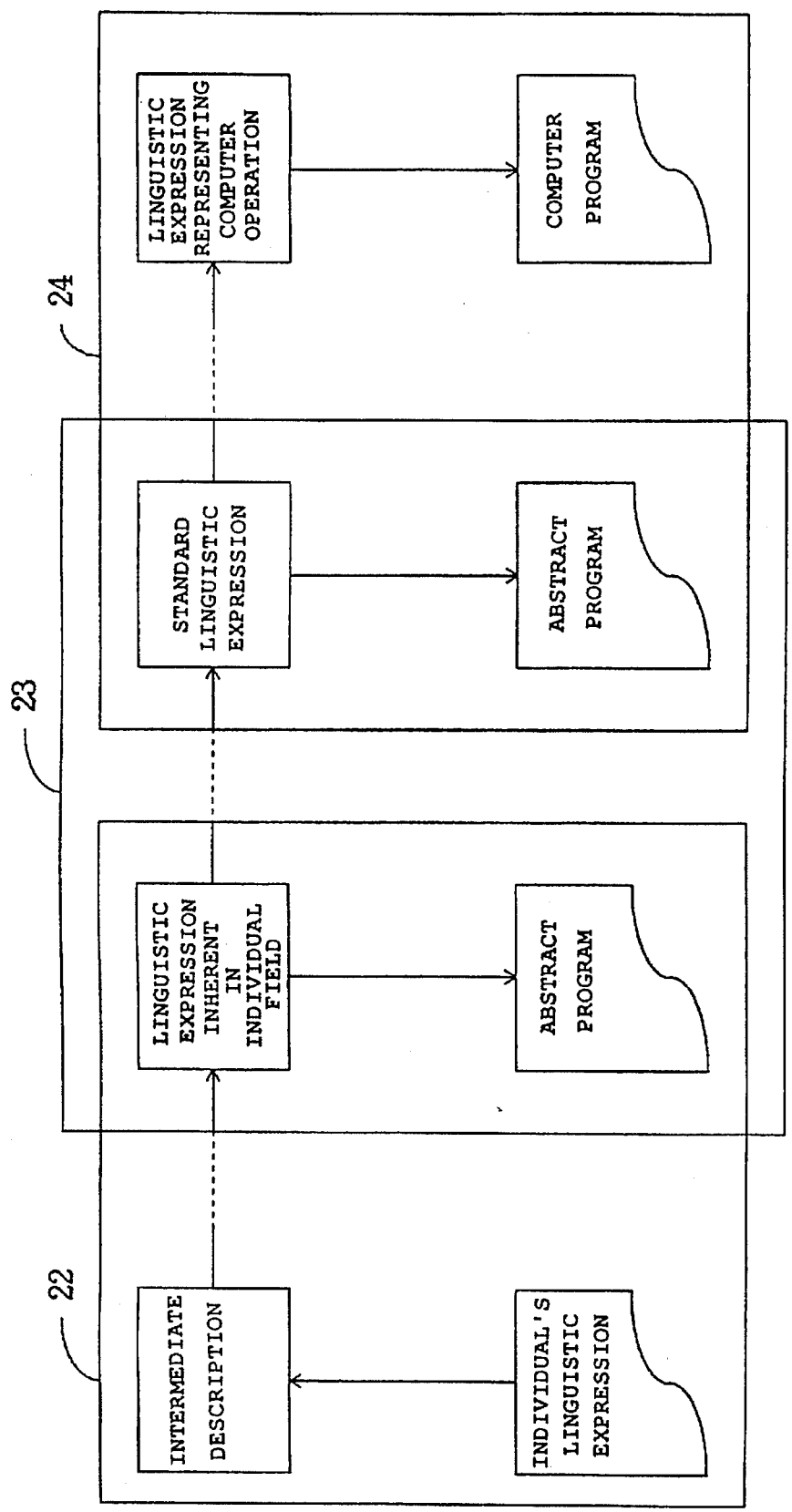
FIG. 4 is a block diagram illustrative of a programming process based on a program generating system which relies on an individual's language.

FIG. 4 illustrates a programming process based on a program generating system which relies on an individual's language. The programming process is such a process that the processing by the intermediate output transforming processor 12a and the intermediate output refining processor 21 shown in FIG. 3 is applied a plurality of times to transform information processing linguistic descriptions written in the user's language successively into computer program linguistic descriptions.

In FIG. 4, the programming process is composed of a series of transformation stages. In an initial stage 22, an individual's linguistic expression is transformed into an intermediate description and a linguistic expression inherent in an individual field. In an intermediate stage 23, the linguistic expression inherent in the individual field is transformed into a standard linguistic expression. In a final stage 24, the standard linguistic expression is transformed into a linguistic expression representing a computer operation, thus finally producing a computer program linguistic description in a certain programming language.

Stated otherwise, the programming process is a process of bringing individual's words into a standard world in the language transforming apparatus, and then transforming the words into an individual programming language. In various stages of the intermediate output transforming processing, abstract program linguistic expressions can be produced using the linguistic description generating processor.

Figure 5B:
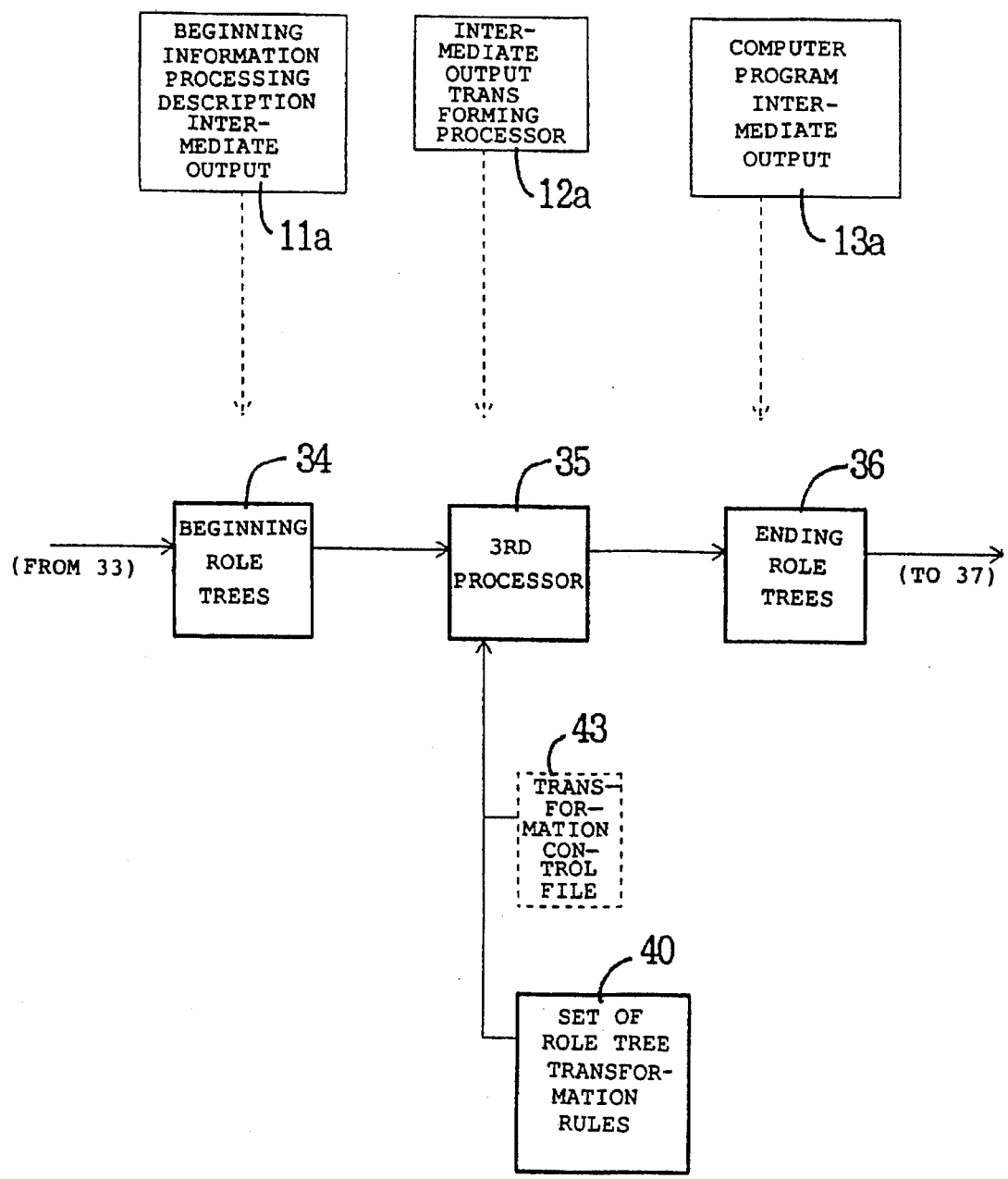
Figure 5C:
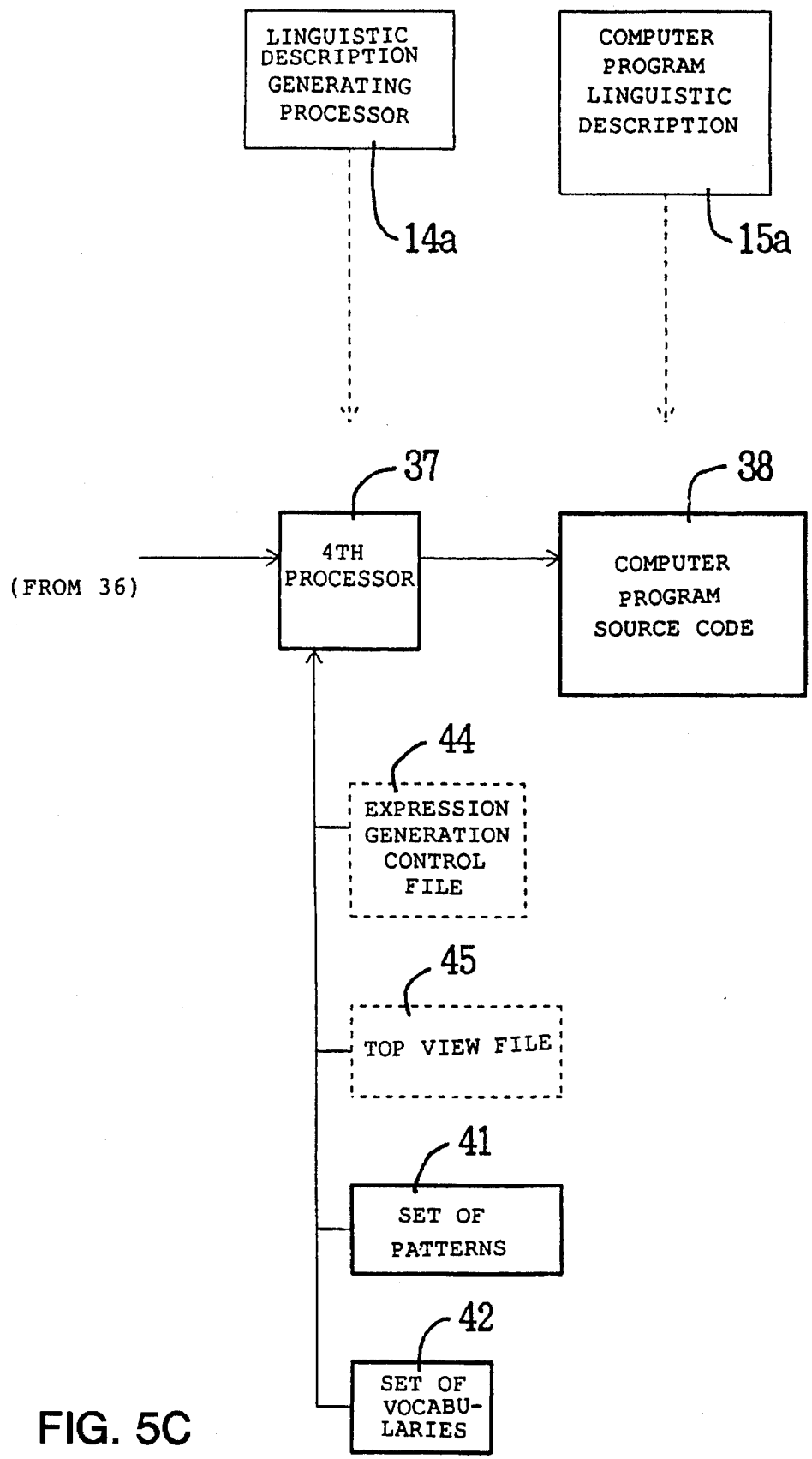

FIGS. 5(A) through 5(C) show an embodiment of a program generating system which relies on an individual's language according to the present invention. The program generating system includes an initial document 30 corresponding to the first linguistic description in the language transforming apparatus, a first processor 31, initial role trees 32 corresponding to the role patterns in the language transforming apparatus, a second processor 33, beginning role trees 34, a third processor 35, ending role trees 36, a fourth processor 37, a computer program source code 38 corresponding to the second linguistic description in the language transforming apparatus, a set 39 of vocabulary transformation rules corresponding to a portion of the role assignment knowledges in the language transforming apparatus, a set 40 of role tree transformation rules, a set 41 of patterns, and a set 42 of vocabularies. Preferably, the program generating system also includes a transformation control file 43 composed of a list of the names of many files of the set 40 of role tree transformation rules, an expression generation control file 44, and a top view file 45.

The components of the program generating system shown in FIGS. 5(A) and 5(C) are illustrated as being related to those of the system shown in FIG. 3. Specifically, the initial document 30 corresponds to the information processing linguistic description 18, the first processor 31 to the intermediate description generating processor 19, the initial role trees 32 to the initial information processing description intermediate output 20, the second processor 33 to the intermediate output refining processor 21, the beginning role trees 34 to the beginning information processing description intermediate output 11a, the third processor 35 to the intermediate output transforming processor 12a, the ending role trees 36 to the computer program intermediate output 13a, the fourth processor 37 to the linguistic description generating processor 14a, and the computer program source code 38 to the computer program linguistic description 15a.

FIG. 6 shows an example of the content of an initial document file in which an initial document 30 is described. The example shown in FIG. 6 illustrates a situation for calculating a change. The initial document 30 comprises a symbol string composed of delimiter symbols and a row of characters separated by delimiter symbols that belong to the symbol string. The delimiter symbols are defined by being sandwiched between meta delimiters "■" at the beginning of the file, and characterized by the relative position in the symbol string and by being uniquely identified in the string of delimiter symbols. Insofar as the above conditions are satisfied, delimiter symbols can be selected with freedom. A file in which a string of delimiter symbols is defined at the beginning and which is processed by being signified depending on the order of appearance of the delimiter symbols is referred to as a "delimiter file".

Each row of characters separated by delimiter symbols, together with the delimiter symbol positioned immediately following the same, is called a "word". A file composed of rows of delimiter symbols and rows of words is called a "word file".

The delimiter symbols ranging from the first delimiter symbol "=" to the sixth delimiter symbol "#" are used to describe an initial role tree 32 as an information processing description intermediate output.

In the initial document, a statement is assumed to end with ".". A portion from "[" to a position immediately before next "[" is a single "part", a portion from "[" to next "]" is the name of that part, and a portion from "]" to next "[" is a row of statements.

A row of characters which has "✕" at the beginning, ends with ".", and contains no other delimiter symbols is regarded as representing a comment.

A row of characters which does not have "✕" at the beginning, ends with ".", and contains no other delimiter symbols is regarded as representing one statement written by user's language expressions.

A row of characters which does not have "✕" at the beginning, has "→" somewhere in the middle, ends with ".", and contains no other delimiter symbols is regarded as representing a conditional statement. A row of characters following "→" and ending with "." in characters that represent a conditional statement, including ".", may be replaced with a row of characters beginning with "{" and ending with "}". A row of characters beginning with "{" and ending with "}" may contain a row of statements which may include a commentary statement and a conditional statement.

Sentences are classified into three types, i.e., a commentary statement from the symbol "✕" to the symbol ".", a conditional statement having a pattern xxx→{yyy}, and an ordinary statement. The portion of the conditional statement which is left to "→" serves as a condition, and the portion thereof from "{" to "}" as the content of an action. The content of an action from "{" to "}" is represented by a row of statements.

The name of the initial document file is indicated by "tst.idc" in FIG. 6.

In FIG. 5(A), the initial document 30, which is a user's language representation, is inputted to the first processor 31, which then generates an initial role tree 32 using the delimiter symbols.

FIG. 7(A), FIG. 7(B), FIG. 8, and FIG. 9 are illustrative of a processing sequence of the first processor 31 for converting an initial document file into an initial role tree.

Figure 7A:
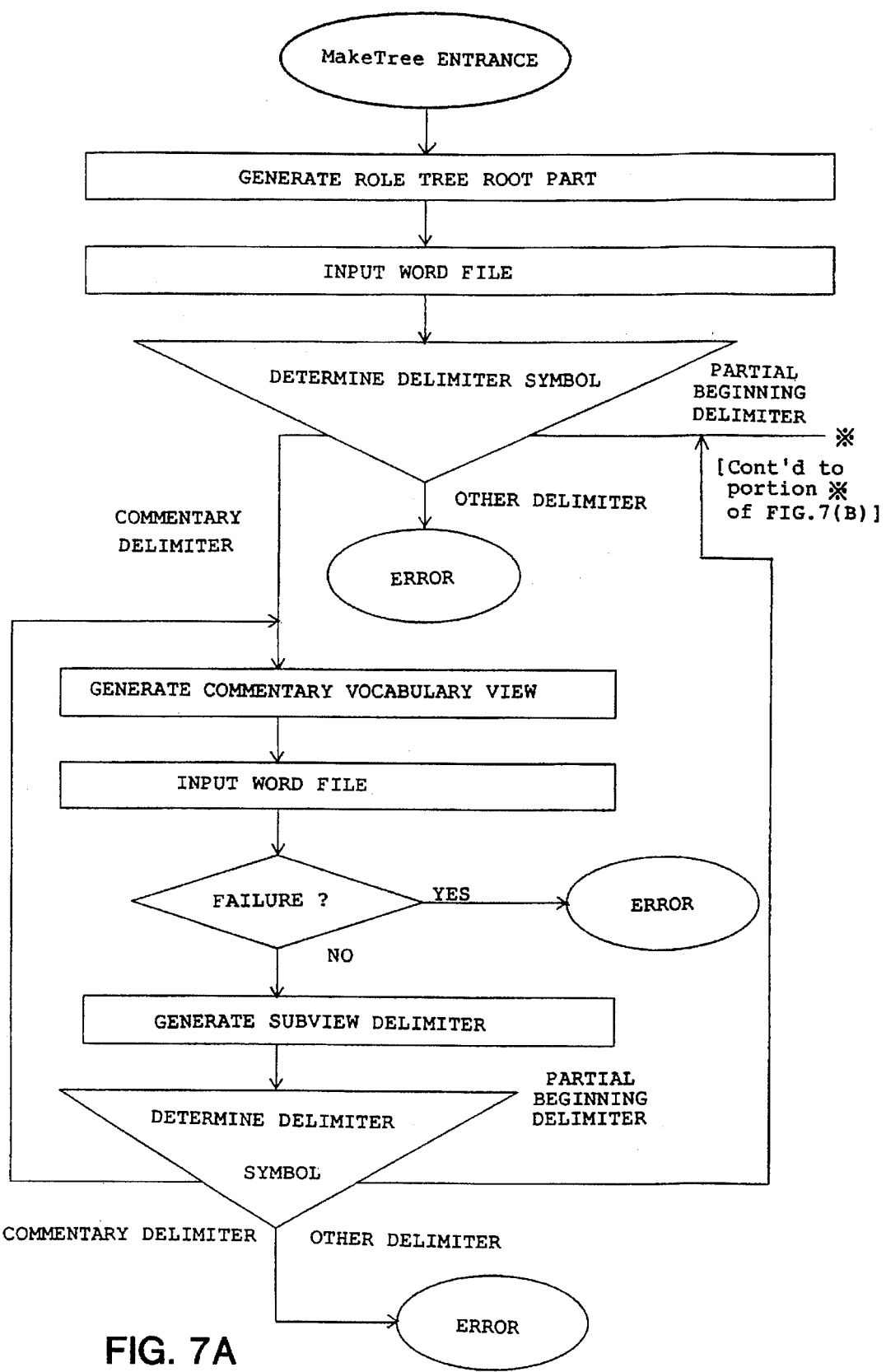
FIG. 7(A) and FIG. 7(B) are flowcharts showing details of a processing sequence of a first processor.
Figure 7B:
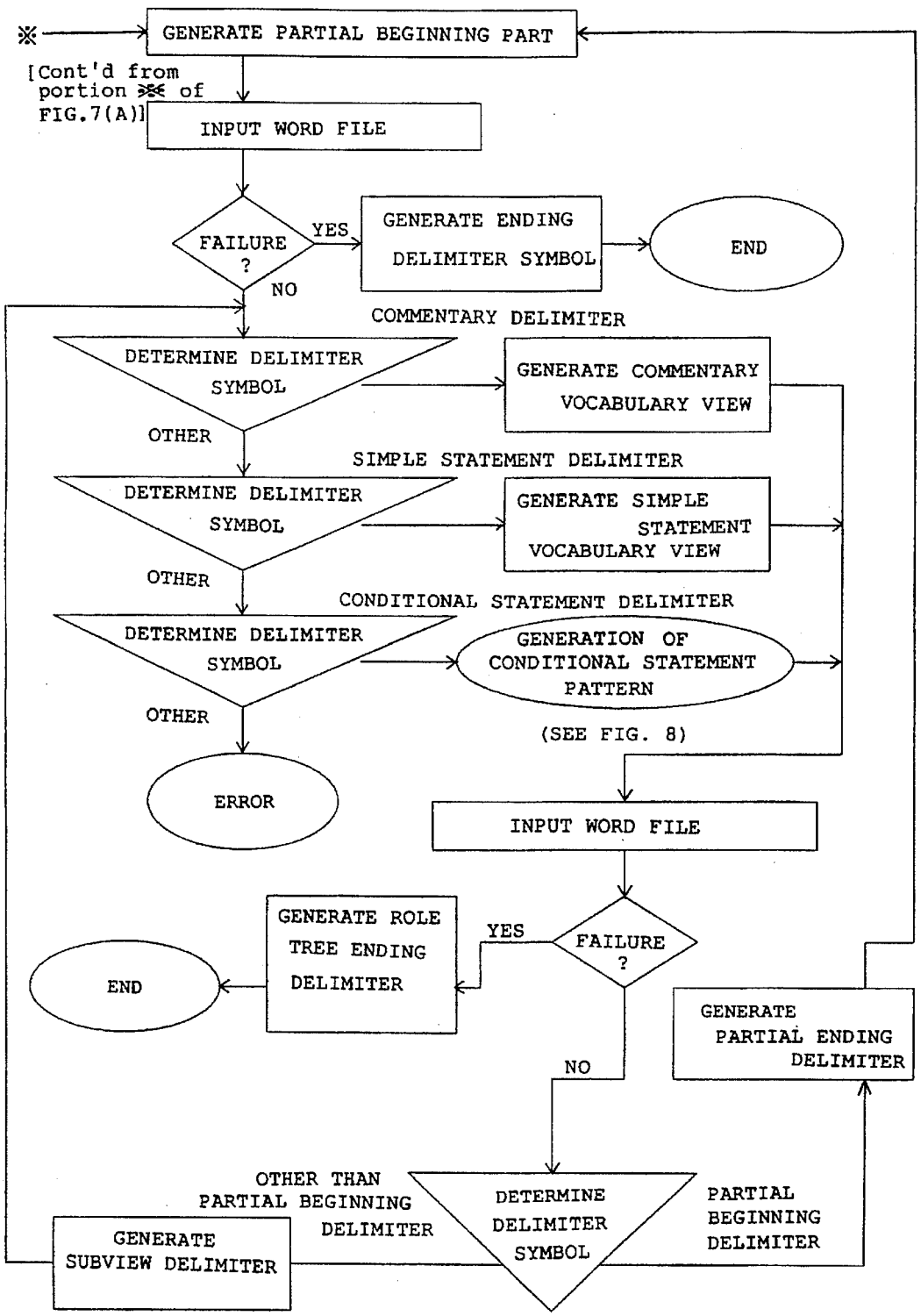

FIG. 7(A) and FIG. 7(B) are flowcharts showing details of a processing sequence of the first processor 31. The first processor 31 is composed of a program entitled "makeTree.exe" that operates under MS-DOS, for example. By executing this program, the first processor 31 receives an initial document 30 and generates an initial role tree 32 according to the rules of the delimiter symbols.

When a word file is inputted, a string of characters up to a next delimiter symbol and that delimiter symbol are entered. Depending on the result of determination of the delimiter symbol, control branches into sequences for processing a commentary statement, a simple statement (other than commentary and conditional statements), and a conditional statement. Specifically, if the delimiter symbol is a comment delimiter "✕", then a view of commentary vocabulary is generated, and the word file is entered. If the delimiter symbol is a simple statement delimiter ".", then a view of simple statement vocabulary is generated, and the word file is entered. If the delimiter symbol is a conditional delimiter "→", then a conditional statement pattern is generated, and the word file is entered. The generation of a conditional statement pattern is illustrated in FIG. 8.

A commentary statement is processed differently depending on whether it appears at the beginning of the initial document or not. If a commentary statement appears at the beginning of the initial document, then a view of commentary vocabulary is first generated, and thereafter it is determined whether the statement is a commentary statement, a simple statement, or a conditional statement.

A row of statements which can be put together as one group can be given a name. A pattern which has a name and a row of statements is referred to as a part. A role tree is formed of a row of such parts.

Figure 8:
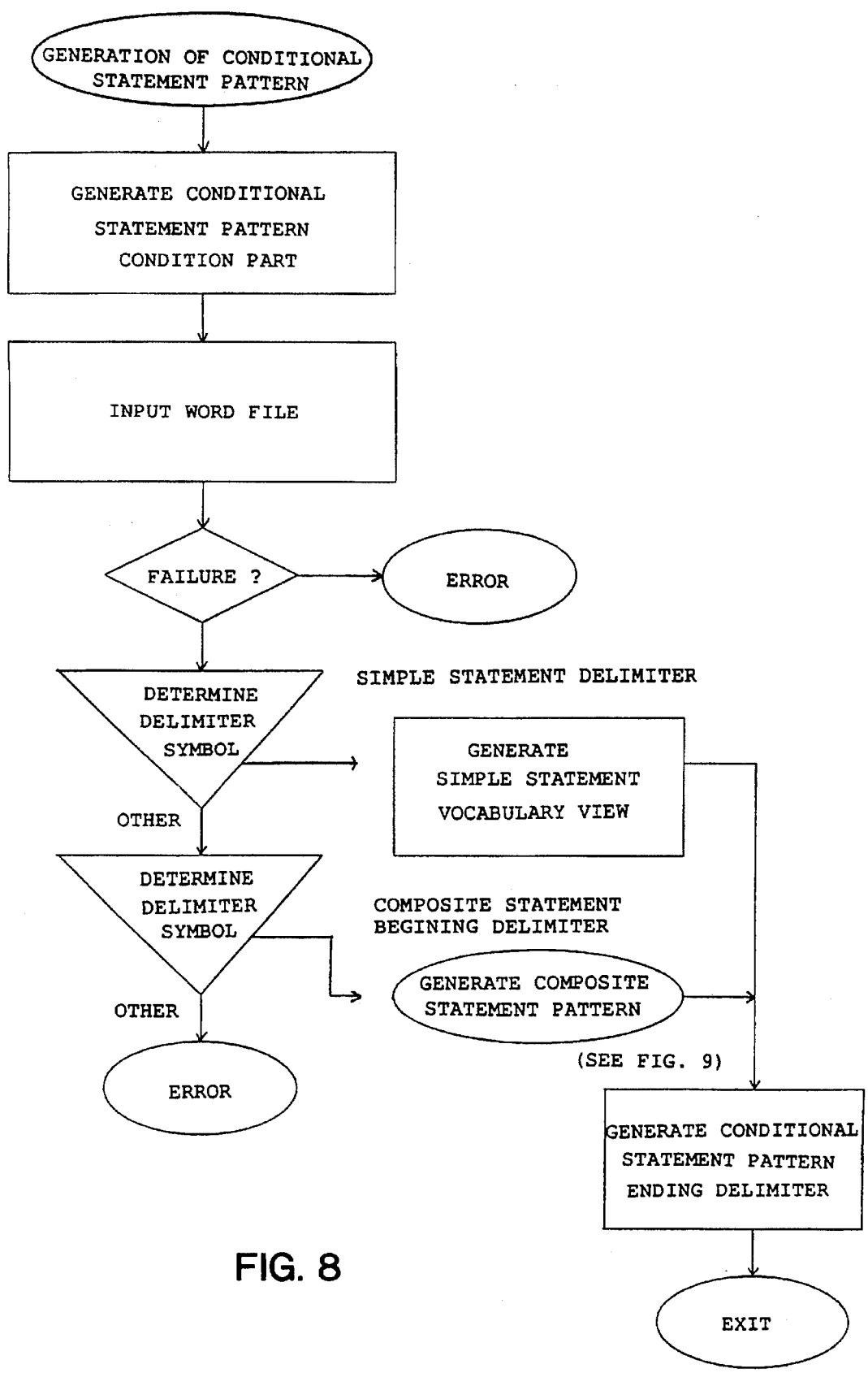
FIG. 8 is a flowchart showing details of conditional statement processing.

FIG. 8 is a flowchart of showing details of conditional statement processing. In the conditional statement processing, of a row of characters representing a conditional statement, a character string from the beginning of the statement to a position immediately before the symbol "→" is used to generate a conditional portion of a conditional statement pattern. A character string following the delimiter symbol "→" and ending with the delimiter symbol "." is processed as a simple statement. A character string following the delimiter symbol "→" and beginning with "{" and ending with "}" is processed as a composite statement. Details of a sequence for processing a composite statement are shown in FIG. 9.

Figure 9:
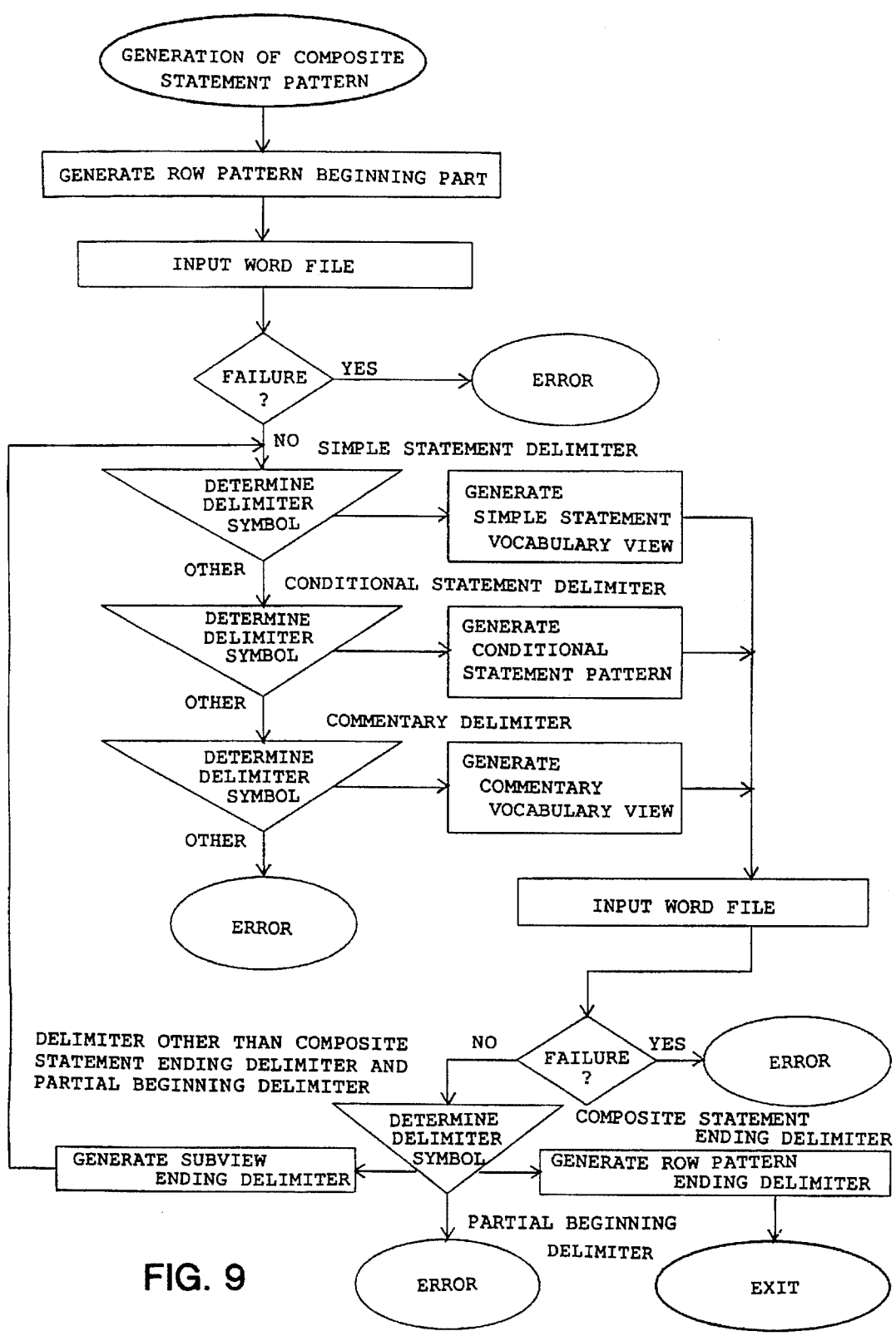
FIG. 9 is a flowchart showing details of a sequence for processing a composite statement.

FIG. 9 is a flowchart showing details of a sequence for processing a composite statement. In processing a composite statement, the type of a statement is determined based on the type of a delimiter symbol, and control branches into different processing sequences for different statement types. If a statement is a conditional statement, then the sequence of processing a conditional statement shown in FIG. 8 is called recursively to process the conditional statement.

Figure 10:
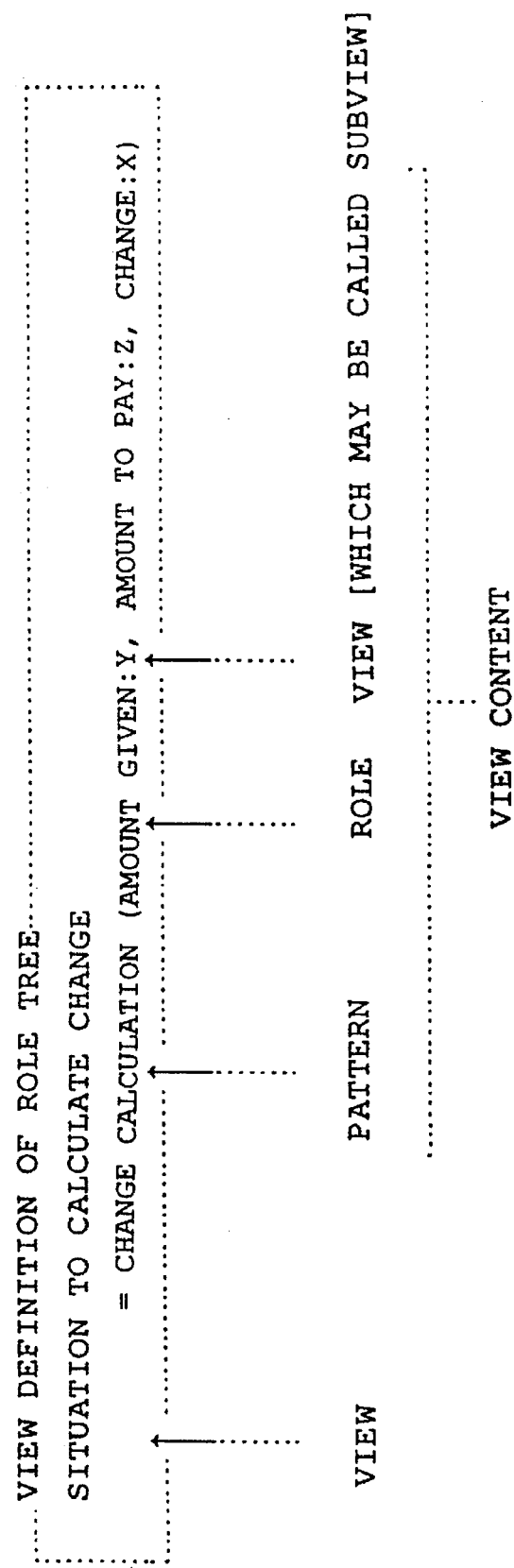
FIG. 10 is a diagram showing the structure of a role tree.

FIG. 10 is a diagram showing the structure of a role tree. The structure of a role tree will be described below with reference to FIG. 10. A role tree is a set of view definitions. A view definition is composed of a view and a view content which are interconnected by the delimiter symbol "=". The view content comprises a pattern and a row of role assignments sandwiched between the delimiter symbol "(" and the delimiter symbol ")" The row of role assignments is a string of role assignments separated by the delimiter symbol "," The role assignments are composed of a role and subviews that are interconnected by the delimiter symbol ":".

In the illustrated example, a pattern "change calculation" is used for a view "situation to calculating change", and it is assumed that three roles, "amount given", "amount to pay", and "change", appear in the pattern. In the view "situation to calculating change", it is supposed that the role of the amount given is played by Y, the role of the amount to pay by Z, and the role of the change by X. The combinations of roles and subviews "change:X" "amount to pay:Z" and "amount given:Y" serve as role assignments, respectively, and the row of such combinations also serves as a role assignment.

In a set of view definitions that constitutes a role tree, a view which appears as a subview only and does not appear as a view is called a vocabulary view, and a view which appears as a view only and does not appear as a subview is called a top view. A view which is neither a top view nor a vocabulary view is called an intermediate view. A role tree is regarded as a set of paths extending from a top view through intermediate views to vocabulary views.

FIGS. 11(A) through 11(D) are diagrams showing formats that allow view definitions. FIG. 11(A) shows an example in which role assignments can be switched around in order. In the illustrated example, "amount given:Y" and "change:X" are switched around in order.

FIG. 11(B) shows an example in which a view name is duplicated as a pattern name. A view name may be duplicated as a pattern name because a view and a pattern that are described in respective different positions can be identified by their positions. Since views can be distinguished from each other if they are different from each other and a pattern can be distinguished from another pattern if they are different from each other, a view and a pattern may belong to one character string. Roles can also be distinguished even if the same name as roles is used by a view or a pattern.

FIG. 11(C) shows an example in which a role assignment string composed only of role assignments omitting role names including the delimiter symbol ":" is written. In the examples of view definitions shown in FIGS. 11(A) and 11(B), the role names are explicitly indicated, and such a pattern is referred to as a "fixed-length pattern". On the other hand, a pattern with no explicitly indicated role names is referred to as an "indefinite-length pattern". There are only two patterns, i.e., a fixed-length pattern and an indefinite-length pattern, that can be used in role trees. In each processing step, the indefinite-length pattern is automatically assigned a special role (manipulatable by the system only) whose role name is called "ordering role". Inasmuch as the order in which subviews are arranged is automatically caused to correspond to the order in the pattern, an indefinite-length pattern is used for expressing some ordering.

FIG. 11(D) shows an example in which a string of empty role assignments is permitted. As far as an indefinite-length pattern is concerned, a view definition free of any role assignments is permitted, which is called an empty subview.

FIG. 12 is a diagram showing a format in which a view definition is inhibited. In the illustrated example, the role "change" is "X" or "W", and it is inhibited for the same role to be played simultaneously by a plurality of objects.

FIG. 13 is a diagram showing an example of a role tree file. The role tree file is a delimited-word file which is composed of a definition of delimiter symbols at the beginning of the file and a set of view definitions.

FIG. 14 is a diagram showing an example of a format in which a role tree is permitted. The example illustrates a nested representation in which a view content of a pattern name "change calculation" is substituted for one of the subviews in a row. The system solves such a nested representation into a basic form of role tree. In such a case, since an intermediate view name is newly required, a delimiter symbol called a system sharp, e.g., "#", is used to change the nested representation to the basic form.

FIGS. 15(A) through 15(D) are diagrams showing formats in which a role tree is inhibited. There are three conditions to be satisfied for gathering view definitions into a role tree. The first condition is that a double view definition is inhibited as shown in FIG. 15(A). Specifically, there should not be another view definition having the same view as that on the left-hand side of "=" of a view definition, and the uniqueness of a definition view should be maintained.

The second condition for a role tree is that a loop is inhibited as shown in FIG. 15(B). Between a "definition view" on the left-hand side of a view definition and a "subview" appearing on the right-hand side thereof, there is a role path from the definition view to the subview. The role path can be traced in order. For example, there is a role path from the definition view of giving/receiving a payment toward the subview of a situation for calculating change, and there is also a role path from the definition view of giving/ receiving a payment toward a subview X. In such a case, it is said that there is a role path from the definition view of giving/receiving a payment toward the subview X.

If a direction toward a definition view is "upward" and a direction toward a subview is "downward" in a role path, then the loop inhibiting condition is such that any "top view" is necessarily reached when the role path is traced "upward" from any optional subview. A role tree corresponds to the fact that the path is "not looped". A structure in which any paths from a leaf node to a route node are not looped and any intermediate nodes do not overlap each other, is said to be "tree structure" in the art of computer science. A role tree has such a tree structure.

The third condition for a role tree is the uniqueness of a pattern as shown in FIG. 15(C). The same pattern as others can be allocated to another definition view. In such a case, if one pattern is of a fixed-length form, the other has to be of a fixed-length form having the same role, and if one pattern has an indefinite length, then the other has to have an indefinite length.

FIG. 16 is a diagram showing an initial role tree which the first processor generates from an initial document. In FIG. 16, an initial role tree file has a file name "tst.tr1". The initial role tree 32 describes a structure relative to the manner in which user's language expressions are arranged. The user's language expressions are assigned as vocabulary views (names indicating particular individuals) of a role tree.

The commentary statement beginning with the delimiter symbol "✕" is assigned to the position of a role name "content" of a commentary pattern. The conditional statement is converted into a conditional action pattern. The row of characters up to the appearance of the delimiter symbol "→" is assigned to the position of a role name "condition". The row of characters from "{" to "}" is used to write a plurality of statements that are executed when a condition is satisfied. The plurality of statements are converted into the elements of a row of patterns assigned to the position of the role name "content". A row of user's expressions recognized as a part is converted into the elements of a row of patterns assigned to the position of the role name "content" of a partial pattern. The character string sandwiched between "[" and "]" is assigned as a name for this row to the position of a role name "name".

The second processor 33 shown in FIG. 5(A) is composed of a program entitled "decvoc2.exe" that operates under MS-DOS, for example. By executing this program, the second processor 33 transforms the initial role tree 32 to generate a beginning role tree 34 using the set 39 of vocabulary transformation rules. The set 39 of vocabulary transformation rules will be described below.

FIG. 17 is a diagram showing an example of the content of a vocabulary transformation rule file. The vocabulary transformation rule file has a file name "tst.ivr". A row of characters up to a delimiter symbol "▲" represents one rule. The row of characters from the beginning to the delimiter symbol "→" in one rule represents the left-hand side of the rule, and serves as a pre-conditional part. The row of characters from the delimiter symbol "→" to the delimiter symbol "▲" represents the right-hand side of the rule, and serves as a post-conditional part. The row of characters sandwiched between the delimiter symbols "[" and "]", with these delimiter symbols inclusive, represents a variable. The variable as a whole is regarded as a delimiter symbol, and the rows of characters on the left-hand side of the rule, which are separated by the variable, are called keys, respectively. The keys are used as a clue for determining the value of the variable by matching the left-hand side of the rule with the vocabulary view. If the matching is successful, then a certain character string is obtained as the value of the variable. The value of the variable obtained by the matching is substituted in the position of the variable on the right-hand side of the rule, thus generating a character string from the right-hand side of the rule. The generated character string is used as a character string for replacing the vocabulary view.

FIGS. 18 through 21 are flowcharts showing details of a processing sequence of the second processor.

Figure 18:
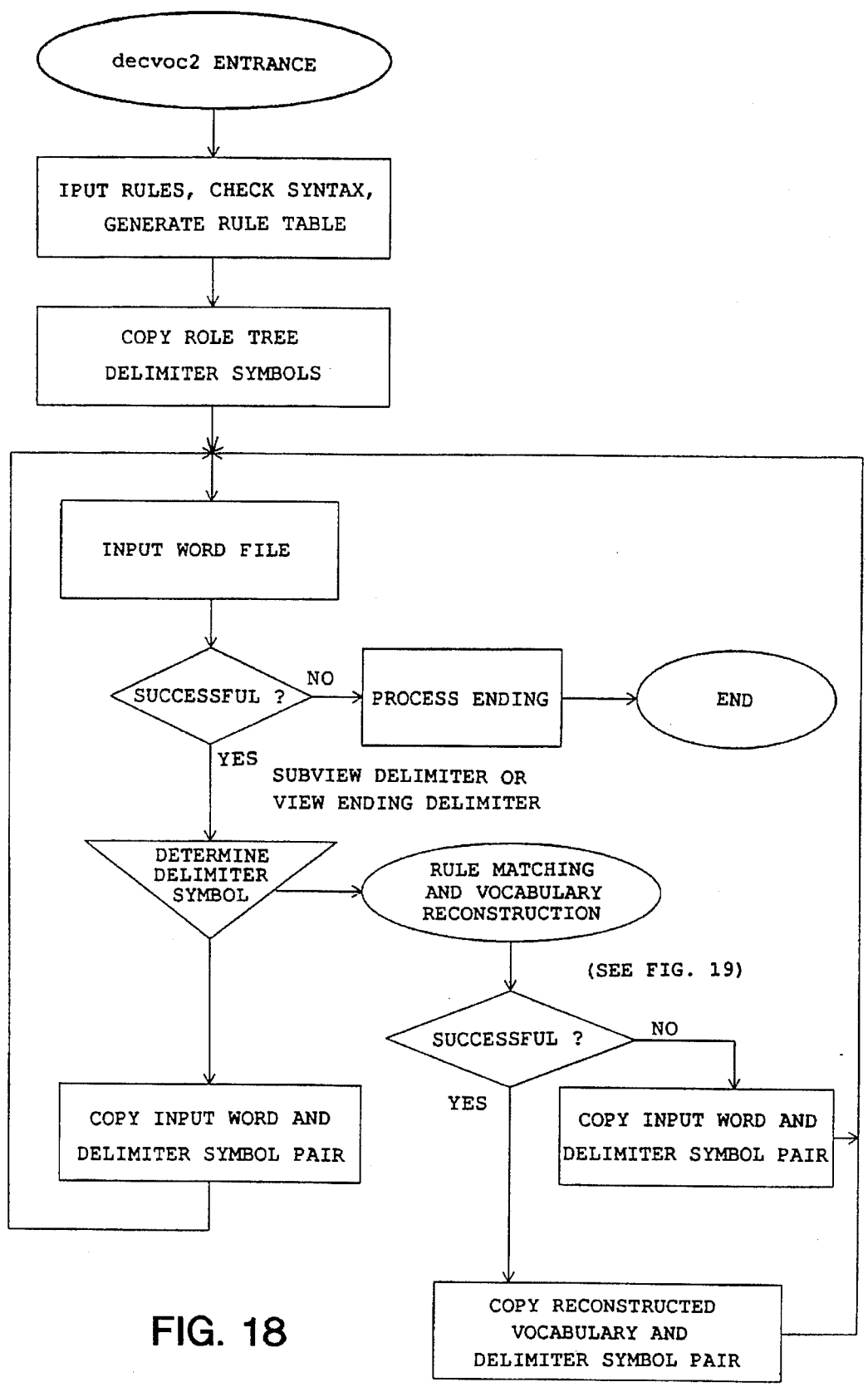
FIG. 18 schematically shows a processing sequence of a second processor.

FIG. 18 schematically shows a processing sequence of the second processor. The second processor 33 searches the initial role tree 32, and each time the second processor 33 finds a vocabulary view, it attempts to apply vocabulary transformation rules. The initial role tree 32 is processed as a set of words (rows of characters separated by delimiter symbols). The second processor 33 successively reads words, determines subviews with delimiter symbols, and apply vocabulary transformation rules to the subviews.

Figure 19:
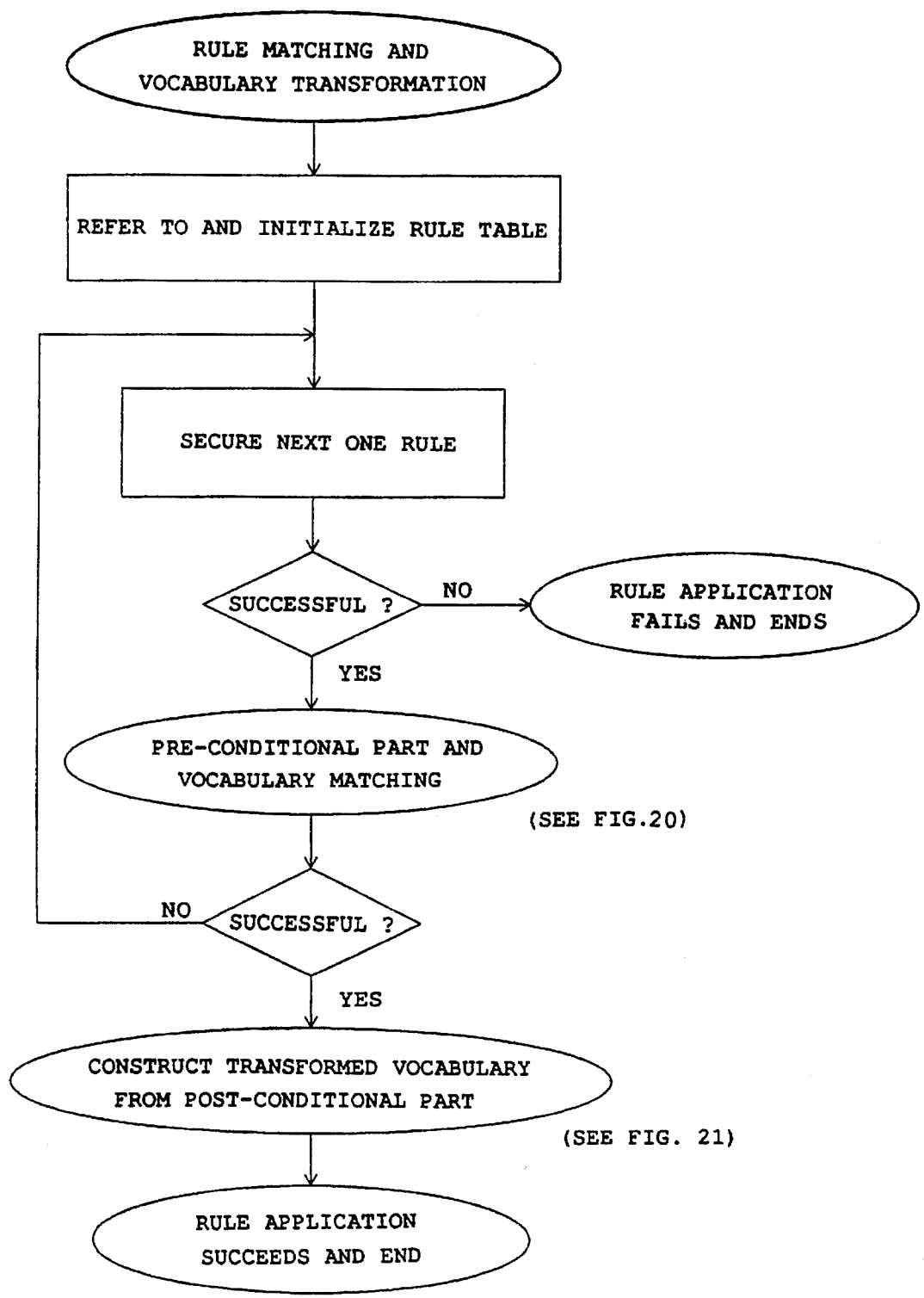
FIG. 19 is a flowchart of a processing sequence of applying rules and transforming a vocabulary.

FIG. 19 is a flowchart of a processing sequence of applying rules and transforming a vocabulary. Each rule is composed of a pre-conditional part and a post-conditional part. The pre-conditional part is applied successively to vocabulary views. If the rule application is successful, then a new vocabulary is generated from the post-conditional part. If the rule application fails, the vocabulary is not rewritten, and is written as it is.

Figure 20:
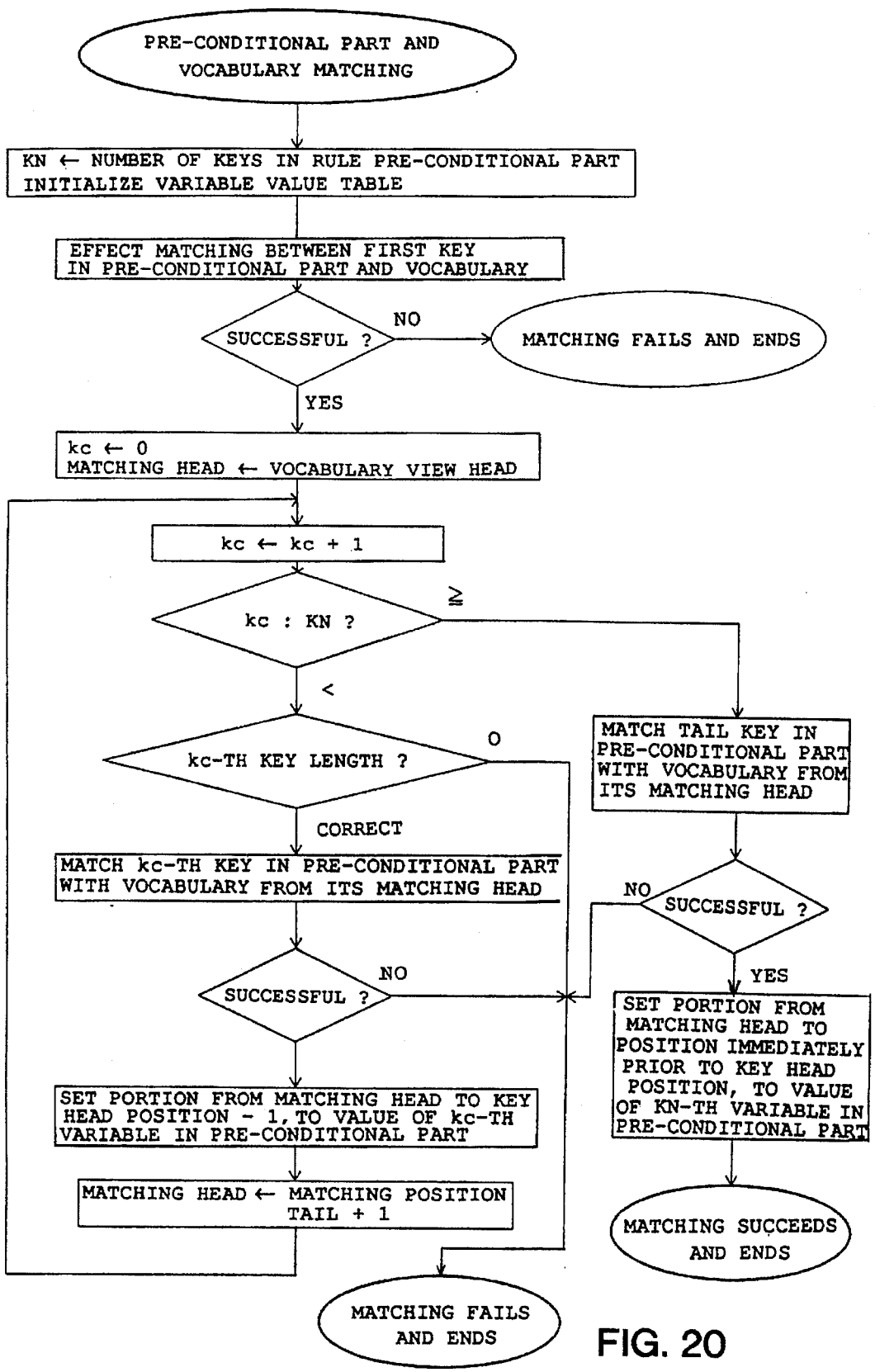
FIG. 20 is a flowchart of a processing sequence for matching a pre-conditional part and a role tree vocabulary.

FIG. 20 is a flowchart of a processing sequence for matching a pre-conditional part and a role tree vocabulary. It is confirmed that keys on the left-hand side of a rule appear in the vocabulary to be matched in the same order as they appear on the left-hand side of the rule. First, the first key on the left-hand side of the rule is matched with the vocabulary, and then the final key (end key) on the left-hand side of the rule is matched with the vocabulary. Thereafter, remaining keys are matched with the vocabulary with respect to a character string that is left in the vocabulary by matching. Each time one key is matched, if the matching is successful, the key is regarded as one delimiter character, and the row of characters on the vocabulary separated by the key is adopted as the value of a variable. Each time a key is matched, a search interval to be matched with a next key is reduced. The matching is successful if all the keys on the left-hand side of the rule appear in the vocabulary in the same order as they appear on the left-hand side of the rule. The matching fails if any of the keys on the left-hand side of the rule is not located on the vocabulary view in the order in which it appears on the left-hand side of the rule.

Figure 21:
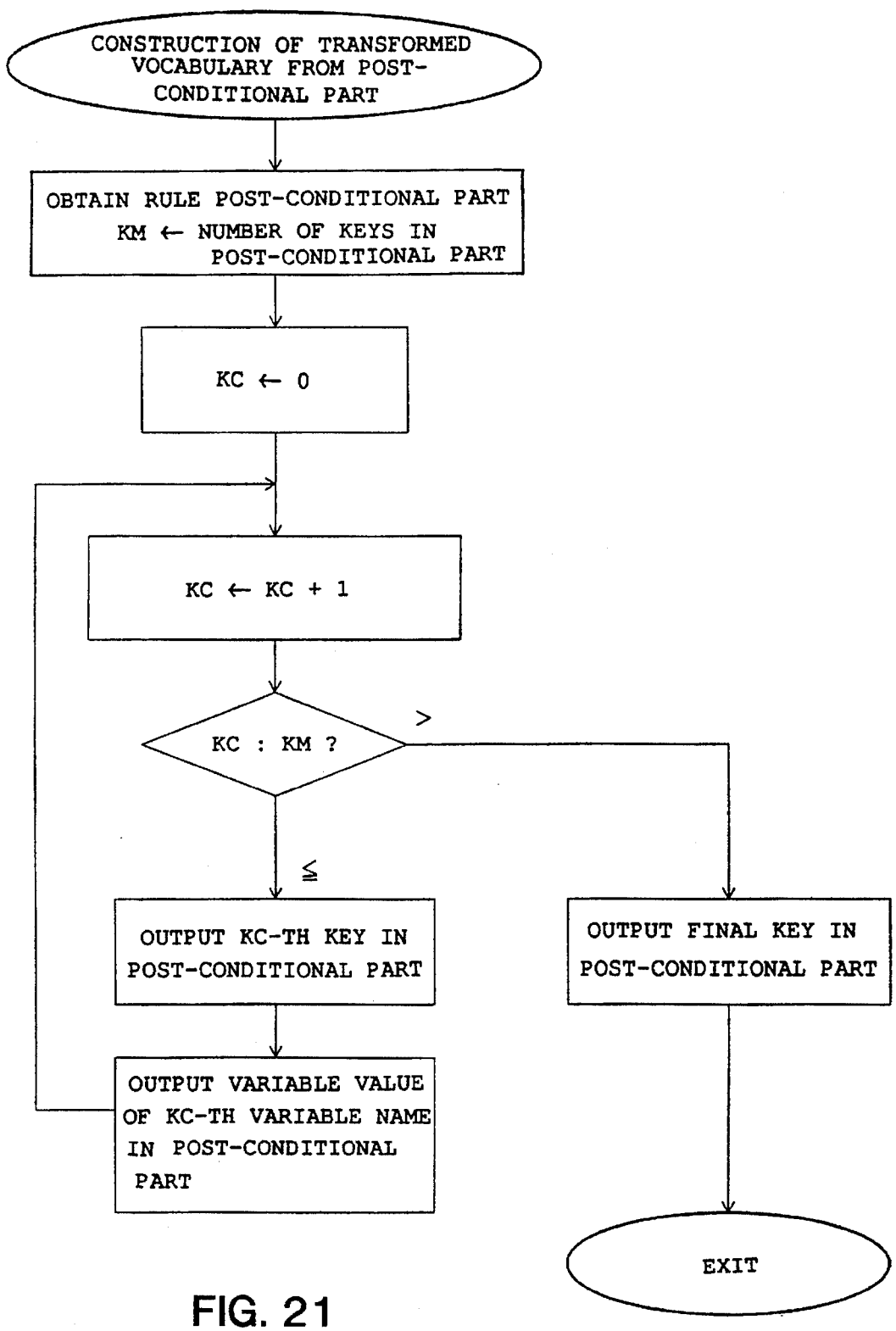
FIG. 21 is a flowchart of a processing sequence for constructing a character string to replace a vocabulary from the post-conditional part of a rule and the value of a variable.

FIG. 21 is a flowchart of a processing sequence for constructing a character string to replace a vocabulary from the post-conditional part of a rule and the value of a variable. The keys of the post-conditional part of the rule and the value of the variable are outputted in the order in which they appear in the post-conditional part, thus constructing a transformation vocabulary. The process is ended when the variable KC exceeds the number of keys of the post-conditional part.

FIG. 22 is a diagram showing the content of a beginning role tree that is generated by the second processor when vocabulary transformation rules are applied to an initial role tree. The beginning role tree has a file name "tst.tr2" By the application of the vocabulary transformation rules, the vocabulary of the initial role tree 32 is detailed on the beginning role tree 34 shown in FIG. 22, as follows:

"RECEIVE CASH IN PAYMENT OF AMOUNT TO PAY" is detailed into "RECEIVE CASH (AMOUNT TO PAY:AMOUNT TO PAY, CASH:CASH)", "RETURN TO GIVING/RECEIVING OF AMOUNT TO PAY" is detailed into "PROCEED (DESTINATION: GIVING/RECEIVING OF AMOUNT TO PAY)", "CASH SMALLER THAN AMOUNT TO PAY" is detailed into "COMPARE AMOUNT (SMALLER:CASH, GREATER:AMOUNT TO PAY)", "BILL FOR SHORTAGE" is detailed into "BILL FOR SHORTAGE (AMOUNT TO PAY:AMOUNT TO PAY, CASH:CASH)", "CASH GREATER THAN AMOUNT TO PAY" is detailed into "COMPARE AMOUNT (GREATER:CASH, SMALLER:AMOUNT TO PAY)", "WRAP AND GIVE ARTICLE" is detailed into "GIVE ARTICLE" (ARTICLE:ARTICLE), "CALCULATE CHANGE AGAINST RECEIVED PAYMENT" is detailed into "CALCULATE CHANGE (RECEIVED AMOUNT:CASH, AMOUNT TO PAY:AMOUNT TO PAY, CHANGE:CHANGE), and "GIVE CHANGE" is detailed into "GIVE CHANGE (CHANGE:CHANGE).

The third processor 35 transforms the beginning role tree 34 into an ending role tree 36, which is a role tree with respect to the computer program source code 38 that corresponds to the second linguistic description, using the set 40 of role tree transformation rules. In order to manage file groups used for transformation, the third processor 35 refers to the transformation control file 43.

FIG. 23 is a diagram showing the content of a transformation control file used for the third processor to generate an ending role tree. The transformation control file has a file name "tst.icn". Following the string of delimiter symbols, the designation of an input role tree file, the designation of an output role tree, and the designation of transformation rule files are defined. In the illustrated example, three files "begin.ru1", "tst.ir1", and "end.ru1" are designated as transformation rule files.

FIG. 24 is a diagram showing a format of role tree transformation rules. In the illustrated example, a portion extending from "{" to "}" constitutes one rule. One rule is composed of a pre-conditional part and a post-conditional part. A portion extending from "{" to "→" constitutes a pre-conditional part. A portion extending from "→" to "}" constitutes a post-conditional part. Both the preconditional part and the post-conditional part are composed of the view definition shown in FIG. 10 or a set of view definitions preceded by the delimiter symbol "~".

The pre-conditional part represents a matching condition. Specifically, a view definition which matches the pre-conditional part is searched for in the role tree. The view definition which matches the pre-conditional part is brought as the value of a matching variable into the post-conditional part. In the post-conditional part, a new view definition is produced based on the value, and "forcibly added" to the role tree. The forced addition is a characteristic nature of the role tree transformation such that a new view definition is added so as to satisfy the basic conditions of the role tree (three conditions of views and a condition for role assignment) and also to give priority to the view definitions to which a new view definition is to be added. When a new view definition is added, an old definition that has become inconvenient is deleted. In the above example, this corresponds to the replacement of the conditional action pattern of the matched view definition with an ifCarry pattern.

A matching variable which is not present in a preconditional part may appear in a post-conditional part. For example, "¥new" shown in FIG. 24 is such a matching variable. In this case, a system sharp is used to automatically generate a totally novel character string (a character string with a system sharp at its beginning).

A variable may be contained in each of a view, a pattern, a role, and a subview which constitute a view definition.

Figure 25A:
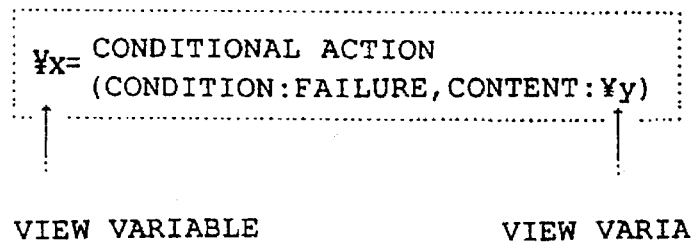
FIGS. 25(A) through 25(D) are diagrams showing various variables that can be contained in role tree transformation rules.
Figure 25B:
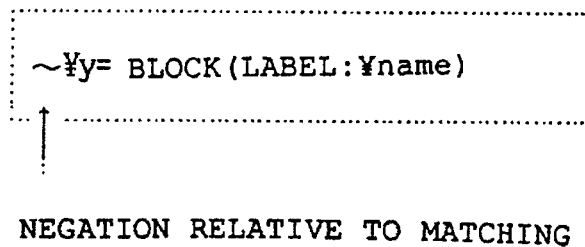

FIGS. 25(A) through 25(D) are diagrams showing various variables that can be contained in role tree transformation rules. In FIGS. 25(A) through 25(D), rows of characters preceded by the symbol "¥", written in the positions of a view name, a role pattern name, a rule name, and a subview name, are variables for matching one value. As shown in FIG. 25(B), the symbol "~" at the beginning of the view name represents "existence negation", i.e., indicates that there is no view definition of ¥y=block (label:¥name). In the description of the post-conditional part, it means deletion.

Figure 25C:
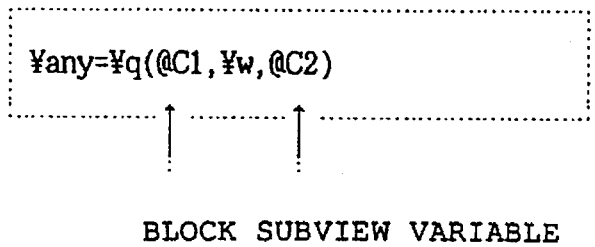

A block variable preceded by the symbol "@" may be placed in the subview. The symbol "@" is a matching variable which takes its value from a row of successive subviews of an indefinite-length pattern. Whereas the variable "¥" matches only one value, the variable "@" matches a cluster of elements in a row. While the variable "¥" can match a view variable, a pattern variable, and a role variable, the variable "@" matches only a row of successive subviews of an indefinite-length pattern. In FIG. 25(C), a row of subviews preceding "¥w" matches "@C1", and a row of subviews following "¥w" matches "@C2". The variable "@" also matches a row of empty subviews.

Figure 25D:
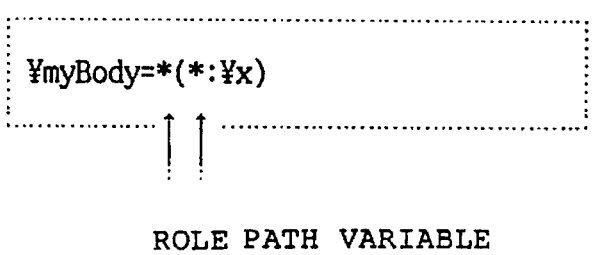

A pattern and a role can simultaneously be represented by "*", and can be handled as a blank variable. The blank variable has its value taken from a path on a role tree which interconnects a view and a subview of the view definition which contains the blank variable. In FIG. 25(D), this corresponds to the condition that "there is a role path from a view "¥myBody" to a view ¥x"".

FIG. 26 is a diagram showing the structure of a role tree transformation rule file. A set of transformation rules is composed of a row of transformation rules. One transformation rule can be matched in a plurality of locations on a role tree. A transformation rule is applied repeatedly to a role tree in order to be matched with all applicable locations on a role tree. If the application fails, a new rule is applied. When there are no longer available any rules to be applied, the application of a set of transformation rules to a role tree comes to an end.

The application of a transformation rule to a role tree is defined as follows: It is assumed that when the matching of all view definitions which constitute the preconditional part of one rule with a role tree is successful, the matching of the pre-conditional part of the rule with the role tree is successful. When the matching of the preconditional part of the rule with the role tree is successful, a partial role tree is constructed from the post-conditional part of the rule, and forcibly added to the role tree.

The matching of one view definition with a role tree is defined as follows: First, the matching of a view definition free of the delimiter symbol "~" with a role tree is defined. When a variable which one view definition of a pre-conditional part has is set to a suitable value, if it is successful to obtain one element of a view definition that constitutes a role tree to be matched, then the matching is assumed to be successful. If it fails to achieve agreement with any view definitions of the role tree, then the matching is unsuccessful. If the matching is successful, then the value established for the matching is determined as the value of the variable at the time of the matching. Then, the matching of a view definition with the delimiter symbol "~" with a role tree is defined. A view definition portion from which the delimiter symbol "~" is removed is taken out, and this view definition is matched with the role tree. If the matching is successful, then the matching of the overall view definition with the delimiter symbol "~" is assumed to be a failure. Conversely, if the matching is unsuccessful, then the matching of the overall view definition with the delimiter symbol "~" is assumed to be a success. In the matching of the view definition with the delimiter symbol "~" the matching process does not determine the value of a variable irrespective of whether the matching is successful or fails.

By substituting the value of the variable determined by the matching of the pre-conditional part for the variable in the post-conditional part, there is constructed a set of view definitions from the post-conditional part. The set of view definitions is added as a portion of the role tree to the role tree. If any view definitions of the post-conditional part do not have the delimiter symbol "~" then a partial tree constructed from the view definitions is added to the role tree. In order to assure that the tree structure of the role tree will not be destroyed by the addition of the set of view definitions and that the addition will always contribute to the transformation of the tree structure, if the addition would destroy restraint conditions to be met by the role tree, then a partial tree which is responsible is deleted from the old role tree, and thereafter the set of view definitions is added. If view definitions of the post-conditional part have the delimiter symbol "~", then the partial role tree constructed from the post-conditional part is deleted from the role tree. That is, the delimiter symbol "~" appearing in the view condition of the post-conditional part represents a negating operation relative to the addition.

FIGS. 27(A) and 27(B) are diagrams showing a first set of rules for generating a program structure applied to a beginning role tree. The role tree transformation rule file has a file name "begin.ru1". The beginning role tree imparts a control flow structure to a structure relative to a row of statements to be described, thus generating a program structure. The transformation rules can be reused as general rewriting rules.

The role tree transformation rules for generating a program structure have 15 delimiter symbols "■=(:,)#{~→} ¥*@_■". The delimiter symbol "■" is a meta delimiter. The delimiter symbols "=(:,)#" are the same as those used in a role tree. Among the remaining delimiter symbols "{~→}¥*@_" are peculiar to these transformation rules.

One unit of transformation rule extends from "{" to "}". A portion extending from "}" to "{" serves as the name of a transformation rule, and is considered here as to be a comment. Anything but the delimiter symbols may be written as the name of a transformation rule. A transformation rule written from "{" to "}" is divided into a pre-conditional part and a post-conditional part by the delimiter symbol "→". A portion of the transformation rule which extends from "{" to "→" serves as a pre-conditional part, and a portion of the transformation rule which extends from "→" to "}" serves as a post-conditional part. They are described in the format of the role tree transformation rules shown in FIG. 24.

FIG. 28 is a diagram showing a second set of rules for describing an implementing procedure applied to a beginning role tree. The role tree transformation rule file has a file name "tst.ir1". A computer operation is caused to correspond to a representation inherent in the problem of a change calculation on a role tree, rewriting the beginning role tree. A cash receiving pattern is realized by the input of a numerical value from a standard input, and billing for a shortage is realized by the output of a numerical value to a standard output. A change calculation is realized by a subtraction, giving a change is realized by the output of a numerical value to a standard output, and giving an article is realized by the indication of characters to a standard output.

FIGS. 29(A) and 29(B) are diagrams showing a third set of rules for describing a process related to refining usage of standard computer program parts applied to a beginning role tree. In FIG. 29(A), the role tree transformation rule file has a file name "end.ru1". Referring to computer program parts written in an object programming language, and supplementing program descriptions (variable preparations, label assignments, etc.) required to refer to computer program parts, the description of computer operation on the role tree is transformed into an ending role tree which describes the structure of a computer program. The transformation rules can be reused as general rewriting rules.

In the illustrated example, there is shown a set of transformation rules for transforming a beginning role tree into an intermediate language for a macro assembler. Rules for converting a beginning role tree into a program description peculiar to a macro assembler are described. For example, rules for replacement with numerical standard inputs for the macro assembler are first described, rules for generating required buffer areas are described, and rules for generating the declaration of variables are described.

FIGS. 30(A) and 30(B) are diagrams showing an ending role tree which the third processor generates from a beginning role tree. The ending role tree file has a file name "tst.tr3". As a result of applying the set 40 of role tree transformation rules to the beginning role tree 34, the third processor 35 obtains a role tree for generating expressions in a macro assembler programming language from the beginning role tree 34.

FIG. 31 is a diagram showing a process of expressing a role tree in the third processor. View conditions which constitute a role tree are tabulated in a role tree table as units each composed of four items, i.e., a view name, a pattern name, a role name, and a subview name, which constitute view conditions. For example, if a view condition is given as "situation to calculate change=change calculation (amount given:Y, amount to pay:Z, change:X)", then the role tree table contains view names, pattern names, role names, and subview names for the three roles "amount given" "amount to pay", and "change".

FIG. 32 is a diagram showing a process of expressing a role tree transformation rule in the third processor. As with the role tree table, a role tree transformation rule table tabulates view conditions which constitute a rule, as units each composed of four items, i.e., a view name, a pattern name, a role name, and a subview name, which constitute view conditions. The role tree transformation rule table also has a set of additional information per unit of four items, the additional information including a matched status recording a matched position at the time a unit of four items is compared with a role tree, a matching condition indicative of whether there is a negating operation "~" relative to a matching/adding process, etc. For example, if the role tree transformation rule is given as "{¥x=conditional action (condition:failure, content:¥y)→¥x=ifCarry(content:¥y, label:¥new)" then the role tree transformation rule table contains two roles "condition", "content" and two roles "content" "label" for pre- and post-conditional parts of the role tree transformation rules, and furthermore information regarding whether there is a negating symbol "~" and a matched status with respect to each of the above four roles.

FIG. 33 is a diagram showing a variable table for holding the values of variables contained in a role tree transformation rule. The variable table holds the variables which a role tree transformation rule contains and the values of the variables as a result of matching, with the variables and their values being held in corresponding relationship to each other.

Figure 34:
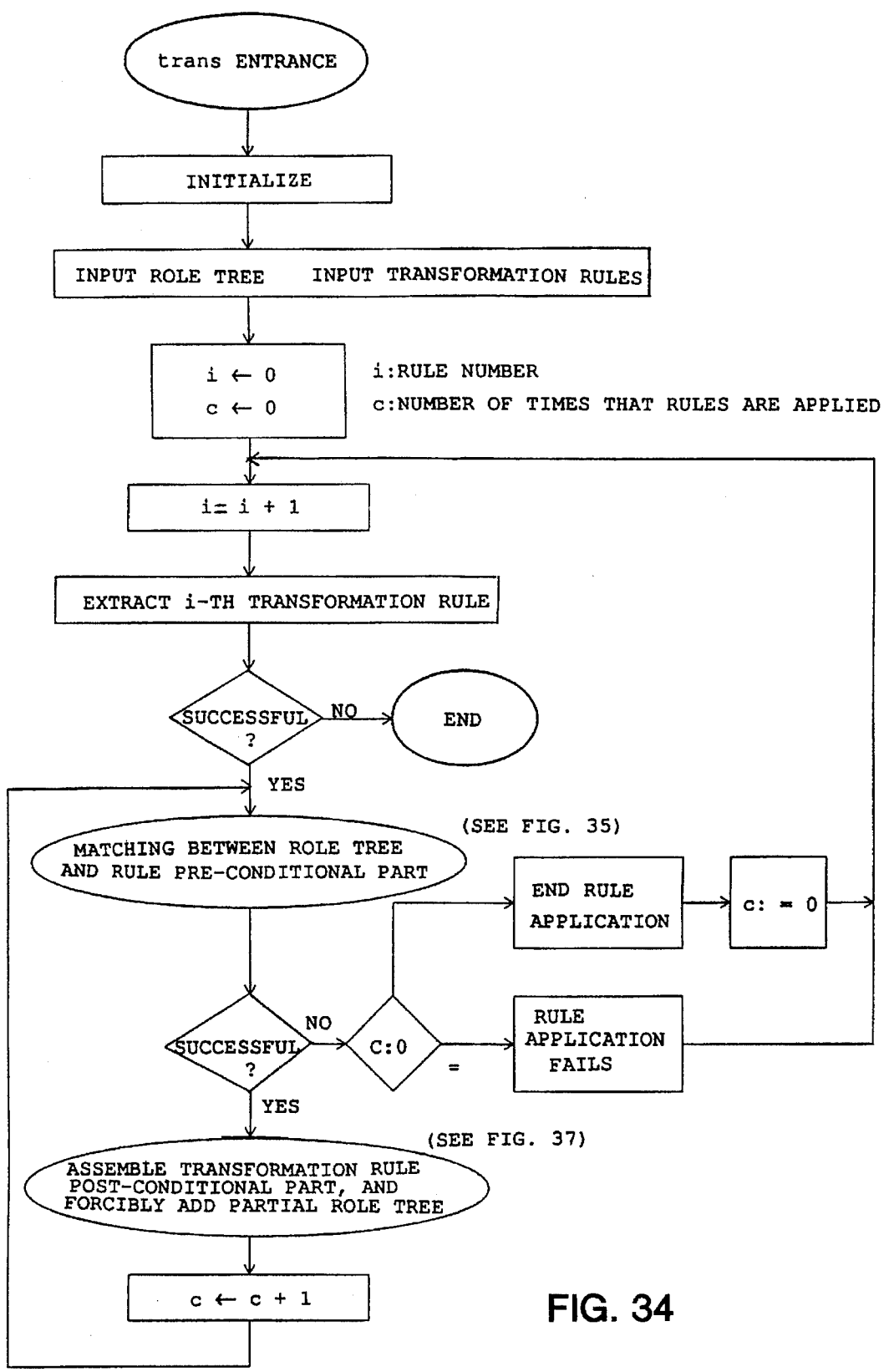
FIG. 34 is a flowchart of a processing sequence of the third processor.

FIG. 34 is a flowchart of a processing sequence of the third processor. The third processor 35 is composed of a program entitled "trans.exe" that operates under MS-DOS, for example. By executing this program, the third processor 35 receives a beginning role tree 34 and generates an ending role tree 36 according to the set 40 of role tree transformation rules.

It is shown in FIG. 34 that when the matching between the pre-conditional part of a rule and a role tree is successful, then a partial role tree constructed from the post-conditional part of the tree is forcibly added to the role tree. The rules are continuously applied insofar as the pre-conditional part is matched with the role tree. If the matching of the pre-conditional part is never successful, then the application of the rules fails.

Figure 35A:
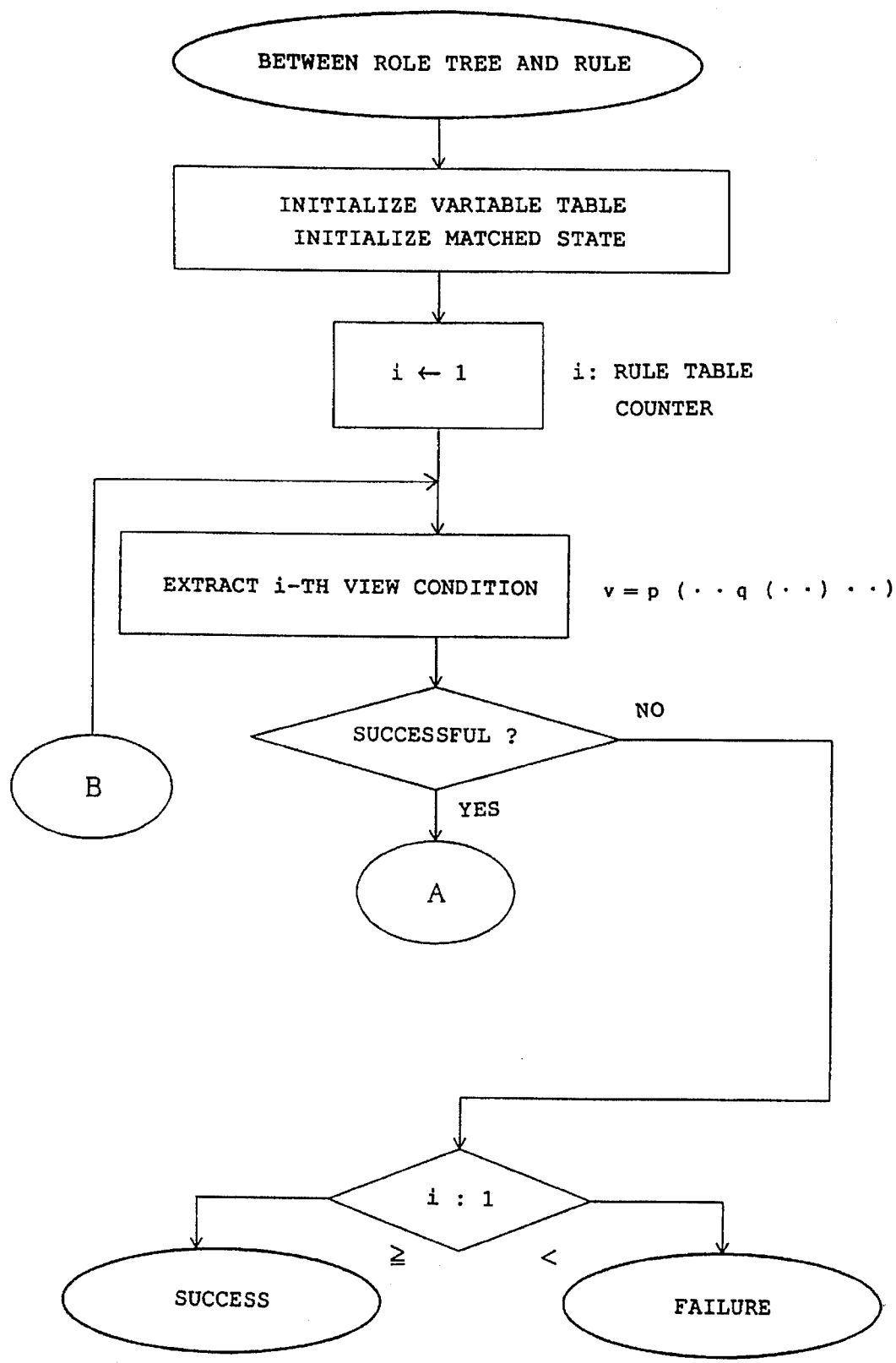
FIG. 35(A) and FIG. 35(B) are flowcharts of a procedure for matching a pre-conditional part.
Figure 35B:
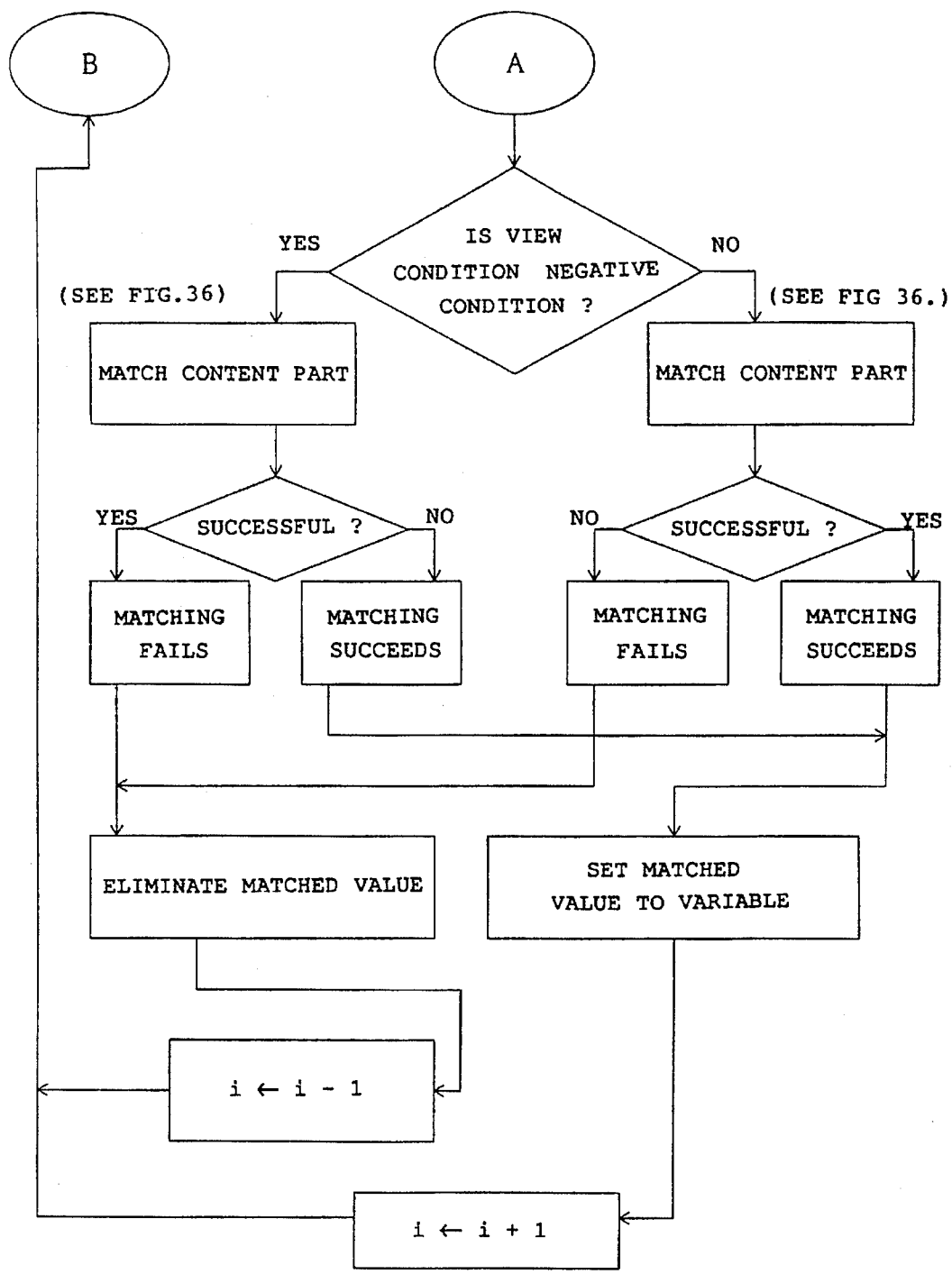

FIG. 35(A) and FIG. 35(B) are flowcharts of a procedure for matching a pre-conditional part. View conditions which constitute a pre-conditional part are matched, one by one, with a role tree. Specifically, prior to a negating operation "~" relative to matching, a view condition and the role tree are first matched, and then the success/failure of the matching is determined based on whether there is a negating operation "~" or not. If the matching between a view condition free of a negating operation "~" and the role tree is successful, then the value of a variable in the pre-conditional part is determined. If the matching of a view condition unit fails, then control returns to a preceding view condition, and the matching is effected again. If the matching of all view conditions is successful, then the matching of the pre-conditional part is successful. If no view condition to return to is available when the matching is to be effected again, then the matching of the pre-conditional part fails.

Figure 36:
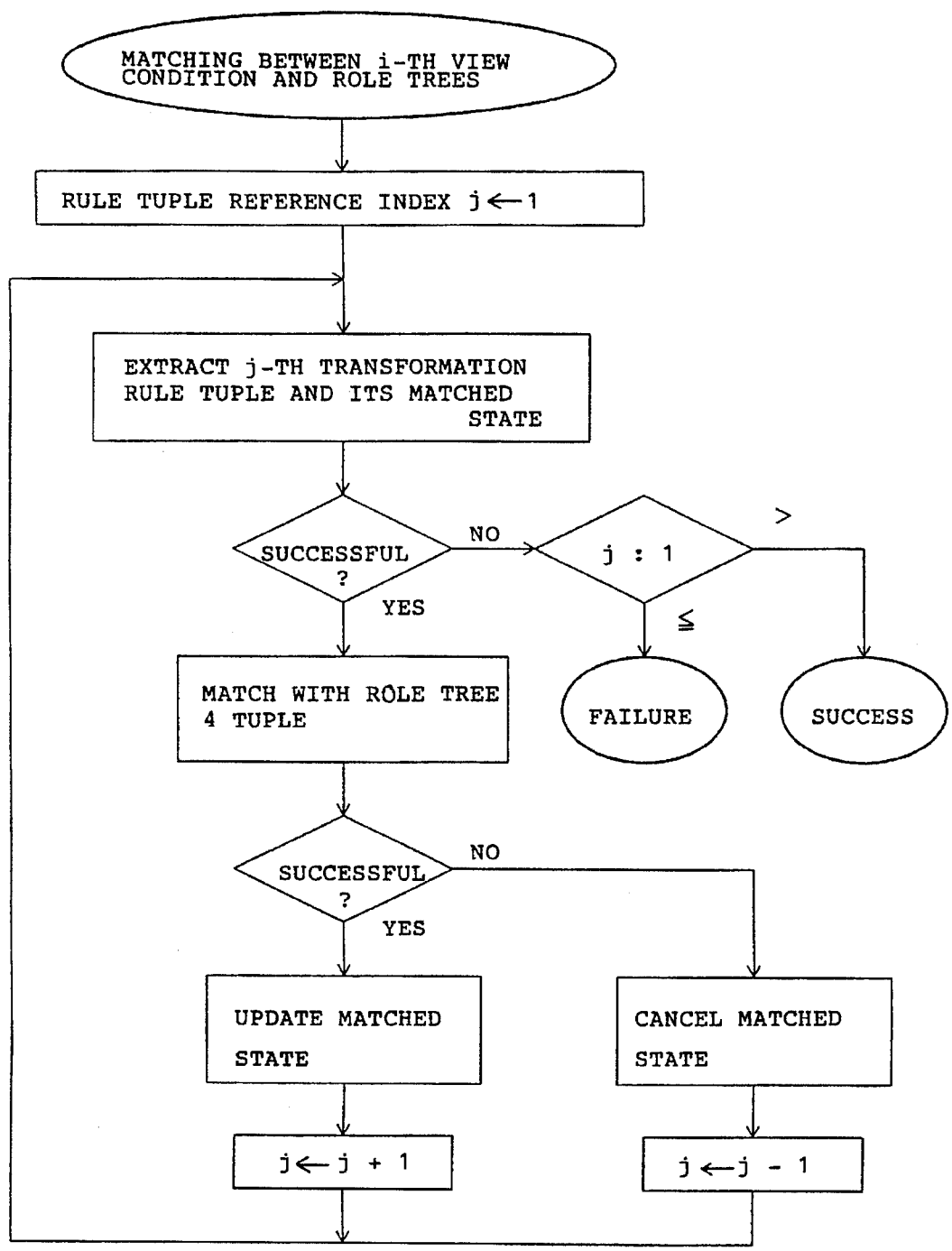
FIG. 36 is a flowchart of a procedure for matching four items which constitute a view condition of a role tree transformation rule with a role tree.

FIG. 36 is a flowchart of a procedure for matching four items which constitute a view condition of a role tree transformation rule with a role tree. Four items (4 tuples) are successively extracted from a designated view condition, and matched with a role tree. If the matching is successful, then the value of a variable is determined, and the position where the matching on the role tree is successful is recorded as a matched status. If the matching between the four items and the role tree is successful, then next four items are extracted for matching. If there are no next four items, i.e., if the matching of all four items is successful, then the matching between the view condition and the role tree is successful. If the matching fails, then the matching is effected again from preceding four items. If preceding four items are not available when the matching is effected again, the matching between the view condition and the role tree fails.

Figure 37:
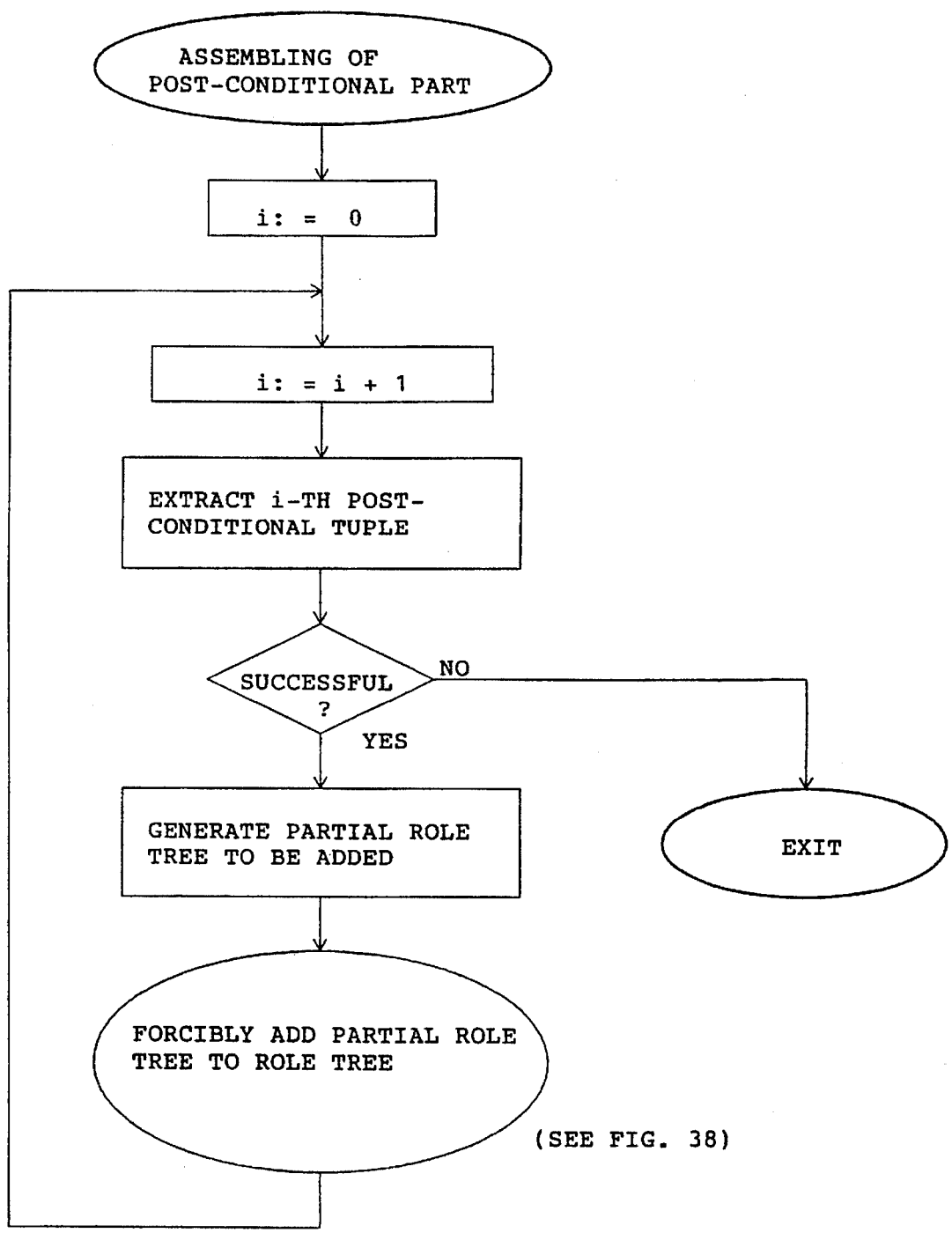
FIG. 37 is a flowchart of a procedure for constructing a partial role tree from the post-conditional part of a role tree transformation rule.

FIG. 37 is a flowchart of a procedure for constructing a partial role tree from the post-conditional part of a role tree transformation rule. Four items which constitute a post-conditional part are extracted, and the value of a variable determined by the matching of a pre-conditional part is substituted. The four items obtained as a result are forcibly added to a role tree.

Figure 38A:
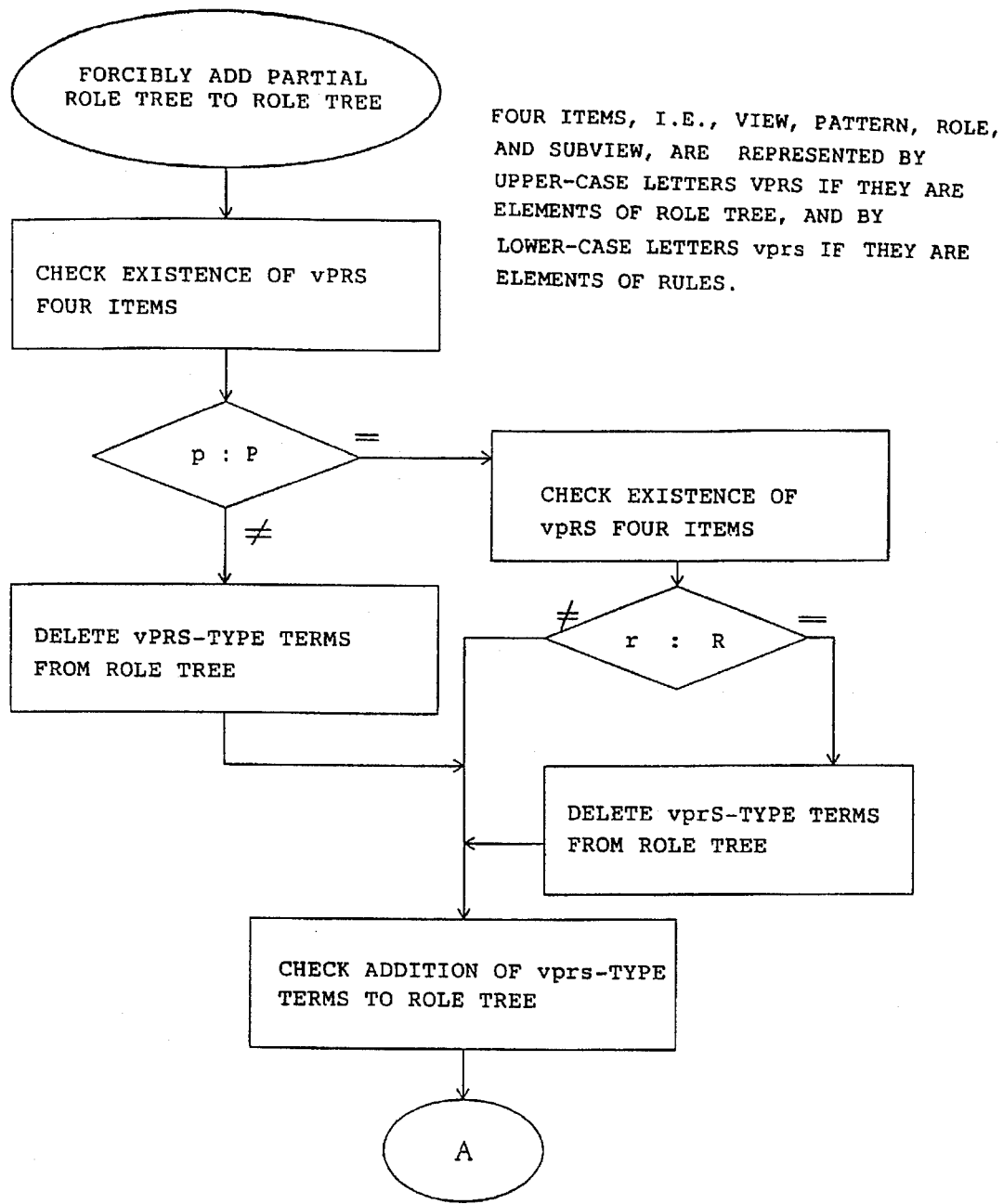
FIG. 38(A) and FIG. 38(B) are flowcharts of a procedure for forcibly adding four items.
Figure 38B:
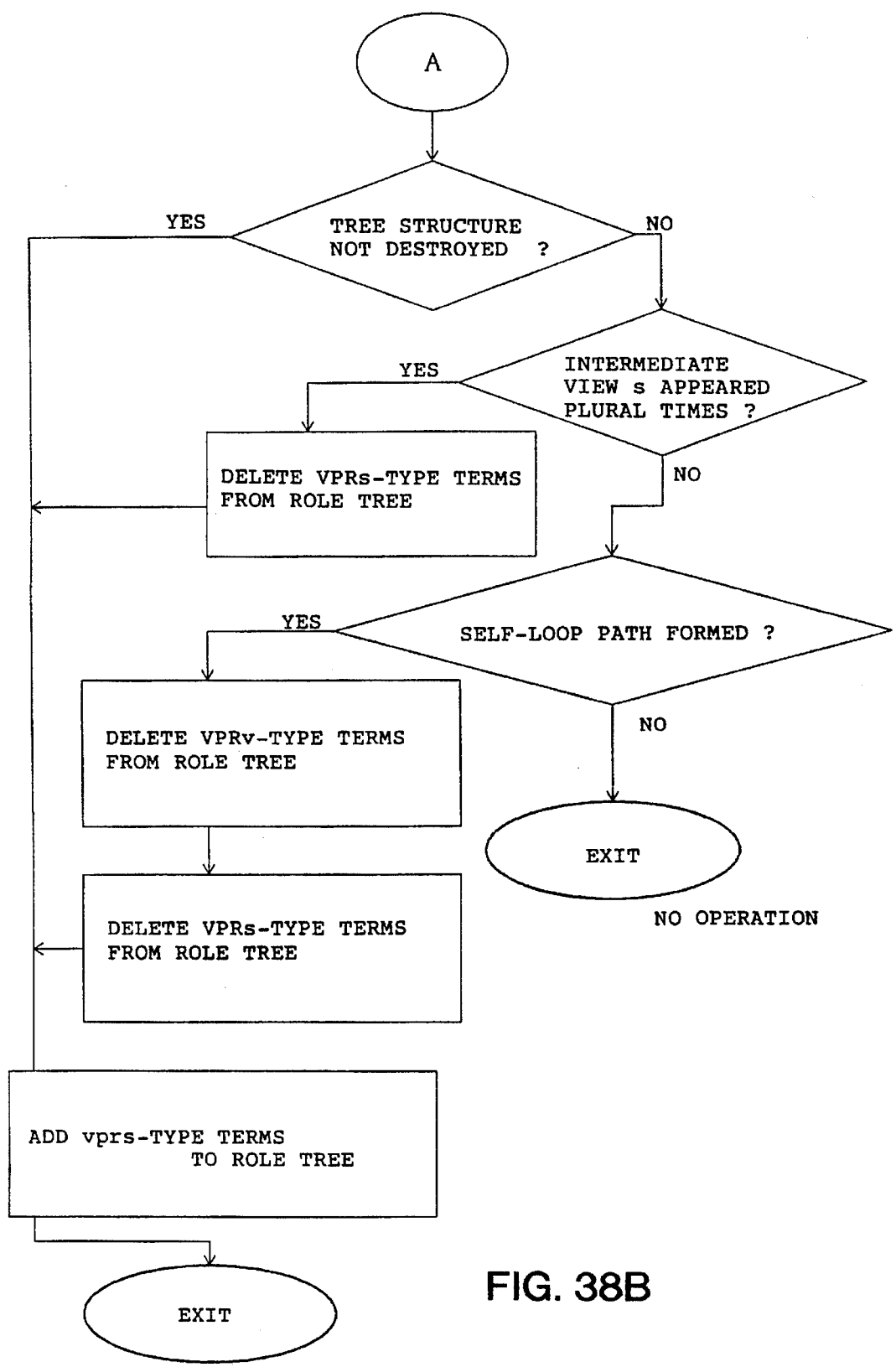

FIG. 38(A) and FIG. 38(B) are flowcharts of a procedure for forcibly adding four items. When the four items are to be forcibly added, they are inserted after confirming that the four items to be added are not contradictory to the role tree. If the four items are contradictory to the role tree, then the old role tree is rewritten to eliminate the contradictory factor, and thereafter the four items are inserted. To simplify a procedure, described below, to eliminate the contradictory factor, four items, i.e., a view, a pattern, a role, and a subview, on the side of the role tree are represented by upper-case letters VPRS, and these four items on the side of the rule are represented by lower-case letters vprs. The generation of a contradictory situation is checked in the order of v→p→r→s.

When the checking process proceeds to vp, it is verified that all the elements vPRS where v=V satisfy p≈P. If successful, then all four items which have vP on the role tree are deleted, and vprs are added.

In the event of a failure, then when the checking process proceeds to vpr, if four items already exist on the role tree which satisfy V=v, P=p, and R=r, then the four items vprS are deleted from the role tree, and then vprs are added. If four items do not exist on the role tree which satisfy V=v, P=p, and R=r, then vprs are added.

Finally, vprs are added. First, it is verified whether the tree structure is destroyed or not for the reasons:
(1) there is formed a path beginning from a subview s, following successive views, and reaching the subview s itself, and
(2) a plurality of intermediate views are produced, as a result of adding vprs. If there is formed a path beginning from a subview s, following successive views, and reaching the subview s itself, then four items in the form of VPRv are deleted from the role tree, then four items in the form of VPRs are deleted from the role tree, and thereafter vprs are added, thus ending the forcible addition process. If a plurality of intermediate views are produced, then the four items in the form of VPRs are deleted from the role tree, and thereafter vprs are added, thus ending the forcible addition process. If the addition process does not destroy the tree structure, then vprs are added, thus ending the forcible addition process.

The fourth processor 37 shown in FIG. 5(C) is composed of a program entitled "showV. exe" that operates under MS-DOS, for example. By executing this program, the fourth processor 37 uses the set 41 of patterns and the set 42 of vocabularies, and generates a computer program source code 38 corresponding to the second linguistic description from the ending role tree 36. The fourth processor 37 uses the top view file 45 in order to designate a partial role tree which is used to generate computer programming linguistic descriptions. For managing a file group used, the fourth processor 37 refers to the expression generation control file 44.

FIG. 39 is a diagram showing the content of an expression generation control file used for the fourth processor to generate computer programming linguistic descriptions from the ending role tree. The expression generation control file has a file name "tst.ish". The expression generation control file 44 has four elements designated, i.e., an input role tree (RoleTree), a role pattern character string (pattern), a vocabulary view character string (voc), a top view (top), and a destination for storing an expression character string (output). For the patterns, there are designated a plurality of files including a set of common-use patterns and a set of individual-use patterns. For the vocabularies, there are designated a plurality of files including a set of common-use vocabularies and a set of individual-use vocabularies.

FIGS. 40 through 43 show sets of role pattern character strings and sets of vocabulary view character strings which are referred to in the expression generation control process. Each of the sets is composed of a set of descriptions that make role pattern names or vocabulary view names correspond to character strings which represent the contents of the names.

FIG. 40 is a diagram showing a set of patterns inherent in problems. The set of patterns has a file name "tst.pat". In the illustrated example, those character strings which are representative of patterns related to the calculation of change are collected from role patterns. Those character strings on the left-hand sides of the delimiter symbols "=" are character strings representing pattern names. Those character strings on the right-hand sides of the delimiter symbols "=" up to the delimiter symbols "▲" are character strings representing the contents of patterns. The delimiter symbol "=" assigns a character string to a role pattern of fixed length. A character string which is sandwiched between "[" and "]" indicates a role name. A character string which is not sandwiched between "[" and "]" describes an inter-object relationship which defines a role. A row of characters separated by a role name sandwiched between "[" and "]" is called a "key". If a key is indicated by k and a role name by r, then a general format of a character string assigned to a fixed-length role pattern is given as:

$$k_1[r_1]k_2 \ldots k_n[r_n]k_{n+1}.$$

To the position of a role name in a role pattern character string, there is assigned a character string representing an object which plays a role represented by the role name. An expression generating procedure for a fixed-length role pattern character string is as follows: An i-th key on a role pattern character string is outputted, then a character string of a subview determined from an i-th role name and the role assignment of a role tree is generated, and a next key position is set to i (i←i+1), after which control returns. Such a process is repeated.

FIG. 41(A) and FIG. 41(B) are diagrams showing a set of common-use patterns by way of example. The set of common-use patterns has a file name "begin.pat". In the illustrated example, those patterns which are related to the expressions of source codes of a macro assembler programming language are collected from role patterns. As with the delimiter symbol "=" the delimiter symbol "→" assigns a character string to a pattern. However, this delimiter symbol assigns a character string to a role pattern of indefinite length. A character string assigned to a role pattern of indefinite length is arranged as assigning a repeated portion successively to subviews. The repeated portion is indicated by sandwiching a repeated character string with delimiter symbols "<", ">", and has a general format of $k_1[r_1]k_2 \ldots k_n[r_n]k_{n+1} > K_1[R_1]K_2 \ldots K_m[R_m]K_{m+1}>$ κ. A character string ahead of the delimiter symbol "<" is referred to as a head, a portion sandwiched between the delimiter symbols "<", "}" as a repeated portion, and κ is called a tail. In a character string assigned to an indefinite-length role pattern, a character string sandwiched between the delimiter symbols "[", "]" does not have a meaning as a role name, but is simply indicative of a position to which a character string generated with respect to a subview is assigned. In an expression generating operation with respect to an indefinite-length role pattern character string, a key output and an expression character string generation with respect to a subview are repeated taking care of the following points: First, since a role name in a role pattern character string does not give a clue to obtain a subview name, a subview name is determined from the side of a role tree. To this end, the position on a role pattern character string and the position on a row of subviews of a role tree are used for determining an output status. Secondly, a key immediately before the delimiter symbols "<", ">" has no subview. Therefore, when a key is outputted at this position, the position of a subview on a role pattern is not updated. Thirdly, a status indicating the generation of a key output immediately before the delimiter symbols "<", ">" is established in order to determine whether a key output is immediately before or after the delimiter symbols "<", ">".

FIG. 42 is a diagram showing a set of vocabularies representative of a collection of object names inherent in problems, by way of example. The set of vocabularies has a file name "tst.voc" In the illustrated example, those character strings which are explanatory of objects related to the calculation of change are collected from vocabulary view character strings. Character strings on the left-hand sides of the delimiter symbols "=" are character strings indicative of view names, and those on the right-hand sides of the delimiter symbols "=" up to the delimiter symbols "▲" are character strings indicative of the contents of views.

FIG. 43 is a diagram showing, by way of example, a set of vocabularies representative of a collection of object names used by a macro assembler program. The set of vocabularies has a file name "end.voc". In the illustrated example, those character strings which are related to the expressions of source codes of a macro assembler programming language are collected from vocabulary view character strings. Although not used in the examples shown in FIGS. 42 and 43, a delimiter symbol "+" is used to indicate a file name which contains vocabulary view character strings.

FIG. 44 is a diagram showing a top view file by way of example. The top view file has a file name "top". A top view designating a partial role tree for generating expressions are described in the top view file 45.

FIG. 45(A) and FIG. 45(B) are diagrams showing, by way of example, computer program linguistic descriptions which are generated from an ending role tree by the fourth processor. A generated source program file has a file name "tst.asm". In FIG. 45(A) and FIG. 45(B), statements beginning with the delimiter symbol "@" indicate reference to a macro. This program can directly be processed by a processing system for a macro assembler of a programing language. It is assumed that a set of macros and an execution-time library of existing parts are separately present as reusable objects.

Figure 46:
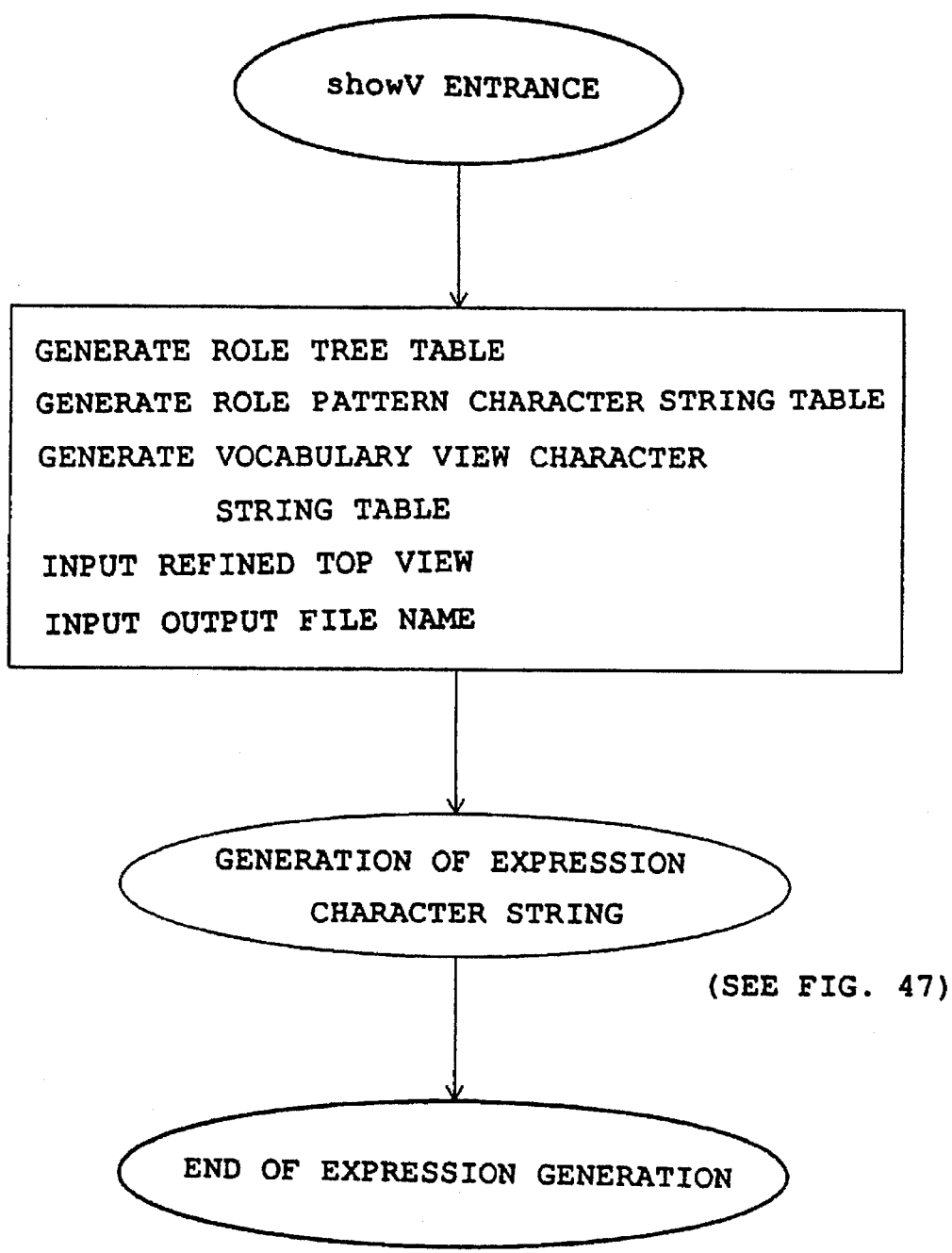
FIG. 46 is a flowchart of a processing sequence of the fourth processor.

FIG. 46 is a flowchart of a processing sequence of the fourth processor. In FIG. 46, an expression generating procedure reads an ending role tree, a set of patterns, a set of vocabularies, a top view, and an output file name, and effects an operation to generate an expression character string in the fourth processor 37.

Figure 47A:
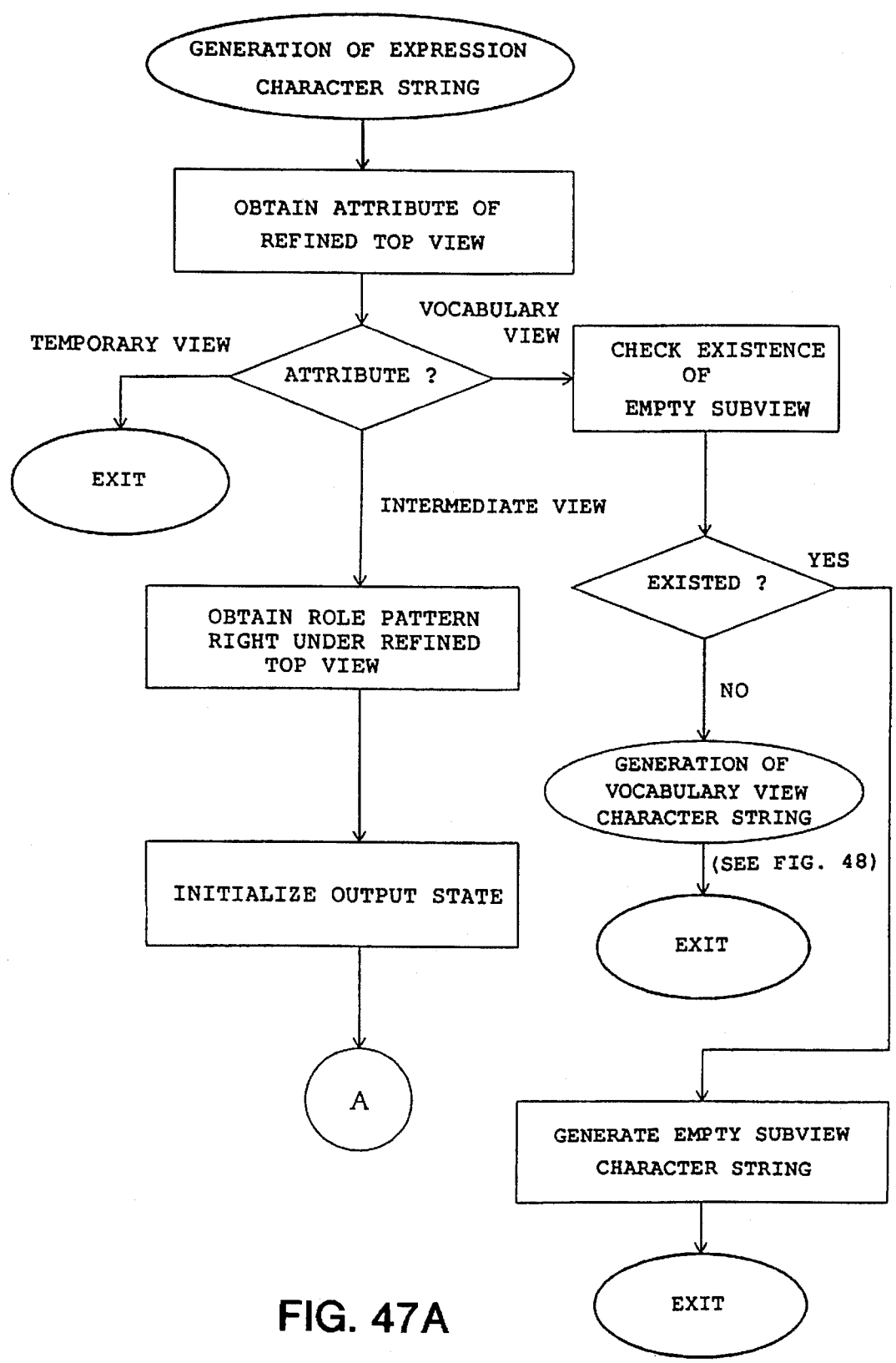
FIG. 47(A) and FIG. 47(B) are flowcharts of a procedure for generating an expression character string.
Figure 47B:
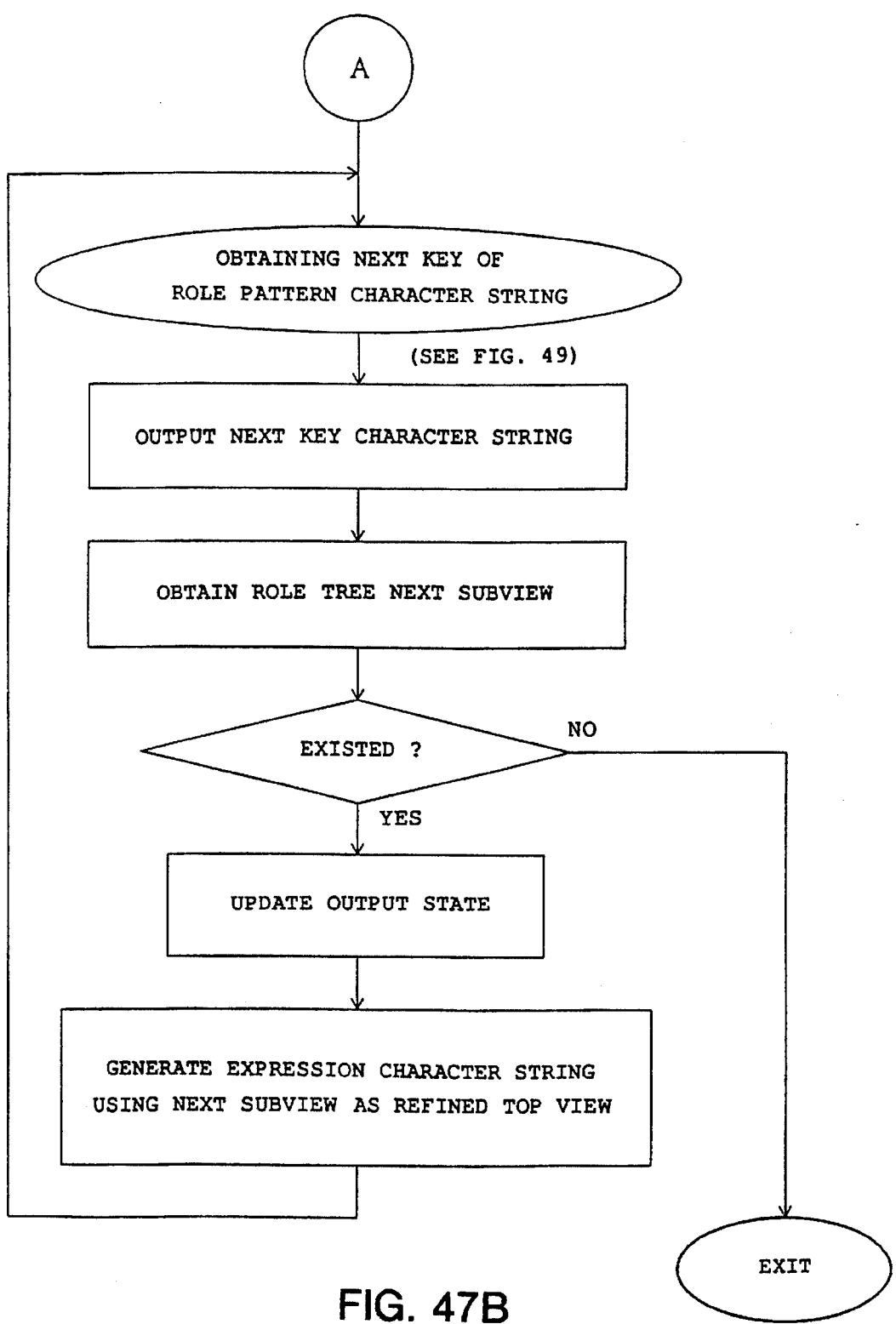

FIG. 47(A) and FIG. 47(B) are flowcharts of a procedure for generating an expression character string. A partial role tree whose expression is to be generated is given as a top view, and the procedure is called. A refined top view is either a view with a subview or a view without a subview. If a refined top view has no subview, then a vocabulary view is present or a succession of indefinite-length role patterns with an empty subview is present. To generate an expression character string, it is checked whether a succession of indefinite-length role patterns with an empty subview is present. If it is, then a procedure for generating an empty-subview character string is called. If it is not, then a procedure for generating a vocabulary view character string is called. If a refined top view has a subview, then keys are successively read from a role pattern character string definition and outputted, and then a character string generated from a subview is outputted, repeatedly until no keys become available. In order to generate an expression character string from a subview, the procedure (itself) for generating an expression character string is applied recursively with a subview as a refined top view.

Figure 48:
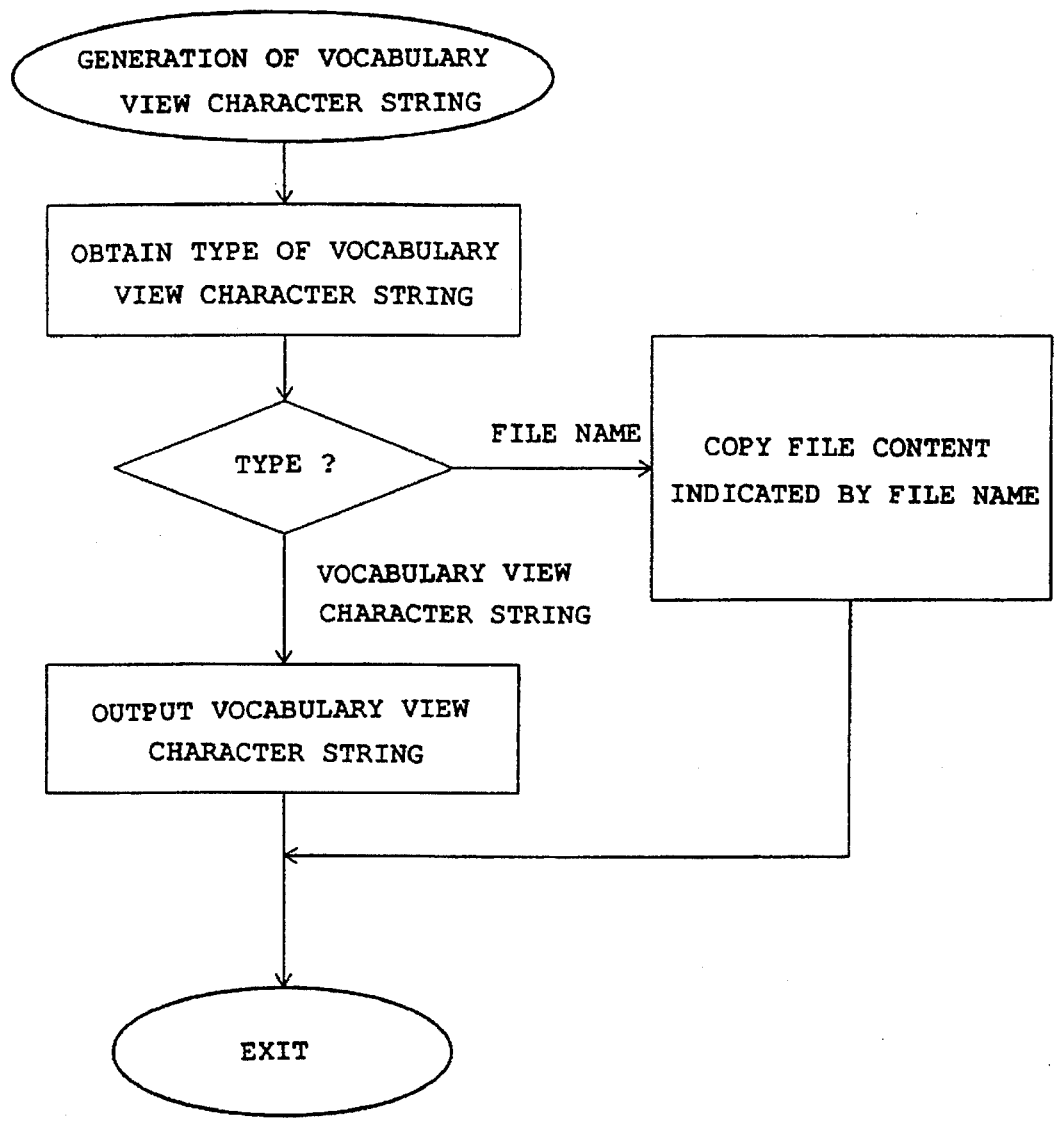
FIG. 48 is a flowchart of a procedure for generating a character string with respect to a vocabulary view.

FIG. 48 is a flowchart of a procedure for generating a character string with respect to a vocabulary view. If a vocabulary view character string is not assigned to the vocabulary view, then a vocabulary view name itself is outputted as a generated character string. If a vocabulary view character string is assigned to the vocabulary view and a delimiter symbol representing a vocabulary view file name is not added, then the vocabulary view character string is outputted. If a vocabulary view character string is assigned to the vocabulary view and a delimiter symbol representing a vocabulary view file name is added, then the content of a vocabulary view file is copied and outputted as the vocabulary view character string.

Figure 49A:
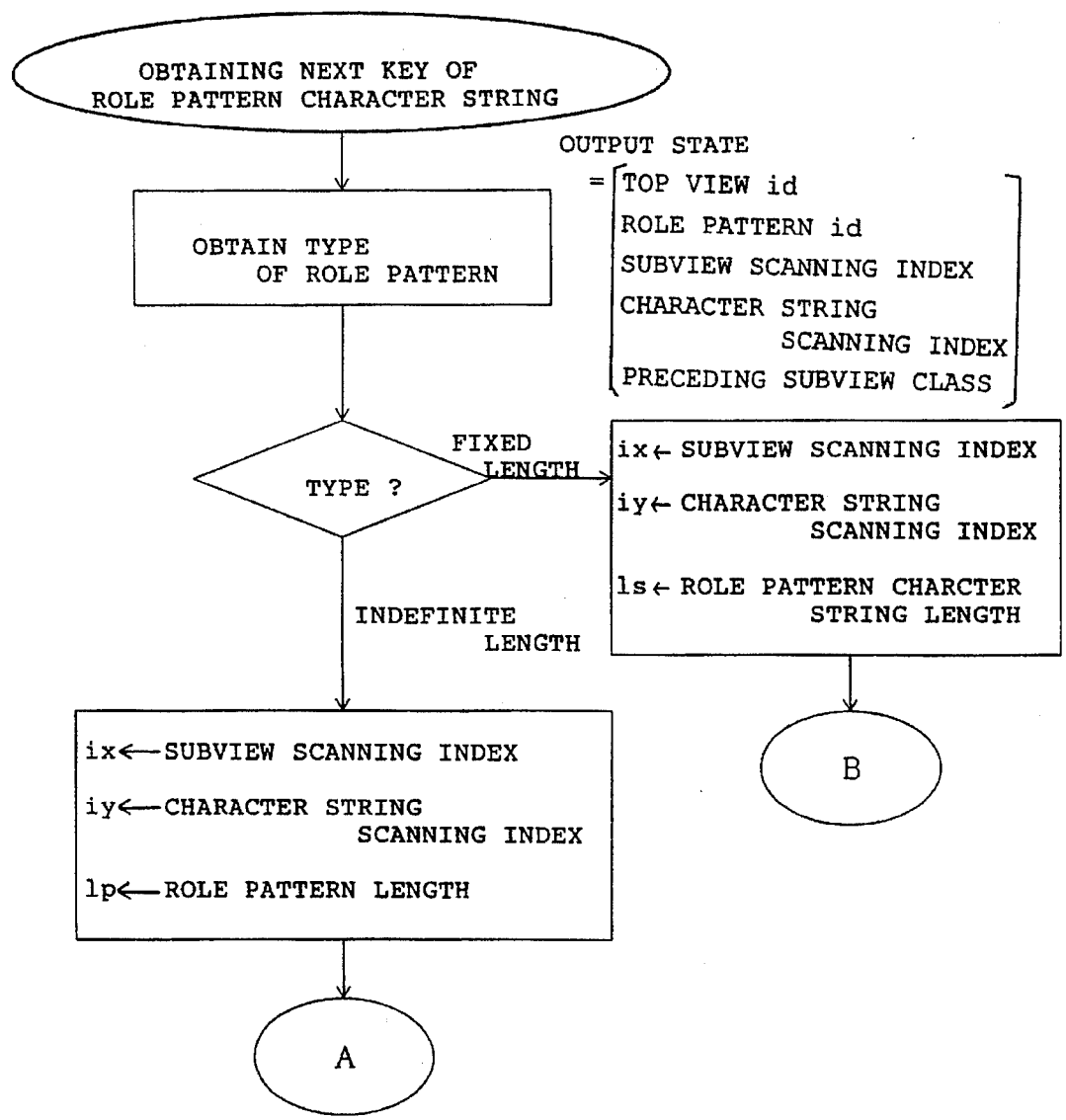
FIG. 49(A), FIG. 49(B) and FIG. 49(C) are flowcharts of a process for successively outputting rows of keys of an intermediate view character string.
Figure 49B:
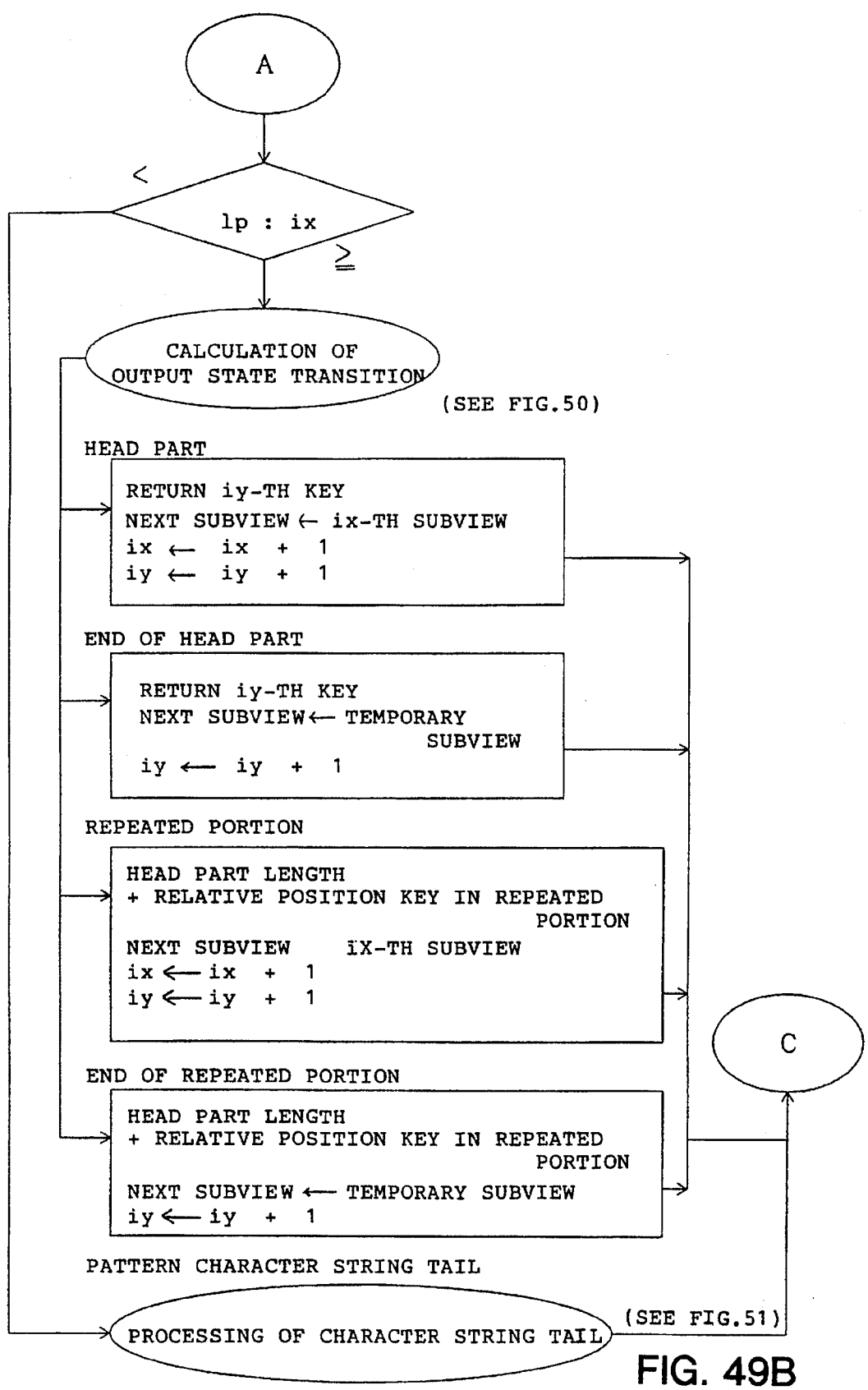
Figure 49C:
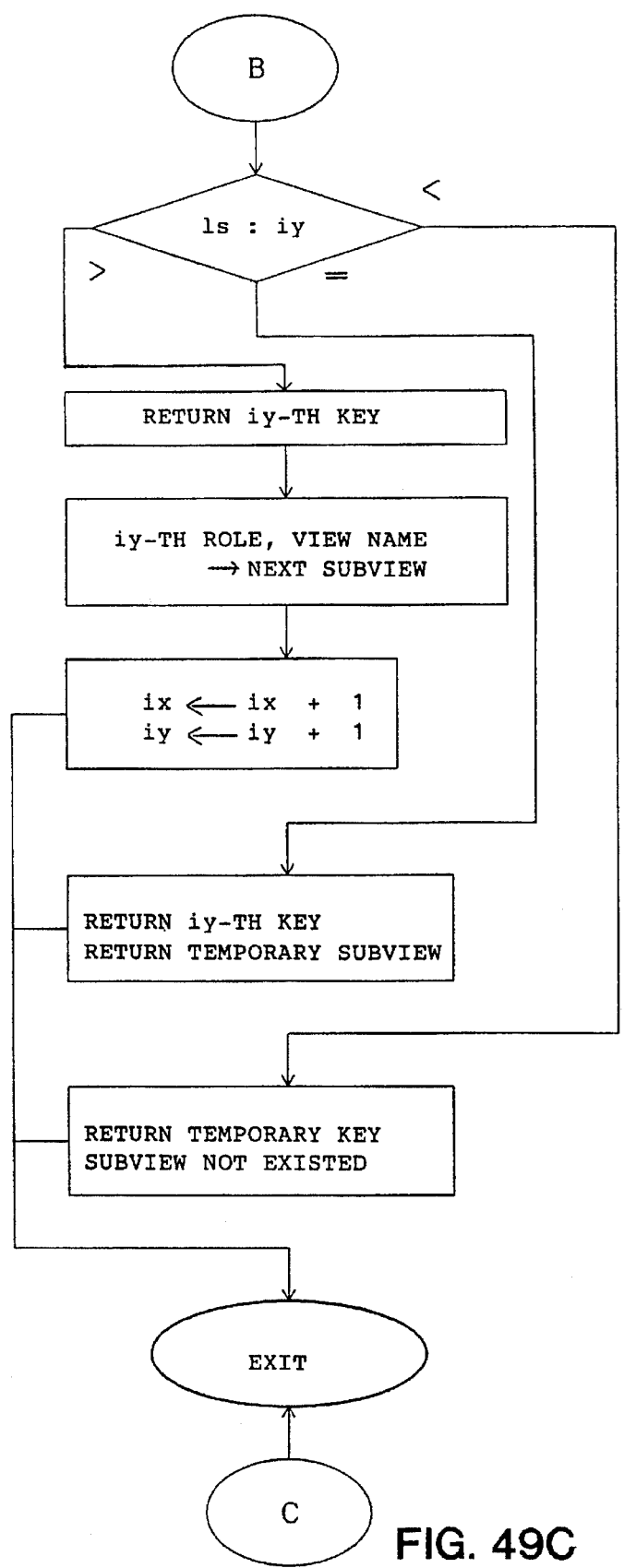

FIG. 49(A) and FIG. 49(B) FIG. 49(C) are flowcharts of a process for successively outputting rows of keys of an intermediate view character string. In order to use a procedure for outputting a character string recursively and to record the position of an outputted key in one role pattern character string, an output status is established per role pattern. At the time the process is called, the output status is initialized to indicate the position of a key to be outputted, with its value updated.

Figure 50A:
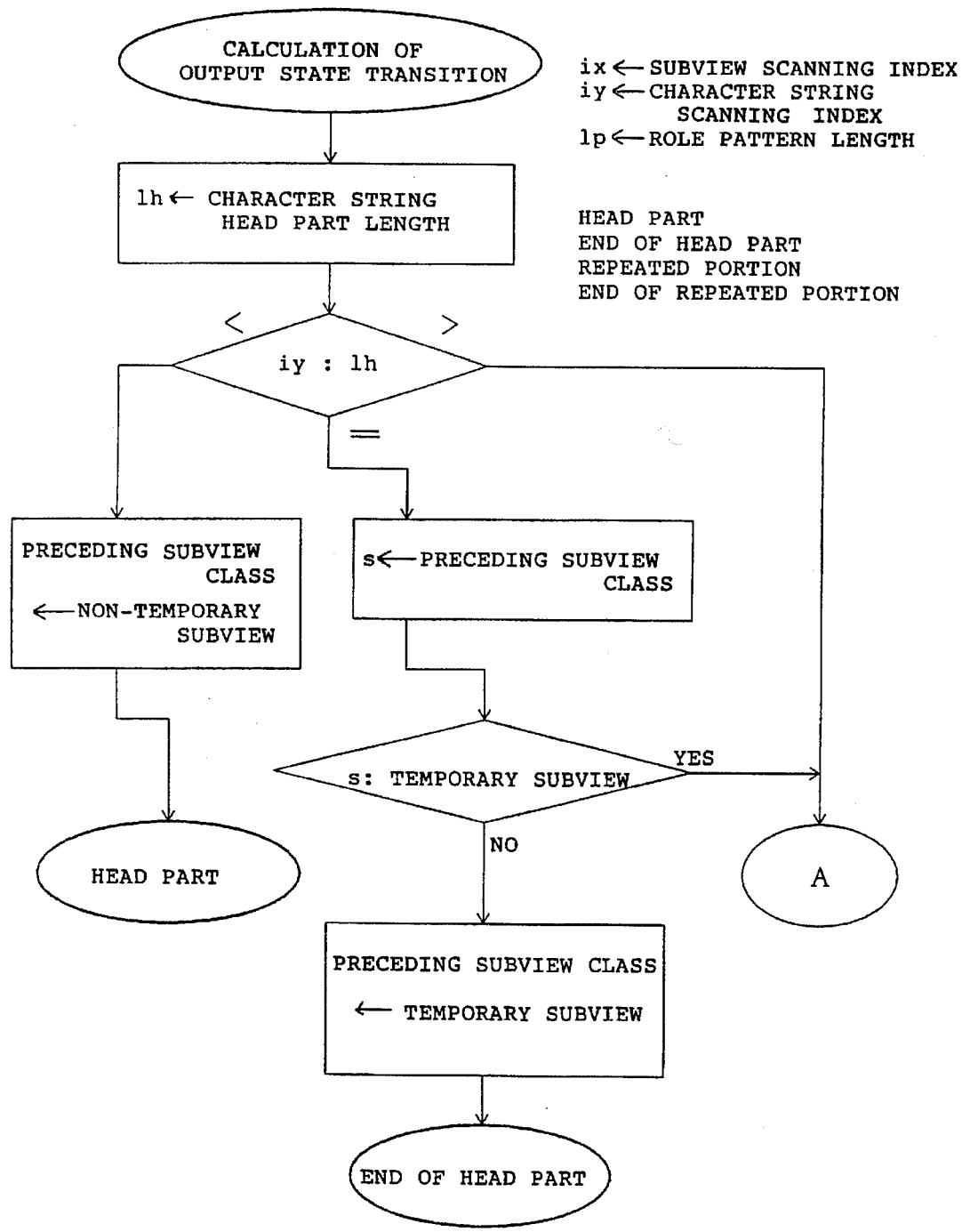
FIG. 50(A) and FIG. 50(B) are flowcharts of a process of determining a relative position in an indefinite-length role pattern character string.
Figure 50B:
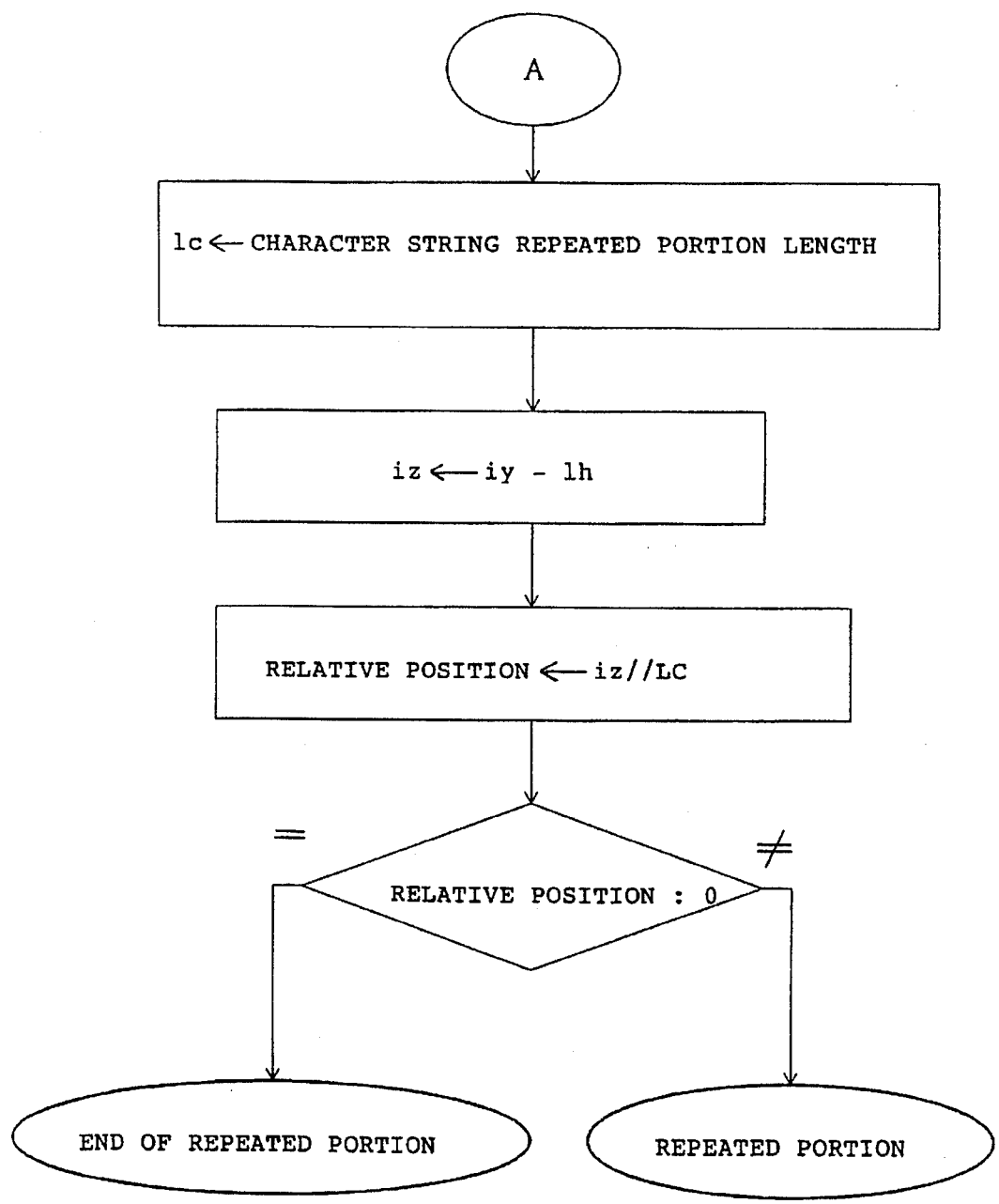

FIG. 50(A) and FIG. 50(B) are flowcharts of a process of determining a relative position in an indefinite-length role pattern character string. Between an order i on a role pattern and a role name position j on a role pattern character string, there are established the following relationships if it is assumed that the number of role names in the head is represented by N, the number of role names in the repeated portion by M, the relative position in the repeated portion by off, and a repetition constant by 1:

$j = N + off$, and $i = N + 1 // M + off$.

For expression generation, a calculation to determine the value of off from i is required. The value of off is determined as the remainder (shown by "//") of an integer division.

Figure 51:
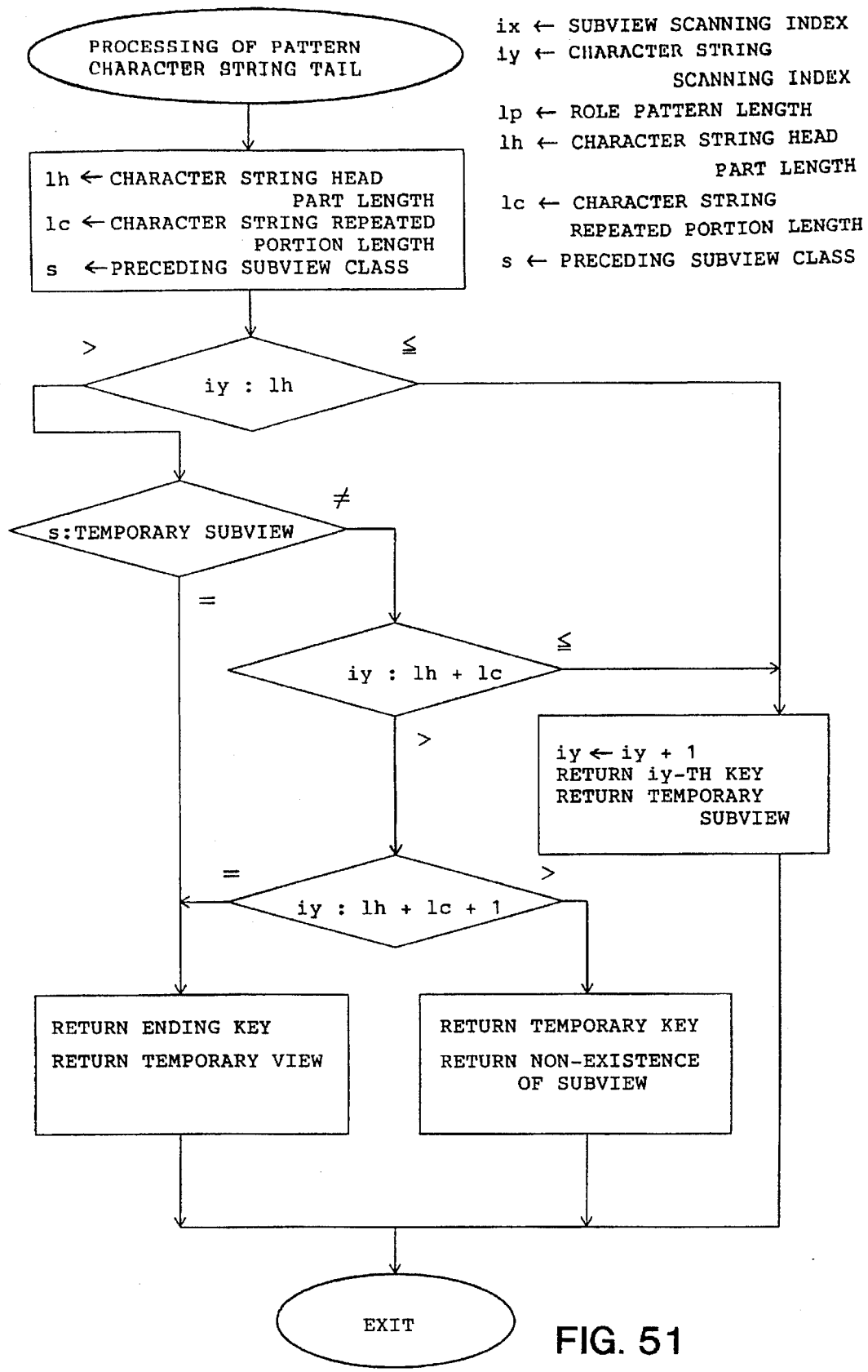
FIG. 51 is a flowchart of a sequence for processing the tail of a pattern character string.

FIG. 51 is a flowchart of a sequence for processing the tail of a pattern character string. The processing sequence shown in FIG. 51 is a subsequent processing sequence when subview strings of a role pattern on the side of a role tree are used up while a role pattern character string is being outputted, in outputting an indefinite-length role pattern character string. If subview strings are used up in the head, then remaining keys in the head are outputted, and the repeated portion is skipped, and tail keys are outputted, whereupon the procedure is finished. If subview strings are used up in the repeated portion, then remaining keys in the repeated portion are outputted, and the tail is outputted, whereupon the procedure is finished.

FIG. 52 is a diagram showing, by way of example, the generation of a multilingual document by changing patterns. In FIG. 52, a role tree is indicated by RT, and a generated result GR1 can be obtained by applying a pattern P1 to the role tree RT. Another generated result GR2 can be obtained by applying a pattern P2 to the same role tree RT. A generated result GR3 can be obtained by applying a pattern P3 to the role tree RT. A generated result GR4 can be obtained by applying a pattern P4 to the role tree RT. A generated result GR5 can be obtained by applying a pattern P5 to the role tree RT. In this manner, various language documents can be generated from the same pattern simply by changing patterns, i.e., the role tree can be reused.

A delimiter symbol identifying process capable of identifying a different delimiter symbol for each input data item, i.e., identifying a delimiter symbol in a delimited-word file which does not depend on a processing system, when data to be processed by a computer are structured, stored, and referred to, will be described below with respect to the extraction of a referred-to statement as an example.

With respect to a data structure (data generated based on certain regulations) to be processed by a computer, program source codes, etc., the structural relationship between elements of the data can be identified by inserting delimiters between the elements for judging a character string of a source code, for example, as one analytic unit.

Generally, delimiter symbols are determined for each processing system to which a certain program language or a data structure corresponds. It is necessary to identify delimiter symbols inherent in each processing system without depending on the processing system.

Figure 53:
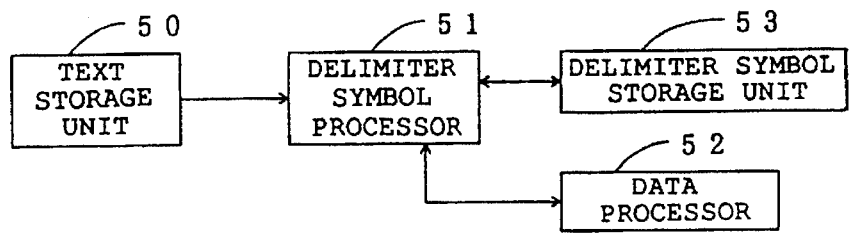
FIG. 53 is a diagram showing the principles of a means for identifying delimiter symbols.

FIG. 53 is a diagram showing the principles of a means for identifying delimiter symbols. In FIG. 53, the means for identifying delimiter symbols comprises a text storage unit 50, a delimiter symbol processor 51, a data processor 52, and a delimiter symbol storage unit 53.

The text storage unit 50 stores texts structured by inserted delimiter symbols for identifying certain data portion from other data portions, and a delimiter definition part positioned at the beginning of the texts and including extracted delimiter symbols used in the texts, in a program source code or computer data to be processed by a program.

Figure 54:
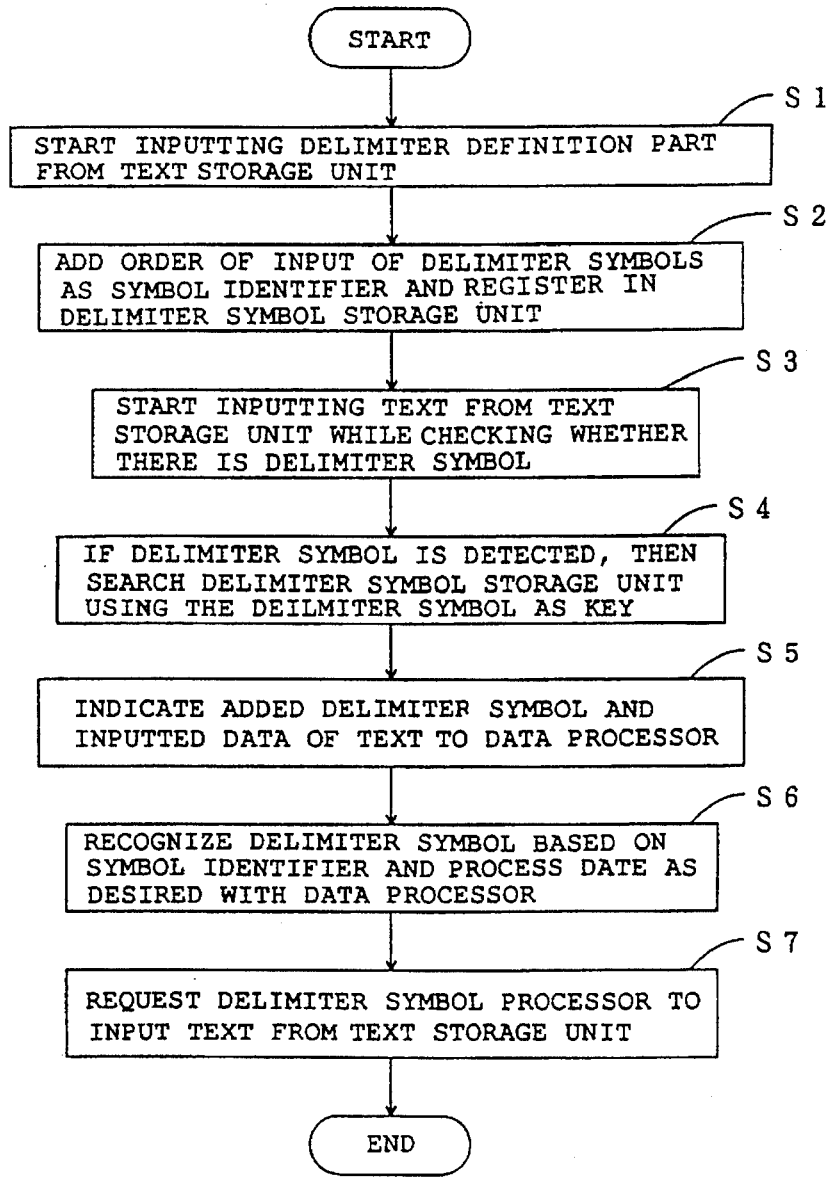
FIG. 54 is a flowchart of a process of processing delimiter symbols.

FIG. 54 is a flowchart of a process of processing delimiter symbols. The delimiter symbol processor 51 starts being supplied with delimiter symbols of the delimiter definition part from the text storage unit 50 in a processing step S1, and registers the order of supply of the supplied delimiter symbols as a symbol identifier, as added to the delimiter symbols, in the delimiter symbol storage unit 53 in a processing step S2. Then, the delimiter symbol processor 51 starts being supplied with a text from the text storage unit 50 while checking whether there is a delimiter symbol or not in a processing step S3. When the delimiter symbol processor 51 detects a delimiter symbol while being supplied with the text, the delimiter symbol processor 51 searches the delimiter symbol storage unit 53 using the detected delimiter symbol as a key in a processing step S4. In a processing step S5, the delimiter symbol processor 51 sends the symbol identifier added to the detected delimiter symbol and the data of the text which has been supplied until the detected delimiter symbol appears, to the data processor 52. The data processor 52 recognizes the delimiter symbol based on the symbol identifier, and processes the data as desired in a processing step S6. If the supply of a next text is desired, the data processor 52 requests the delimiter symbol processor 51 to be supplied with the next text from the text storage unit 50 in a processing step S7.

Therefore, for reading a signal train composed only of delimiter symbols held by the delimiter definition part from the delimiter symbol storage unit 53, the delimiter symbol processor 51 reads the signal train together with the order of supply as a symbol identifier. When the supply of a text from the delimiter symbol storage unit 53 is started, the delimiter symbol processor 51 sends the data of the text which has been supplied until a delimiter symbol appears and the symbol identifier of the delimiter symbol to the data processor 52, which processes the supplied data based on the symbol identifier sent thereto. Accordingly, it is possible to identify delimiter symbols even if different delimiter symbols are used in connection with respective texts.

Figure 55:
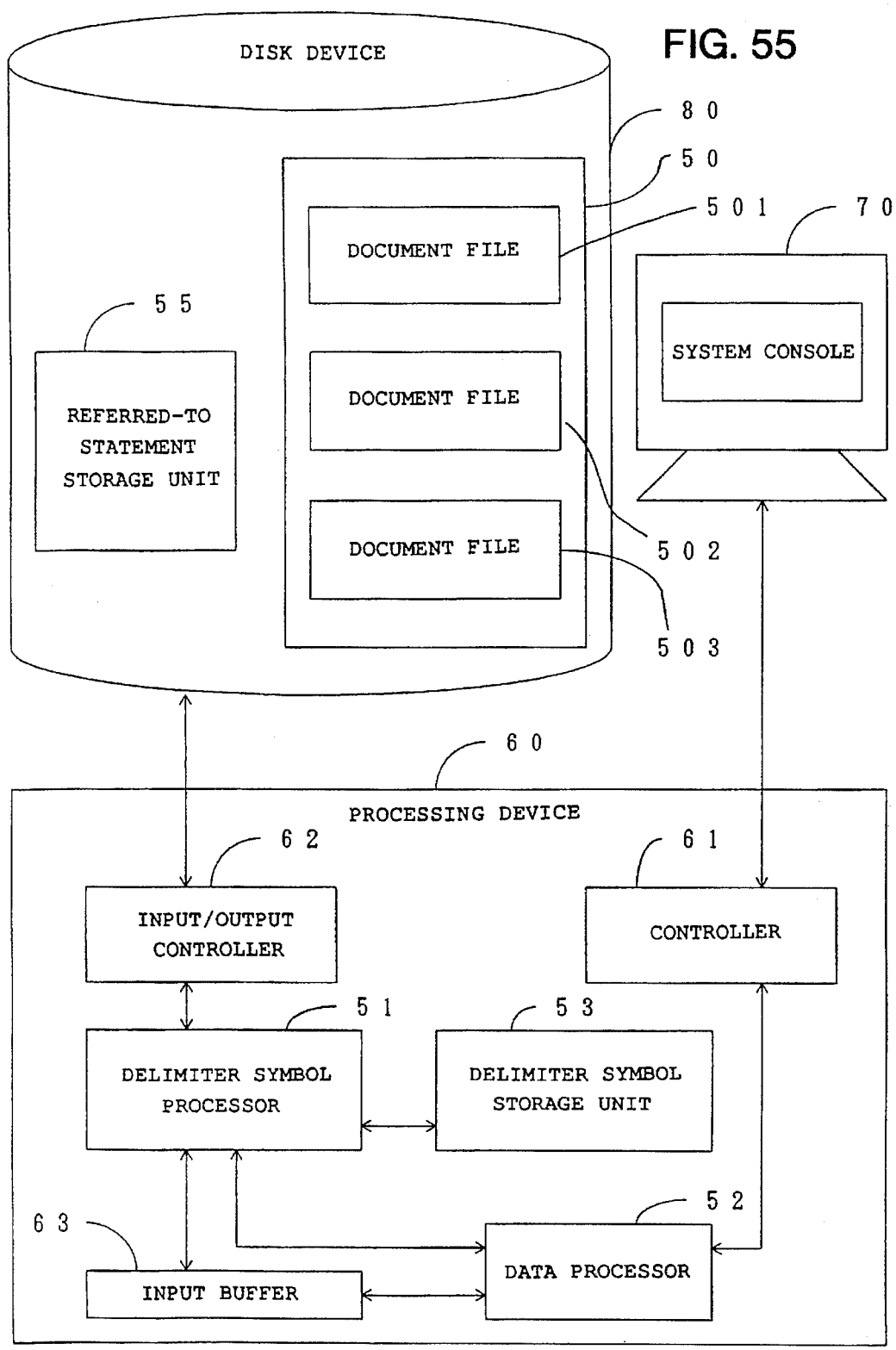
FIG. 55 is a diagram of a system for processing data including delimiter symbols.

FIG. 55 is a diagram of a system for processing data including delimiter symbols. The data processing system shown in FIG. 55 comprises a processing device 60, a system console 70 having a display unit with inputting and outputting capabilities, and a disk device 80 having a text storage unit 50 which stores document files 501, 502, 503 and a referred-to statement storage unit 55. The processing device 60 comprises a controller 61, an input/output control unit 62, a delimiter symbol processor 51, a data processor 52, a delimiter symbol storage unit 53, and an input buffer 63.

The controller 61 has a function to control an operating system, and the input/output control unit 62 controls the disk device 80 to read and write data.

Figure 56:
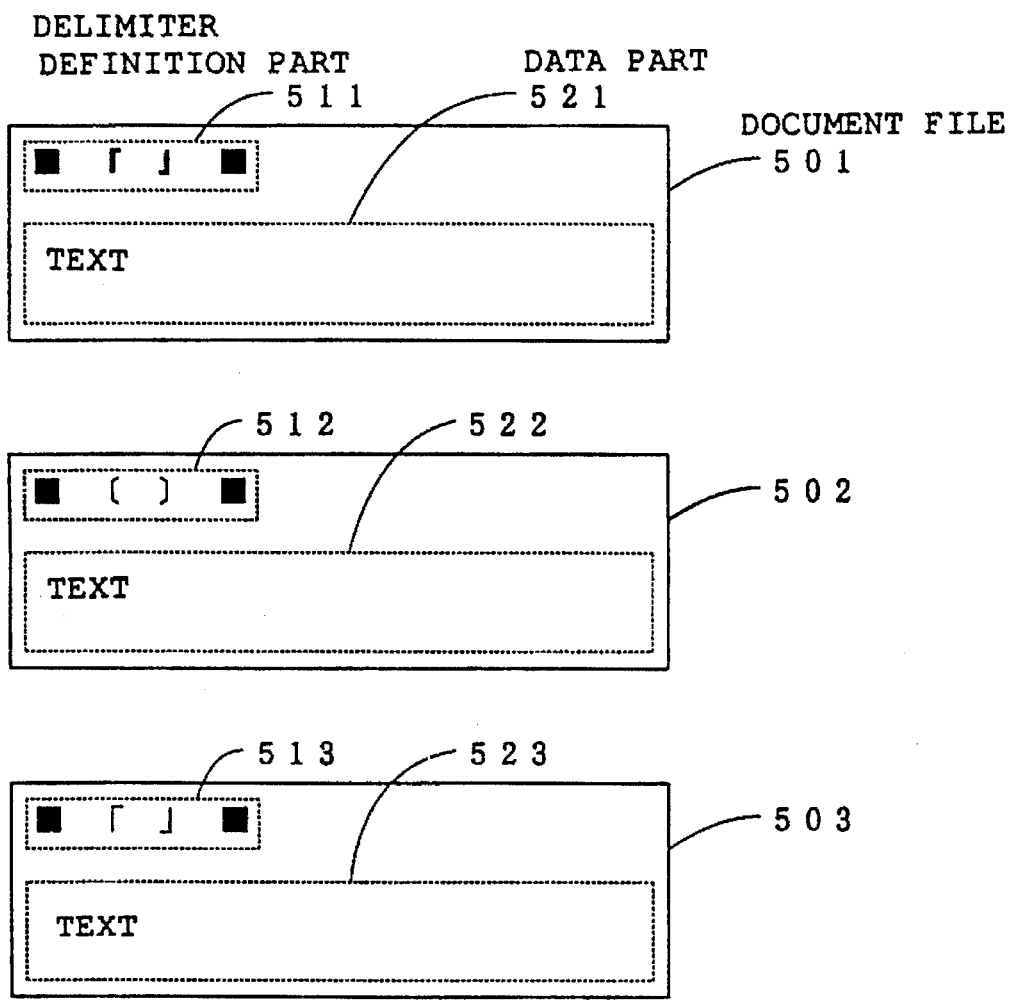
FIG. 56 is a diagram showing the structure of document files.

FIG. 56 is a diagram showing the structure of the document files. In FIG. 56, the texts of the document files 501, 502, 503 are composed of respective delimiter definition parts 511, 512, 513 and respective data parts 521, 522, 523.

The delimiter definition parts 511, 512, 513 are composed of respective trains of all delimiter symbols (two delimiter symbols in this embodiment) extracted from at least the data parts 521, 522, 553 and arranged in a predetermined order (e.g., "⌈" after "⌉"), the delimiter symbol trains being sandwiched between symbols (delimiter symbols "■" provided to distinguish the delimiter definition parts 511, 512, 513 from the data parts 521, 522, 523) which are not used in the data parts 521, 522, 523. It is assumed that the data parts 521, 522, 523 employ different delimiter symbols, per every document file of 501, 502, 503, i.e., the document file 501 employs delimiter symbols "⌈", "⌉" for the document file 502, the document file 503 employs delimiter symbols "[", "]", and data part 523 employs delimiter symbols "⌊", "⌋".

A process of extracting a referred-to statement composed of a character string sandwiched between delimiter symbols in the data parts 521, 522, 523 from the document files 501, 502, 503 which have different data structures (employ different delimiter symbols) will be described below with reference to a procedure for extracting a referred-to statement shown in FIG. 57(A) and FIG. 57(B).

Figure 57A:
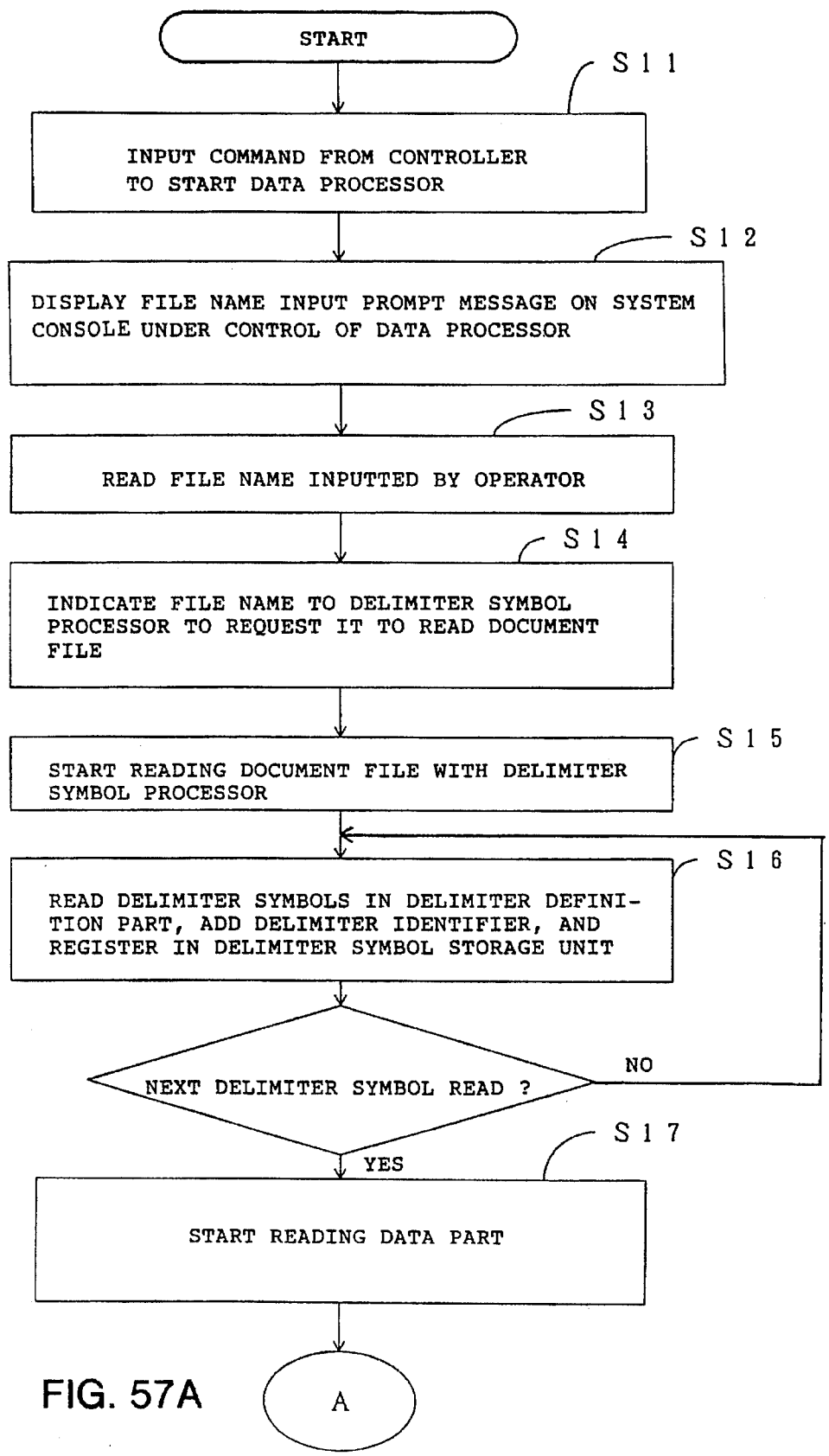
FIG. 57(A) and FIG. 57(B) are flowcharts of a procedure for extracting a referred-to statement sandwiched between delimiter symbols.

In FIG. 57(A), the operator inputs a start command to the controller 61 for starting the data processor 52, and the controller 61 starts the data processor 52 in a processing step S11. The started data processor 52 displays a message for prompting the inputting of the file name of a document file from which a referred-to statement is to be extracted, on the display unit (not shown) of the system console 70 in a processing step S12.

The operator inputs the file name of a document file 50i (i=1, 2, 3) from the system console 70, and the data processor 52 reads the file name in a processing step S13.

In a processing step S14, the data processor 52 indicates the inputted file name to the delimiter symbol processor 51 to request the delimiter symbol processor 51 to read the document file 50i.

In a processing step S15, the delimiter symbol processor 51 starts reading the document file 50i from the disk device 80 through the input/output controller 62.

The delimiter symbol processor 51 which has started reading the document file 50i reads a symbol train from the first delimiter symbol "■" to the next same delimiter symbol, adds numbers to the delimiter symbols in the order in which they are read, and registers them in the delimiter symbol storage unit 53 in a processing step S16.

FIG. 58 is a diagram illustrative of symbol identifiers registered in the delimiter symbol storage unit 53. In FIG. 58, the delimiter symbol processor 51 reads a symbol train from the delimiter symbol "■" at the beginning of a file to the next same delimiter symbol, i.e., for the document file 501, for example, the delimiter symbol processor 51 reads the delimiter symbols "⌈", "⌉", adds numbers to them in the order in which they are read, that is, adds "1" to the delimiter symbol "⌈" and adds "2" to the delimiter symbol "⌉", and registers them in the delimiter symbol storage unit 53.

Figure 57B:
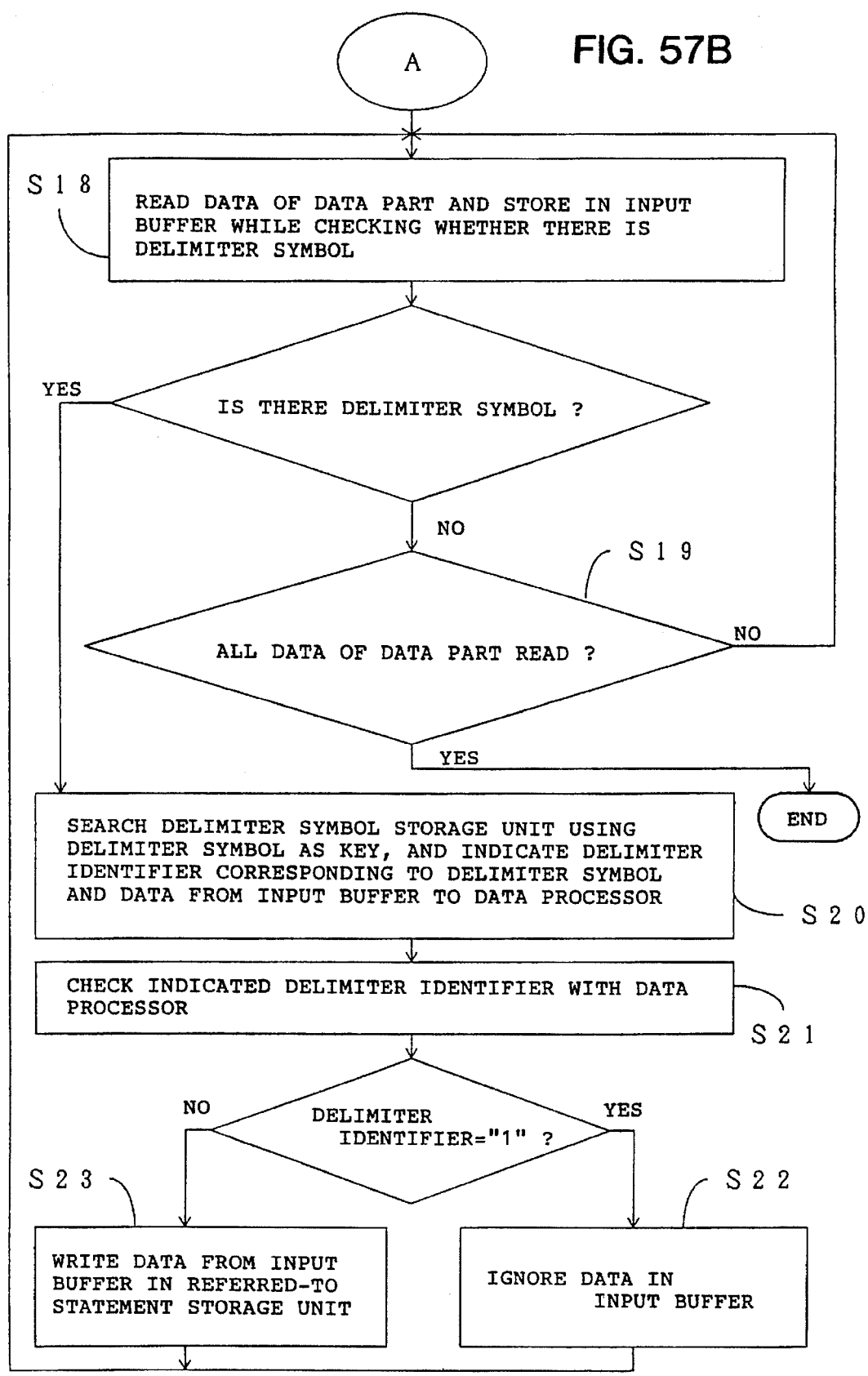

In FIG. 57(A) and FIG. 57(B), when the delimiter symbol processor 51 reads the next delimiter symbol "■", it recognizes that it has completed the reading of the delimiter definition parts 511, 512, 513, and then starts reading the data part 52i (i=1, 2, 3) in a processing step S17.

In a processing step S18, while reading the data part 52i, the delimiter symbol processor 51 checks whether there is a delimiter symbol or not in the read data. The read data are stored in the input buffer 63.

If there is no delimiter symbol in the read data, then the delimiter symbol processor 51 determines whether the reading of all the data part 52i is completed or not in a processing step S19. If completed, the delimiter symbol processor 51 indicates the completion to the data processor 52, and the data processor 52 completes the processing of data.

If there is a delimiter symbol in the read data, then the delimiter symbol processor 51 searches the delimiter symbol storage unit 53 using the delimiter symbol as a key, and indicates the symbol identifier corresponding to the delimiter symbol and the data that have been inputted to the input buffer 63 until the delimiter symbol appears, to the data processor 52 in a processing step S20.

In a processing step S21, the data processor 52 checks the indicated symbol identifier.

If the symbol identifier "1" is indicated, then the data processor 52 ignores the inputted data in a processing step S22. If the symbol identifier "2" is indicated, then the data processor 52 writes the data in the input buffer 63 into the referred-to statement storage unit 55 of the disk device 80 through the input/output controller 62 in a processing step S23.

Following the processing step S22 or S23, the data processor 52 requests the delimiter symbol processor 51 to indicate next data inputting and a delimiter symbol, and control returns to the processing step S18.

By thus reading the delimiter definition part 51i and the data part 52i of the document file 50i (i=1, 2, 3), it is possible to extract a referred-to statement sandwiched between delimiter symbols from the document file 50i which has different delimiter symbols. Therefore, even if a plurality of role tree files or other files employ different delimiter symbols, no confusion arises between the files as the relative position of delimiter symbols among the delimiter symbols is controlled per file.

As described above, the present invention offers the following advantages:

According to the first advantage, the format of an initial document can freely be selected. Specifically, since an initial document is transformed into a designated document structure using a role tree, character string expressions themselves which constitute the initial document can freely be selected. Transformation from a document structure as an initial document into a document structure as a program is determined subsequently according to role tree transformation rules. As a result, inasmuch as an abstract program can be produced with an individual language, ① the programmer can generate and accumulate in expressions that can easily be understood and confirmed himself, and can reduce the working cost of the programmer, ② the programmer can produce an abstract program while subsequently applying detailed meanings by way of computer operation when a program is to be generated, and ③ the programmer does not need to write a program in a programming language that has been provided.

According to the second advantage, the decision of implementation is available in the form of data. Since the decision of implementation has been converted into data using role tree transformation rules, an implementing process for detailing an abstract program into a specific program is given as data. Consequently, ① a programming process can be automated, i.e., if a variable is used, then a declare statement can automatically be entered, ② the programmer can accumulate and reuse programming experiences as data, ③ since all are available as data and a procedure according to which a specific program has been transformed into an abstract program remains objectively, an implementing process can be reproduced in its entirety, and ④ a plurality of versions can simultaneously be generated by using a plurality of implementing data.

According to the third advantage, expression data of different languages are available in the form of data. By exchanging a set of role patterns indicating language expressions and a set of vocabularies, it is possible to derive a plurality of language expressions in, e.g., a C language, FORTRAN, COBOL, an assembler language, etc., from the same role tree. Since a final program language can freely be selected, ① expressions can be formed in a desired programing language, and ② expressions can be generated simultaneously in a plurality of programming languages.

According to the fourth advantage, computer program parts can be reused. Because different programs can be generated in the same format logic of the same initial document, ① programs can be generated and accumulated by selecting expressions that can easily be understood by the user, ② a programming language can be changed by changing transformation rules and expression data (a set of patterns and a set of vocabularies), and it is not necessary to change the accumulated programs themselves, ③ a procedure for obtaining a source code from accumulated abstract programs can be automated by reusing transformation rules and expression data, and ④ a process of reusing existing subroutines can easily be automated by adding a set of transformation rules, a set of patterns, and a set of vocabularies which correspond to operations for inserting statements to call the subroutines.

According to the fifth advantage, the following advantages can be achieved by making improvements in operation:

① By expressing expressions used in an abstract program with words in an application field, a program language specifically related to that application field can be produced. For example, insofar as the manner in which an initial document is written is determined, the program generating system can be used as a kind of compiler.

② By using only expressions which are not governed by the circumstances of a computer as an abstract programing language, it is possible to generate an abstract program of long service life (i.e., which is almost free of the need for change depending on the programming language), so that capability of reusing programs is increased.

③ Changes in the circumstances of a computer can be met only by altering and correcting data for indicating an implementing process.

④ With regard to a general implementing process, many of data for indicating an implementing process can be reused, and it may be sufficient to indicate only implementing techniques of the program.

⑤ Programs in a plurality of versions, e.g., a debugging version, a test version, etc., can simultaneously be generated by giving instructions with data as implementing techniques.

⑥ Programming languages can be transformed by changing data (implementing data, a set of patterns, and a set of vocabularies).

⑦ For debugging a program, the causes of debugs may be classified into three categories, i.e., (a) abstract program bugs, (b) implementing process bugs, and (c) programming language usage errors.

⑧ Since information used in programing and a process of programing operation can be reproduced, problems arising out of the difference between the programer and the service person can be coped with.

⑨ Test data or the like can systematically be generated by this tool.

According to the sixth advantage, the program generating system can be applied to other fields than programming. For example, ① it can generate not only programs but also data in the same manner as the programs, ② it can generate natural language expressions such as language translations or the like, and ③ it can transform structured texts.

We claim:

1. A program generating system for using the language of an individual to generate a linguistic description expressed in a programming language from a linguistic description expressed in the language of a user, comprising:

means for carrying out a first process for transforming a user's linguistic expression into an initial role tree;

means for carrying out a second process for detailing and transforming a vocabulary expression of said initial role tree into a beginning role tree;

means for carrying out a third process for detailing and transforming said beginning role tree into an ending role tree; and means for carrying out a fourth process for generating a source code of a programming language from said ending role tree.

2. A program generating system according to claim 1, wherein said means for carrying out a second process has vocabulary detailing means for applying vocabulary transformation rules to said initial role tree to detail the vocabulary expression of said initial role tree.

3. A program generating system according to claim 2, wherein said vocabulary detailing means has applying means for successively applying the vocabulary transformation rules to the initial role tree.

4. A program generating system according to claim 3, wherein said applying means has matching means for matching a vocabulary of the initial role tree with the vocabulary transformation rules.

5. A program generating system according to claim 4, wherein said applying means has means for reconstructing the vocabulary of the initial role tree according to said vocabulary transformation rules when the matching by said matching means is successful.

6. A program generating system according to claim 1, wherein said means for carrying out a third process has transformation rule applying means for applying role tree transformation rules to said beginning role tree to detail said beginning role tree.

7. A program generating system according to claim 6, wherein said transformation rule applying means has means for successively applying said role tree transformation rules to said beginning role tree.

8. A program generating system according to claim 6, wherein said transformation rule applying means has means for repeatedly applying said role tree transformation rules to said beginning role tree.

9. A program generating system according to claim 6, wherein said transformation rule applying means has means for matching said beginning role tree with a partial role tree in a pre-conditional part of the role transformation rules.

10. A program generating system according to claim 6, wherein said transformation rule applying means has means for forcibly adding a partial role tree in a post-conditional part of the role tree transformation rules to said beginning role tree according to the result of matching by said matching means.

11. A program generating system according to claim 1, wherein said means for carrying out a fourth process has means for applying a set of patterns and a set of vocabularies to said ending role tree.

12. A program generating system according to claim 1, wherein said role trees have a document structure composed of a portion which defines delimiter symbols and a portion which has a row of characters separated by delimiter symbols.

13. A program generating system according to claim 12, wherein said portion which has a row of characters is composed of a set of view definitions each comprising a view and a view content.

14. A program generating system according to claim 13, wherein said view content is composed of a pattern and a series of roles and subviews.

15. A method of identifying delimiter symbols in a delimited file in a system having a text storage unit storing texts each structured to identify a given data part from other data parts with sandwiching delimiter symbols and delimiter definition parts positioned at the beginning of said texts and including extracted delimiter symbols used in said texts, in a source code of a program and computer data to be processed by a program, a delimiter symbol processor, a data processor, and a delimiter symbol storage unit, said method comprising the steps of:

(S1) starting to input the delimiter symbols of said delimiter definition parts from said text storage unit with said delimiter symbol processor;

(S2) adding the order in which said delimiter symbols are inputted as symbol identifiers to said delimiter symbols and registering the symbol identifiers and the delimiter symbols in the delimiter symbol storage unit;

(S3) starting to input a text stored in said text storage unit while checking whether there is a delimiter symbol;

(S4) searching said delimiter symbol storage unit using a delimiter symbol as a key if said delimiter symbol is detected while said text is being inputted;

(S5) indicating the symbol identifier added to said delimiter symbol and inputted data of said text inputted until said delimiter symbol appears, to said data processor;

(S6) recognizing the delimiter symbol based on the symbol identifier and processing the data as desired with said data processor; and (S7) if a next text is to be inputted, requesting said delimiter symbol processor to input the text from said text storage unit.

16. A method of generating a program using the language of an individual to generate a linguistic description expressed in a programming language from a linguistic description expressed in the language of a user, comprising the steps of:

applying an intermediate output transforming process and an intermittent output detailing process to linguistic expressions of an individual to transform the linguistic expressions of the individual into linguistic expressions inherent in a field in an initial stage;

applying an intermediate output transforming process and an intermittent output detailing process to the linguistic expressions inherent in the filed to transform the linguistic expressions inherent in the field into standard linguistic expressions in an intermediate stage; and applying an intermediate output transforming process and an intermittent output detailing process to the standard linguistic expressions to transform the standard linguistic expressions into linguistic expressions representing computer operations in a final stage, finally obtaining computer program language descriptions in a predetermined programming language.

17. A method according to claim 16, wherein a linguistic description generating processor is applied to each of the intermediate output transforming processes to generate abstract program language expressions.

* * * * *